United States Patent [19]
Saka et al.

[11] Patent Number: 6,023,491
[45] Date of Patent: *Feb. 8, 2000

[54] DEMODULATION APPARATUS PERFORMING DIFFERENT FREQUENCY CONTROL FUNCTIONS USING SEPARATELY PROVIDED OSCILLATORS

[75] Inventors: Hiroshi Saka, Katano; Kazunao Urata, Tondabayashi; Shigeru Soga, Matsubara, all of Japan

[73] Assignee: Matsushita Electric Industrail Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/492,488

[22] Filed: Jun. 20, 1995

[30] Foreign Application Priority Data

| Jun. 21, 1994 | [JP] | Japan | 6-138995 |
| Jun. 21, 1994 | [JP] | Japan | 6-138996 |
| Jun. 21, 1994 | [JP] | Japan | 6-138997 |
| Jun. 21, 1994 | [JP] | Japan | 6-138998 |
| Apr. 4, 1995 | [JP] | Japan | 7-078699 |

[51] Int. Cl.[7] .................................................. H04L 27/14
[52] U.S. Cl. ........................ 375/326; 375/344; 329/306; 455/182.2
[58] Field of Search ..................................... 375/326, 344, 375/281, 325, 332; 455/255, 257, 258, 263, 265, 314, 315, 179.1, 182.1, 182.2, 182.3, 183.1, 184.1, 192.1, 192.2, 192.3, 196.1, 197.1, 207, 208, 209; 329/304, 306, 307, 345, 346

[56] References Cited

U.S. PATENT DOCUMENTS

| 4,642,573 | 2/1987 | Noda et al. | 329/50 |
| 4,871,973 | 10/1989 | Yoshihara | 329/308 |
| 5,107,522 | 4/1992 | Kitayama et al. | 375/344 |
| 5,260,975 | 11/1993 | Saito | 375/327 |
| 5,268,647 | 12/1993 | Ichiyoshi | 329/308 |
| 5,270,665 | 12/1993 | Ichiyoshi | 329/306 |
| 5,550,812 | 8/1996 | Phillips | 370/203 |

FOREIGN PATENT DOCUMENTS

| 537577 | 2/1993 | Japan . |
| 5199075 | 8/1993 | Japan . |
| 5244212 | 9/1993 | Japan . |
| 614072 | 1/1994 | Japan . |
| 678009 | 3/1994 | Japan . |
| 6120992 | 4/1994 | Japan . |

Primary Examiner—Temesghen Ghebretinsae
Attorney, Agent, or Firm—Renner, Otto, Boiselle & Sklar, P.L.L.

[57] ABSTRACT

A QPSK modulation signal is processed with frequency conversion into an IF signal by a channel selection circuit, and then is converted into a baseband signal by a quadrature demodulator. The baseband signal has a wave thereof shaped by DTFs and then sent to a carrier recovery circuit. An offset frequency of the IF signal detected by an AFC circuit is compensated for by a baseband frequency converter including a complex multiplier and a DVCO. The frequency tracking circuit detects whether an operating frequency of another DVCO in the carrier recovery circuit goes beyond a range. By tracking an oscillation frequency of the DVCO in the baseband frequency converter so as not to go beyond the reference value, frequency deviation of the spectrum of signals which are input to the DTFs is controlled not to go beyond the reference value. By offsetting a frequency dividing ratio of a variable frequency divider of the channel selection circuit by an amount corresponding to the offset frequency of the IF signal detected by the frequency detector, the frequency deviation of the QPSK modulation signal can be compensated for whichever channel is selected.

27 Claims, 34 Drawing Sheets

DEMODULATION APPARATUS PERFORMING DIFFERENT FREQUENCY CONTROL FUNCTIONS USING SEPARATELY PROVIDED OSCILLATORS

BACKGROUND OF THE INVENTION

1. Field of the Invention

The present invention relates to a demodulation apparatus used in a data receiving apparatus, and in particular to a demodulation apparatus for compensating for a frequency drift of a digital modulation signal.

2. Description of the Related Art

Recently, implementation of digital video broadcasting has been discussed in both the terrestrial and satellite broadcasting. In digital video broadcasting, digital modulation signals are used, and thus a demodulation apparatus for demodulating the digital modulation signal is required.

Demodulation apparatuses for demodulating the modulation signal have two types of structures. In one type of structure, a digital modulation signal having various center frequencies is first converted into an IF signal of a frequency (f1) by a channel selection circuit, and then the IF signal of a frequency (f1) is digitally demodulated. In the other type of structure, the IF signal of a frequency (f1) obtained by the channel selection circuit is further converted into another IF signal of a frequency (f2), and then such an IF signal of a frequency (f2) is digitally demodulated.

For digital demodulation, a synchronization detector system is often used. In this system, a recovered carrier which is in synchronization with a carrier of the digital modulation signal is required. Such a recovered carrier is generally obtained by a carrier recovery circuit including a PLL circuit. In general, such a demodulation apparatus is often provided with an AFC function so as to also to deal with a digital modulation signal which is input in the state of offsetting from a prescribed frequency by a certain frequency.

FIG. 35 is a block diagram of a conventional demodulation apparatus 500 including a channel selection circuit 110, a carrier recovery circuit 9, and an AFC circuit 20.

The channel selection circuit 110 includes a frequency converter 111, a voltage-controlled oscillator 112 (hereinafter, referred to as a "VCO"), a variable frequency divider 113, a reference oscillator 114, a phase comparator 115, a loop filter 116, and a microprocessor 117.

In the channel selection circuit 110, a frequency dividing ratio for the variable frequency divider 113 is set based on channel selection information which is input to the microprocessor 117. The frequency of the VCO 112 is divided by the frequency dividing ratio. A phase difference (phase error) between an output signal from the variable frequency divider 113 and an output signal from the reference oscillator 114 is detected by the phase comparator 115. The detected phase error is smoothed by the loop filter 116 and fedback as a control signal for the VCO 112. Thus, the VCO 112 performs oscillation stably at a frequency which is obtained by multiplying the frequency of the reference oscillator 114 by an integer. Such an integer corresponds to a frequency dividing ratio of the variable frequency divider 113.

A QPSK modulation signal which is input to the channel selection circuit 110 is processed with frequency conversion by the frequency converter 111 to be an IF signal. After an unnecessary spurious component is removed from the IF signal by a band-pass filter (hereinafter, referred to as a "BPF") 118, the IF signal is input to quadrature demodulator 1. The IF signal is then converted into an I baseband signal and a Q baseband signal based on an output signal from a local oscillator 2. The I baseband signal and the Q baseband signal have quadrature relationship to each other. The I and Q baseband signals which are generated as analog signals are converted into I and Q baseband signals each having a digital value by A/D converters 3 and 4, respectively. The digital I and Q baseband signals are treated with frequency conversion by an operating frequency of a digital VCO (hereinafter, referred to as a "DVCO") 6 by a complex multiplier 5 having a frequency conversion function. Then, the I and Q baseband signals respectively have waves thereof shaped by digital transversal filters (hereinafter, referred to as "DTFs") 7 and 8. The resultant signals are input to the carrier recovery circuit 9.

The carrier recovery circuit 9 includes a complex multiplier 11, a phase detector 12, a PLL loop filter 13 and a DVCO 14. These elements form a closed loop. The carrier recovery circuit 9 has a function of generating recovered carriers from the I and Q baseband signals which are input to the complex multiplier 11. When a phase locking is realized in the carrier recovery circuit 9, the recovered I and Q baseband signals are output.

The carrier recovery circuit 9 operates in the following manner.

The I and Q baseband signals which are input to the complex multiplier 11 having a phase rotation function are output after being treated with phase rotation by the DVCO 14 and are input to the phase detector 12. The phase detector 12 detects a phase difference between the input signal and a reference phase and outputs a signal indicating the detected difference (such a signal is referred to as a "phase error signal"). The phase error signal is smoothed by the PLL loop filter 13 and then input to the DVCO 14. The DVCO 14 outputs a recovered carrier which is in synchronization with the I and Q baseband signals to the complex multiplier 11. Accordingly, the complex multiplier 11 outputs recovered I and Q baseband signals which correspond to a transmitted data included in the QPSK modulation signal.

The AFC circuit 20 includes a frequency error detector 21, an AFC loop filter 22, and a latch circuit 23. The frequency error detector 21 detects a frequency error between the center frequency of the IF signal and the oscillation frequency of the local oscillator 2 based on the phase error signal sent from the phase detector 12. The frequency error signal is smoothed by the AFC loop filter 22 and input to the DVCO 6 via the latch circuit 23. By the frequency error signal, an operating frequency of the DVCO 6 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the DVCO 6 is held by the latch circuit 23, and thus the DVCO 6 operates at a constant oscillation frequency. Moreover, when the detected frequency error is less than the reference value, an AFC/PLL loop switching signal is supplied to the PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output.

In satellite broadcasting, a dielectric resonator is generally used for a local oscillator of a BS converter. Accordingly, the frequency of the local oscillator often offsets from the desired frequency, for example, by several megahertz in an extreme case.

In the demodulation apparatus 500, in the case where a center frequency of the QPSK modulation signal which is input to the channel selection circuit 110 offsets from a prescribed frequency, the center frequency of the IF signal which is input to the quadrature demodulator 1 also offsets from the oscillation frequency of the local oscillator 2. When the offset frequency is larger than the frequency range which can be pulled in by the AFC circuit 20, the AFC circuit 20 does not operate normally. As a result, the carrier recovery circuit 9 cannot establish phase locking. Thus, data cannot be demodulated.

Even if the offset frequency of the IF signal with respect to the local oscillator 20 is smaller than the frequency range which can be pulled in by the AFC circuit 20 and thus the AFC circuit 20 is operable normally to realize data demodulation, the pull in time of the AFC circuit 20 increases as the offset frequency increases. Accordingly, as the offset frequency increases, a time period required for data to be correctly demodulated as measured from the start of channel selection performed by the channel selection circuit 110 becomes longer. Hereinafter, such a time period will be referred to as a "channel selection time period".

Even if the offset frequency of the IF signal with respect to the local oscillator 2 is smaller than the frequency which can be pulled in by the AFC circuit 20 and thus the AFC circuit 20 is operable normally to realize data demodulation, when the offset frequency is excessively large, the spectrum of the IF signal deviates from the center frequency of the BPF 118. In order to operate the demodulation apparatus 500 normally even in such circumstances, the bandwidth of the BPF 118 needs to be set broadly. However, by setting the bandwidth of the BPF 118 broadly, the ability of eliminating an interference signal on adjacent channels is lowered. Thus, an error rate of the demodulation apparatus 500 is deteriorated.

SUMMARY OF THE INVENTION

In one aspect of the present invention, a demodulation apparatus includes conversion means for selecting a signal corresponding to a desired channel from input modulation signals in accordance with channel selection information and performing frequency conversion of the selected signal into an IF signal; demodulation means for demodulating the IF signal into an I baseband signal and a Q baseband signal having quadrature relationship to each other; recovery means for generating a recovered carrier based on the I baseband signal and the Q baseband signal and outputting a recovered I output signal and a recovered Q output signal; control means for detecting an offset frequency of an oscillation frequency of the demodulation means to control the operating frequency; and transmission means for transmitting information on the offset frequency of the demodulation means to the conversion means.

In one embodiment of the invention, the conversion means includes a frequency converter for performing frequency conversion of the signal selected from the input modulation signals to generate the IF signal, and a channel selection circuit, including a voltage-controlled oscillator having an oscillation frequency which changes in accordance with the channel selection information, for supplying a local oscillation signal of the voltage-controlled oscillator to the frequency converter. The demodulation means includes a quadrature demodulator for demodulating the IF signal to the I baseband signal and the Q baseband signal having quadrature relationship to each other, a local oscillator for generating an output to be sent to the quadrature demodulator, an A/D converter for converting the I baseband signal and the Q baseband signal into digital signals, a first complex multiplier, connected to a first digital voltage-controlled oscillator, for performing complex multiplication of the digital signals obtained by the A/D converter and an output from the first digital voltage-controlled oscillator, and a low-pass wave-shaping filter for shaping a waveform of the output signal from the first complex multiplier. The recovery means includes a second complex multiplier for performing complex multiplication of the output signal from the lowpass wave-shaping filter and the recovered carrier, and PLL means for smoothing a phase error of the output signal from the second complex multiplier and supplying the smoothed phase error to a second digital voltage-controlled oscillator to generate the recovered carrier. The transmission means include a frequency detector for detecting an oscillation frequency of the first digital voltage-controlled oscillator. The channel selection circuit includes fine-tune control means for receiving the frequency information obtained by the frequency detector and fine-tuning the oscillation frequency of the voltage-controlled oscillator included in the channel selection circuit.

In one embodiment of the invention, the control means includes at least one of frequency control means for detecting a frequency deviation of the I baseband signal and the Q baseband signal from a prescribed frequency and, smoothing the frequency error to control the oscillation frequency of the first digital voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range.

In one embodiment of the invention, the conversion means includes a frequency converter for performing frequency conversion of the signal selected from the input modulation signals to generate the IF signal, and a channel selection circuit, including a first voltage-controlled oscillator having an oscillation frequency which changes in accordance with the channel selection information, for supplying a local oscillation signal of the first voltage-controlled oscillator to the frequency converter. The demodulation means includes a quadrature demodulator for demodulating the IF signal to the I baseband signal and the Q baseband signal having quadrature relationship to each other, a second voltage-controlled oscillator for generating an output to be sent to the quadrature demodulator, an A/D converter for converting the I baseband signal and the Q baseband signal into digital signals, and a low-pass wave-shaping filter for shaping a waveform of the output signal from the A/D converter. The recovery means includes a complex multiplier, connected to a digital voltage-controlled oscillator, for performing complex multiplication of the digital signals obtained by the A/D converter and the output from the digital voltage-controlled oscillator, and PLL means for smoothing a phase error of the output signal from the complex multiplier and supplying the smoothed phase error to the digital voltage-controlled oscillator to generate the recovered carrier. The transmission means include a frequency detector for detecting an oscillation frequency of the second voltage-controlled oscillator. The channel selection circuit includes fine-tune control means for receiving the frequency information obtained by the frequency detector and fine-tuning the oscillation frequency of the first voltage-controlled oscillator included in the channel selection circuit.

In one embodiment of the invention, the control means includes at least one of frequency control means for detecting a frequency deviation of the I baseband signal and the Q baseband signal from a prescribed frequency and smoothing the frequency error to control the oscillation frequency of the second voltage-controlled oscillator, and a frequency tracking circuit for determining whether the oscillation frequency of the digital voltage-controlled oscillator goes beyond a range between positive reference value and a negative reference value and, in the case when the oscillation frequency goes beyond one of the positive reference value and the negative reference value, tracking the oscillation frequency of the second voltage-controlled oscillator to allow the oscillation frequency of the digital voltage-controlled oscillator within the range.

In one embodiment of the invention, the conversion means includes a first frequency converter for performing frequency conversion of the signal selected from the input modulation signals to generate a first IF signal, a channel selection circuit, including a first voltage-controlled oscillator having an oscillation frequency which changes in accordance with the channel selection information, for supplying a local oscillation signal of the first voltage-controlled oscillator to the first frequency converter, and a second frequency converter, connected to a second voltage-controlled oscillator, for performing frequency conversion of the first IF signal to generate a second IF signal. The demodulation means includes a quadrature demodulator for demodulating the second IF signal to the I baseband signal and the Q baseband signal having quadrature relationship to each other, a local oscillator for generating an output to be sent to the quadrature demodulator, an A/D converter for converting the I baseband signal and the Q baseband signal into digital signals, and a low-pass wave-shaping filter for shaping a waveform of the output signal from the A/D converter. The recovery means includes a complex multiplier, connected to a digital voltage-controlled oscillator, for performing complex multiplication of the digital signals obtained by the A/D converter and the output from the digital voltage-controlled oscillator, and PLL means for smoothing a phase error of the output signal from the complex multiplier and supplying the smoothed phase error to the digital voltage-controlled oscillator to generate the recovered carrier. The transmission means include a frequency detector for detecting an oscillation frequency of the second voltage-controlled oscillator. The channel selection circuit includes fine-tune control means for receiving the frequency information obtained by the frequency detector and fine-tuning the oscillation frequency of the first voltage-controlled oscillator included in the channel selection circuit.

In one embodiment of the invention, the conversion means includes a first frequency converter for performing frequency conversion of the signal selected from the input modulation signals to generate a first IF signal, a channel selection circuit, including a first voltage-controlled oscillator having an oscillation frequency which changes in accordance with the channel selection information, for supplying a local oscillation signal of the first voltage-controlled oscillator to the first frequency converter, and a second frequency converter, connected to a second voltage-controlled oscillator, for performing frequency conversion of the first IF signal to generate a second IF signal. The demodulation means includes a band-pass wave-shaping filter for shaping a waveform of the second IF signal, a quadrature demodulator for demodulating the second IF signal to the I baseband signal and the Q baseband signal having quadrature relationship to each other, a local oscillator having an oscillation frequency which is set to be equal to a center frequency of the band-pass wave-shaping filter, for generating an output to be sent to the quadrature demodulator, and an A/D converter for converting the I baseband signal and the Q baseband signal into digital signals. The recovery means includes a complex multiplier, connected to a digital voltage-controlled oscillator, for performing complex multiplication of the digital signals obtained by the A/D converter and the recovered carrier, and PLL means for smoothing a phase error of the output signal from the complex multiplier and supplying the smoothed phase error to the digital voltage-controlled oscillator to generate the recovered carrier. The transmission means include a frequency detector for detecting an oscillation frequency of the second voltage-controlled oscillator, and the channel selection circuit includes fine-tune control means for receiving the frequency information obtained by the frequency detector and fine-tuning the oscillation frequency of the first voltage-controlled oscillator included in the channel selection circuit.

In one embodiment of the invention, the conversion means includes a first frequency converter for performing frequency conversion of the signal selected from the input modulation signals to generate a first IF signal, a channel selection circuit, including a first voltage-controlled oscillator having an oscillation frequency which changes in accordance with the channel selection information, for supplying a local oscillation signal of the first voltage-controlled oscillator to the first frequency converter, and a second frequency converter, connected to a second voltage-controlled oscillator, for performing frequency conversion of the first IF signal to generate a second IF signal. The demodulation means includes a band-pass wave-shaping filter for shaping a waveform of the second IF signal, an A/D converter for converting the second IF signal into a digital signal, a digital frequency converter for converting the digital second IF signal obtained by the A/D converter into a digital baseband signal, and an I/Q separation circuit for dividing the digital baseband signal into an I baseband signal and a Q baseband signal having quadrature relationship to each other. The recovery means includes a complex multiplier, connected to a digital voltage-controlled oscillator, for performing complex multiplication of the I baseband signal and the Q baseband signal and the recovered carrier, and PLL means for smoothing a phase error of the output signal from the complex multiplier and supplying the smoothed phase error to the digital voltage-controlled oscillator to generate the recovered carrier. The transmission means include a frequency detector for detecting an oscillation frequency of the second voltage-controlled oscillator. The channel selection circuit includes fine-tune control means for receiving the frequency information obtained by the frequency detector and fine-tuning the oscillation frequency of the first voltage-controlled oscillator included in the channel selection circuit.

In one embodiment of the invention, the conversion means includes a frequency converter for performing frequency conversion of the signal selected from the input modulation signals to generate the IF signal, and a channel selection circuit, including a first voltage-controlled oscillator having an oscillation frequency which changes in accordance with the channel selection information, for supplying a local oscillation signal of the first voltage-controlled oscillator to the frequency converter. The demodulation means includes a quadrature demodulator for demodulating the IF signal to the I baseband signal and the Q baseband signal having quadrature relationship to each other, a second voltage-controlled oscillator for generating an output to be sent to the quadrature demodulator, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier. The recovery means includes a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier. The control means includes frequency control means for detecting a frequency deviation of the I baseband signal and the Q baseband signal from a prescribed frequency and smoothing the frequency error to control the oscillation frequency of the second voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range. The transmission means include a frequency detector for detecting a frequency amount obtained by adding a frequency deviation of the oscillation frequency of the second voltage-controlled oscillator from a prescribed frequency and the oscillation frequency of the first digital voltage-controlled oscillator. The channel selection circuit includes fine-tune control means for receiving the frequency information obtained by the frequency detector and fine-tuning the oscillation frequency of the first voltage-controlled oscillator included in the channel selection circuit.

In one embodiment of the invention, the conversion means includes a first frequency converter for performing frequency conversion of the signal selected from the input modulation signals to generate the IF signal, a channel selection circuit, including a first voltage-controlled oscillator having an oscillation frequency which changes in accordance with the channel selection information, for supplying a local oscillation signal of the first voltage-controlled oscillator to the first frequency converter, and a second frequency converter, connected to a second voltage-controlled oscillator, for performing frequency conversion of the first IF signal to generate a second IF signal. The demodulation means includes a quadrature demodulator for demodulating the second IF signal to the I baseband signal and the Q baseband signal having quadrature relationship to each other, a local oscillator for generating an output to be sent to the quadrature demodulator, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier. The recovery means includes a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier. The control means includes frequency control means for detecting a frequency deviation of the I baseband signal and the Q baseband signal from a prescribed frequency and smoothing the frequency error to control the oscillation frequency of the second voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range. The transmission means include a frequency detector for detecting a frequency amount obtained by adding a frequency deviation of the oscillation frequency of the second voltage-controlled oscillator from a prescribed frequency and the oscillation frequency of the first digital voltage-controlled oscillator. The channel selection circuit includes fine-tune control means for receiving the frequency information obtained by the frequency detector and fine-tuning the oscillation frequency of the first voltage-controlled oscillator included in the channel selection circuit.

In one embodiment of the invention, the conversion means includes frequency converter for performing frequency conversion of the signal selected from the input modulation signals to generate the IF signal, and a channel selection circuit, including a voltage-controlled oscillator having an oscillation frequency which changes in accordance with the channel selection information, for supplying a local oscillation signal of the voltage-controlled oscillator to the frequency converter. The channel selection circuit includes fine-tune control means for receiving the offset frequency information of the demodulation means and fine-tuning the oscillation frequency of the voltage-controlled oscillator. The fine-tune control means controls the oscillation frequency in a step-like manner discontinuously, and performs initial setting of the oscillation frequency of a prescribed oscillator in the state of being offset from the center frequency when a desired channel is selected so as to compensate for a remaining frequency error which cannot be compensated for by the fine-tuning, the compensation being performed by controlling the oscillation frequency of the prescribed oscillator which is different from the voltage-controlled oscillator.

In one embodiment of the invention, the recovery means includes a complex multiplier, and detects a frequency error based on a change of a phase error of an output signal from the complex multiplier; or the recovery means includes a complex multiplier, and detects a frequency error based on a change of a phase error of an input signal to the complex multiplier, using a differential detector and a frequency discriminator.

In another aspect of the present invention, a demodulation apparatus includes demodulation means for demodulating an input modulated signal into an I baseband signal and a Q baseband signal having quadrature relationship to each other; local oscillation means, including a voltage-controlled oscillator having an oscillation frequency which changes in accordance with frequency setting information, for supplying a local oscillation signal of the voltage-controlled oscillator to the demodulation means; recovery means for generating a recovered carrier based on the I baseband signal and the Q baseband signal and outputting a recovered I output signal and a recovered Q output signal; control means for detecting an offset frequency of an oscillation frequency of the demodulation means to control the operating frequency; and transmission means for transmitting information on the offset frequency of the demodulation means to the conversion means.

In one embodiment of the invention, the demodulation means includes a quadrature demodulator, connected to the local oscillation means, for demodulating the input modulated signal to the I baseband signal and the Q baseband signal having quadrature relationship to each other, an A/D converter for converting the I baseband signal and the Q baseband signal into digital signals, a first complex multiplier, connected to a first digital voltage-controlled oscillator, for performing complex multiplication of the digital signals obtained by the A/D converter and an output from the first digital voltage-controlled oscillator, and a low-pass wave-shaping filter for shaping a waveform of the output signal from the first complex multiplier. The recovery means includes a second complex multiplier, connected to a second digital voltage-controlled oscillator, for performing complex multiplication of the output signal from the low-pass wave-shaping filter and the recovered carrier, and PLL means for smoothing a phase error of the output signal from the second complex multiplier and supplying the smoothed phase error to a second digital voltage-controlled oscillator to generate the recovered carrier. The transmission means include a frequency detector for detecting an oscillation frequency of the first digital voltage-controlled oscillator. The local oscillation means includes fine-tune control means for receiving the frequency information obtained by the frequency detector and fine-tuning the oscillation frequency of the voltage-controlled oscillator included in the local oscillation means.

In one embodiment of the invention, the control means includes at least one of frequency control means for detecting a frequency deviation of the I baseband signal and the Q baseband signal from a prescribed frequency and smoothing the frequency error to control the oscillation frequency of the first digital voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range.

In one embodiment of the invention, the demodulation means includes a frequency converter, connected to a first voltage-controlled oscillator, for performing frequency conversion of the input modulation signal into the IF signal, a quadrature demodulator for demodulating the IF signal to the I baseband signal and the Q baseband signal having quadrature relationship to each other, an A/D converter for converting the I baseband signal and the Q baseband signal into digital signals, and a lowpass wave-shaping filter for shaping a waveform of the output signal from the A/D converter. The voltage-controlled oscillator included in the local oscillation means is a second voltage-controlled oscillator, and the local oscillation means is connected to the quadrature demodulator The recovery means includes a complex multiplier, connected to a digital voltage-controlled oscillator, for performing complex multiplication of the digital signals obtained by the A/D converter and the output from the digital voltage-controlled oscillator, and PLL means for smoothing a phase error of the output signal from the complex multiplier and supplying the smoothed phase error to the digital voltage-controlled oscillator to generate the recovered carrier. The transmission means include a frequency detector for detecting an oscillation frequency of the first voltage-controlled oscillator. The local oscillation means includes fine-tune control means for receiving the frequency information obtained by the frequency detector and fine-tuning the oscillation frequency of the second voltage-controlled oscillator included in the local oscillation means.

In one embodiment of the invention, the control means includes at least one of frequency control means for detecting a frequency deviation of the I baseband signal and the Q baseband signal from a prescribed frequency and smoothing the frequency error to control the oscillation frequency of the first voltage-controlled oscillator, and a frequency tracking circuit for determining whether the oscillation frequency of the digital voltage-controlled oscillator goes beyond a range between positive reference value and a negative reference value and, in the case when the oscillation frequency goes beyond one of the positive reference value and the negative reference value, tracking the oscillation frequency of the first voltage-controlled oscillator to allow the oscillation frequency of the digital voltage-controlled oscillator within the range.

In one embodiment of the invention, the demodulation means includes a frequency converter, connected to a first voltage-controlled oscillator, for performing frequency conversion of the input modulated signal into the IF signal, a quadrature demodulator for demodulating the IF signal to the I baseband signal and the Q baseband signal having quadrature relationship to each other, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier. The voltage-controlled oscillator included in the local oscillation means is a second voltage-controlled oscillator, and the local oscillation means is connected to the quadrature demodulator. The recovery means includes a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier. The control means includes frequency control means for detecting a frequency deviation of the I baseband signal and the Q baseband signal from a prescribed frequency and smoothing the frequency error to control the oscillation frequency of the first voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range. The transmission means include a frequency detector for detecting a frequency amount obtained by adding a frequency deviation of the oscillation frequency of the first voltage-controlled oscillator from a frequency and the oscillation frequency of the first digital voltage-controlled oscillator. The local oscillation means includes fine-tune control means for receiving the frequency information obtained by the frequency detector and fine-tuning the oscillation frequency of the second voltage-controlled oscillator included in the local oscillation means.

In one embodiment of the invention, the channel selection circuit includes fine-tune control means for receiving the offset frequency information of the demodulation means and fine-tuning the oscillation frequency of the voltage-controlled oscillator. The fine-tune control means controls the oscillation frequency in a step-like manner discontinuously, and performs initial setting of the oscillation frequency of a prescribed oscillator in the state of being offset from the center frequency when a desired channel is selected so as to compensate for a remaining frequency error which cannot be compensated for by the fine-tuning, the compensation being performed by controlling the oscillation frequency of the prescribed oscillator which is different from the second voltage-controlled oscillator.

In one embodiment of the invention, the recovery means includes a complex multiplier, and detects a frequency error based on a change of a phase error of an output signal from the complex multiplier; or the recovery means includes a complex multiplier, and detects a frequency error based on a change of a phase error of an input signal to the complex multiplier, using a differential detector and a frequency discriminator.

Thus, the invention described herein makes possible the advantages of (1) providing a demodulation apparatus for shortening the channel selection time period by compensating for an offset frequency of a digital modulation signal which is input to the demodulation apparatus; and (2) providing a demodulation apparatus for preventing deterioration in an error rate by compensating for a frequency deviation of a spectrum of the I and Q baseband signals which accompanies a frequency deviation of an IF signal generated after a recovered carrier is established.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
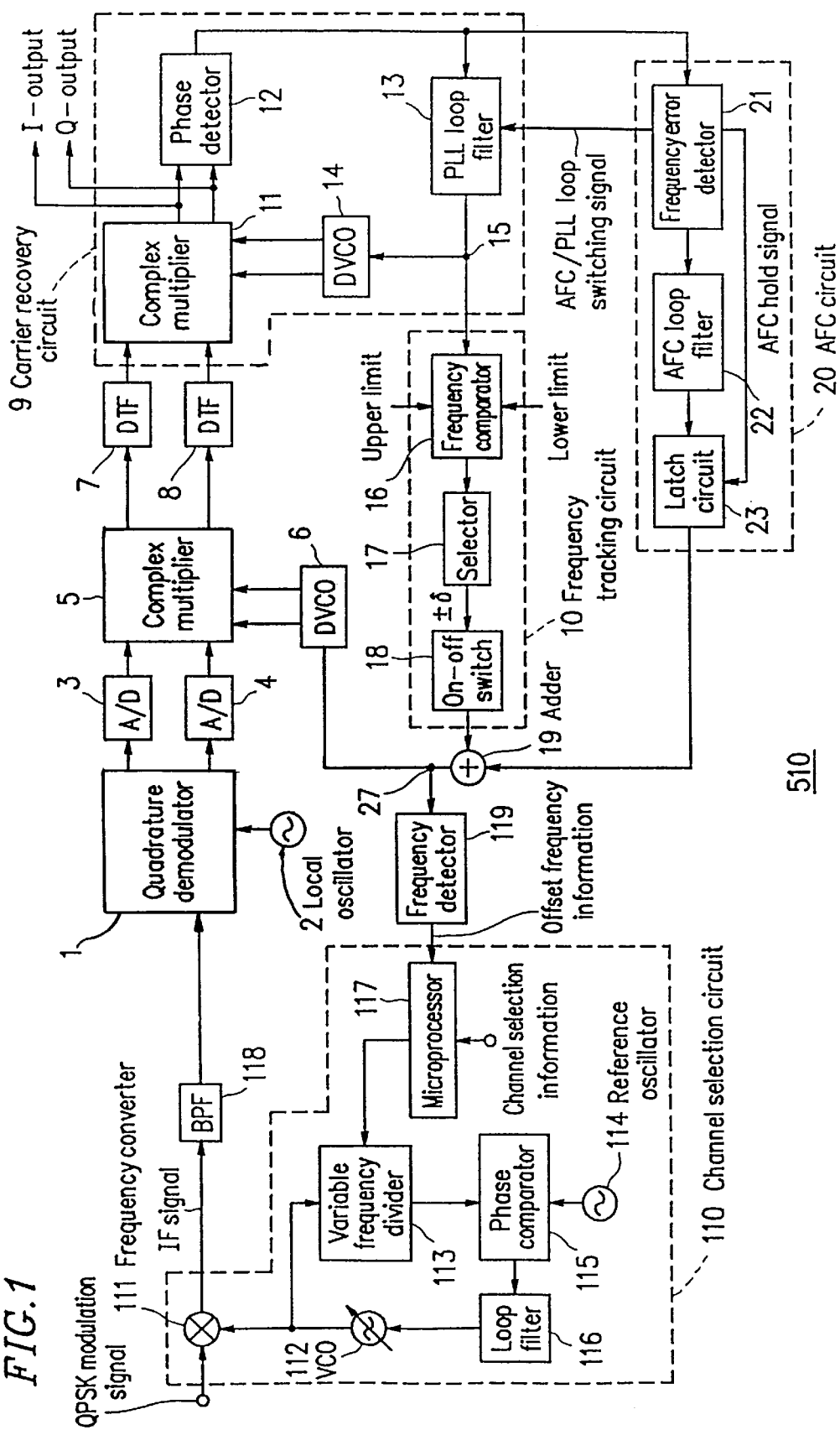
FIG. 1 is a block diagram of a demodulation apparatus in a first example according to the present invention.
Figure 35:
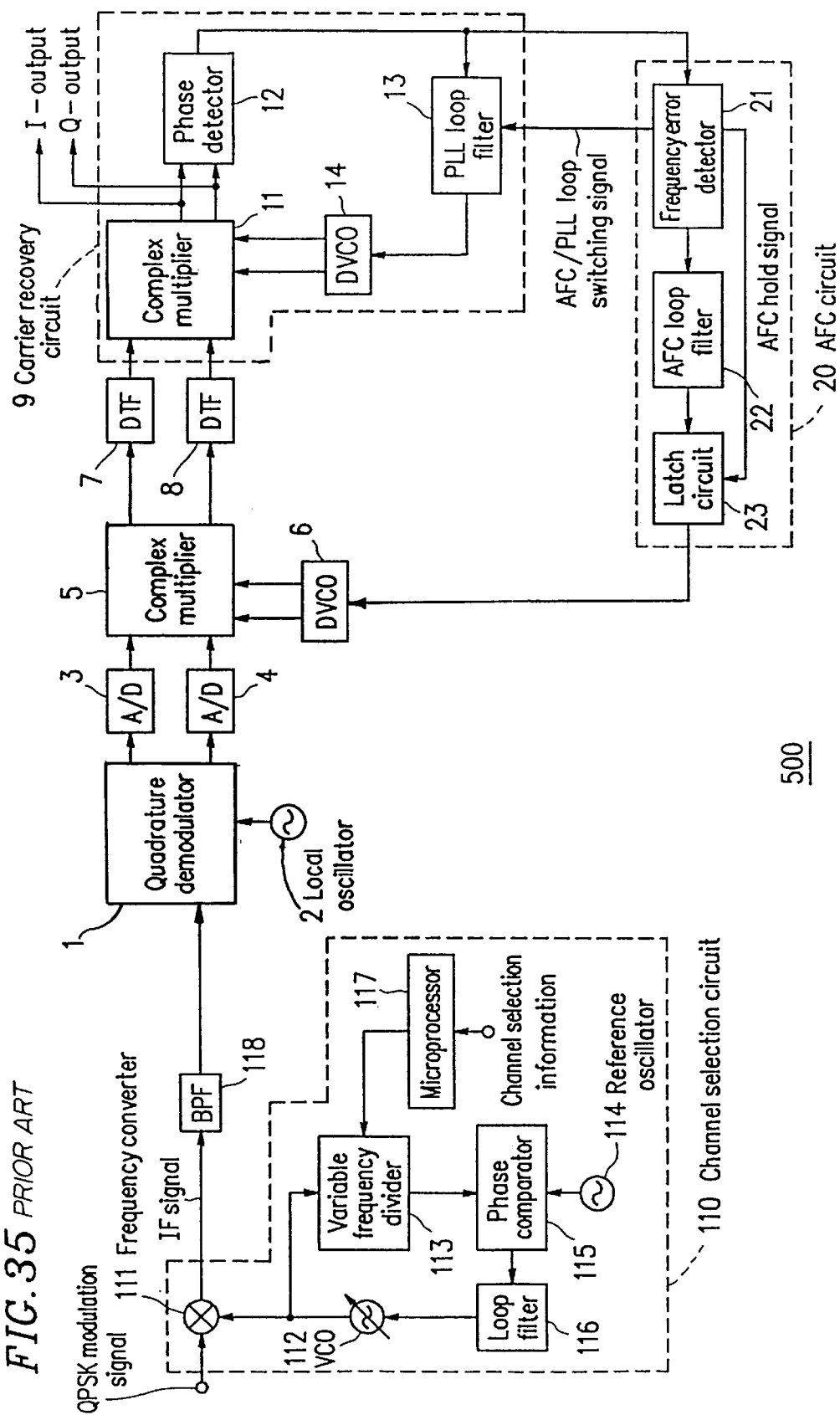
FIG. 35 is a block diagram of a conventional demodulation apparatus.

FIG. 1 is a block diagram, of a demodulation apparatus 510 in a first example according to the present invention. In FIG. 1, the same elements with those in FIG. 35 bear the same reference numerals.

A channel selection circuit 110 includes a frequency converter 111, a VCO 112, a variable frequency divider 113, a reference oscillator 114, a phase comparator 115, a loop filter 116, and a microprocessor 117.

In the channel selection circuit 110, a frequency dividing ratio for the variable frequency divider 113 is set based on channel selection information which is input to the microprocessor 117. The frequency of the VCO 112 is divided by the obtained frequency dividing ratio. A phase difference (phase error) between an output signal from the variable frequency divider 113 and an output signal from the reference oscillator 114 is detected by the phase comparator 115. The detected phase error is smoothed by the loop filter 116 and fedback as a control signal for the VCO 112. Thus, the VCO 112 performs oscillation stably at a frequency which is obtained by multiplying the frequency of the reference oscillator 114 by an integer. Such an integer corresponds to a frequency dividing ratio of the variable frequency divider 113.

A QPSK modulation signal which is input to the channel selection circuit 110 is processed with frequency conversion by the frequency converter 111 to be an IF signal. After an unnecessary spurious component is removed from the IF signal by a BPF 118, the IF signal is input to quadrature demodulator 1. The IF signal is then converted into an I baseband signal and a Q baseband signal based on an output signal from a local oscillator 2. The I baseband signal and the Q baseband signal have a quadrature relationship to each other. The I and Q baseband signals which are generated as analog signals are converted into I and Q baseband signals each having a digital value by A/D converters 3 and 4, respectively. The digital I and Q baseband signals are input to a complex multiplier 5 having a frequency conversion function. Since the complex multiplier 5 is connected to a DVCO 6 having a local oscillation function, the digital I and Q baseband signals are treated with frequency conversion by an operating frequency of the DVCO 6. Then, the I and Q baseband signals have waves thereof shaped by DTFs 7 and 8 and are input to a carrier recovery circuit 9.

The carrier recovery circuit 9 includes a complex multiplier 11, a phase detector 12, a PLL loop filter 13 and a DVCO 14. These elements form a closed loop. The carrier recovery circuit 9 has a function of generating a recovered carrier from the I and Q baseband signals which are input to the complex multiplier 11. When a phase locking is realized in the carrier recovery circuit 9, the recovered I and Q baseband signals are output.

The carrier recovery circuit 9 operates in the following manner.

The I and Q baseband signals which are input to the complex multiplier 11 having a phase rotation function are output after being treated with phase rotation by the DVCO 14 and are input to the phase detector 12. The phase detector 12 detects a phase difference between the input signal and a reference phase and outputs a phase error signal. The phase error signal is smoothed by the PLL loop filter 13 and then input to the DVCO 14. The DVCO 14 outputs a recovered carrier which is in synchronization with the I and Q baseband signals to the complex multiplier 11. Accordingly, the complex multiplier 11 outputs recovered I and Q baseband signals which correspond to a transmitted data included in the QPSK modulation signal.

An AFC circuit 20 includes a frequency error detector 21, an AFC loop filter 22, and a latch circuit 23. The frequency error detector 21 detects a frequency difference between the center frequency of the IF signal and the oscillation frequency of the local oscillator 2 based on the phase error signal sent from the phase detector 12. The frequency error signal is smoothed by the AFC loop filter 22 and input to the DVCO 6 via the latch circuit 23. By the frequency error signal, the operating frequency of the DVCO 6 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the DVCO 6 is held by the latch circuit 23, and thus the DVCO 6 operates at a constant oscillation frequency. Moreover, when the detected frequency error is less than the reference value, an AFC/PLL loop switching signal is supplied to the PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output. The operating frequency of the DVCO 14 is maintained at a constant frequency when the AFC loop operates but the PLL loop does not operate. The constant frequency is usually the zero frequency.

A frequency tracking circuit 10 includes a frequency comparator 16, a selector 17, and an on-off switch 18. In the state where the phase locking is realized in the carrier recovery circuit 9, the DVCO 14 operates at a relatively stable oscillation frequency although a phase noise is superimposed. The frequency comparator 16 compares the operating frequency of the DVCO 14 (including both a positive frequency and a negative frequency) with a positive upper limit (positive reference value) and a negative lower limit (negative reference value) of the frequency, using a signal which is input to a frequency setting terminal 15 of the DVCO 14. The frequency comparator 16 sends a selection signal to the selector 17 corresponding to the comparison result, based on whether the operating frequency is more than the upper limit, less than the lower limit, or within the range between the upper limit and the lower limit. The selector 17 outputs a frequency tracking signal corresponding to the input selection signal. In detail, the frequency tracking signal is a signal for increasing the frequency of the DVCO 6 by a constant value (+δ), a signal for decreasing the frequency of the DVCO 6 by a constant value (−δ), or a signal for maintaining the frequency with no change. The frequency tracking signal is input to an adder 19 through the on-off switch 18, and tracks the oscillation frequency of the DVCO 6. The on-off switch 18 is set to be "ON" only when the carrier recovery circuit 9 is in a phase locking state, and thus the I and Q baseband signals are accurately output.

Even if the frequency of the DVCO 6 changes by the frequency tracking signal, it takes some time for the PLL loop to respond to the change, thus to obtain the stable operation of the carrier recovery circuit 9. Accordingly, in order to maintain the phase locking state of the carrier recovery circuit 9, a sharp and/or significant change of the frequency of the DVCO 6 should be avoided, and the frequency change needs to be smoothed. Such smoothing is realized by reducing the change (γδ) of the frequency of the DVCO 6 or restricting the number of times by which the frequency tracking signal is input to the adder 19 per unit time.

As is described above, the frequency tracking circuit 10 outputs a frequency tracking signal so as to increase the oscillation frequency of the DVCO 6 when the oscillation frequency of the DVCO 14 exceeds the upper limit and so as to decrease the oscillation frequency of the DVCO 6 when the oscillation frequency of the DVCO 14 is less than the lower limit. Accordingly, even if the offset frequency of the IF signal with respect to the oscillation frequency of the local oscillator 2 changes after the AFC circuit 20 stops operating, the oscillation frequency of the DVCO 6 is tracked so as to avoid the spectrum deviation of the signals which are input to the DTFs 7 and 8 from going beyond the frequency range between the upper limit and the lower limit of the frequency comparator 16. As a result, the oscillation frequency of the DVCO 14 is controlled not to go beyond the frequency range between the upper limit and the lower limit (of the frequency comparator 16). In other words, the frequency tracking loop of the demodulation apparatus 510 operates so as to avoid the spectrum deviation of the signals which are input to the DTFs 7 and 8 from going beyond the upper limit or the lower limit.

A frequency detector 119 detects the operating frequency of the DVCO 6 based on the signal input to a frequency setting terminal 27 of the DVCO 6. The operating frequency includes a positive frequency and a negative frequency. Information on the detected operating frequency of the DVCO 6 is sent to the microprocessor 117 in the channel selection circuit 110.

The AFC circuit 20 and the frequency tracking circuit 10 operate the DVCO 6 at a frequency equal to the offset frequency of the IF signal with respect to the oscillation frequency of the local oscillator 2 so as to avoid spectrum deviation of the signals which are input to the DTFs 7 and 8. As a result, the frequency detected by the frequency detector 119 and the offset frequency of the IF signal with respect to the oscillation frequency of the local oscillator 2 have the same value in the range between the upper limit and the lower limit.

The microprocessor 117 corrects the frequency dividing ratio for the variable frequency divider 113 corresponding to the channel selection information based on the frequency information sent from the frequency detector 119. In detail, the frequency detected by the frequency detector 119 is approximated with a value obtained by multiplying a minimum frequency control width of the VCO 112 by an integer, and the frequency dividing ratio is offset in a positive direction or a negative direction based on the value obtained by the approximation. By offsetting the frequency dividing ratio, the frequency deviation of the QPSK modulation signal from the predetermined frequency is compensated for by the channel selection circuit 110. As a result, the offset frequency of the IF signal with respect to the oscillation frequency of the local oscillator 2 is restricted to a frequency range which is substantially the same as the frequency range obtained by superimposing the upper limit or the lower limit of the frequency comparator 16 on the frequency of the reference oscillator 114.

For example, in the case where the frequency of the reference oscillator 114 is set to be at approximately 250 kHz in a demodulation apparatus for satellite broadcasting, the upper limit or the lower limit is typically set to be approximately 10 kHz. By such setting, the offset frequency of the IF signal with respect to the oscillation frequency of the local oscillator 2 is restricted to approximately ±115 to 135 kHz (=±250 kHz/2±10 kHz) or less.

In the demodulation apparatus 510 shown in FIG. s1, even if the offset frequency of the IF signal with respect to the oscillation frequency of the local oscillator 2 changes by a drift of the center frequency of the QPSK modulation signal or the oscillation frequency of the local oscillator 2 after the operation of the AFC circuit 20 is stopped by the AFC hold signal, the spectrum deviation of the I and Q baseband signals which are input to the DTFs 7 and 8 can be restricted within the range between the upper limit and the lower limit (of the frequency comparator 16) by tracking the frequency of the DVCO 6 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the DVCO 6 is performed slowly while the phase locking of the carrier recovery circuit 9 is maintained, the deterioration in the error rate caused by the frequency tracking of the DVCO 6 is restricted. Moreover, the frequency tracking of the DVCO 6 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the DVCO 6 can be substantially eliminated. Thus, demodulation characteristics are not deteriorated by the operation of the frequency tracking circuit 10.

Even if the QPSK modulation signal is significantly offset from the prescribed frequency, the offset frequency of the IF signal with respect to the oscillation frequency of the local oscillator 2 can be compensated for whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 2

Figure 2:
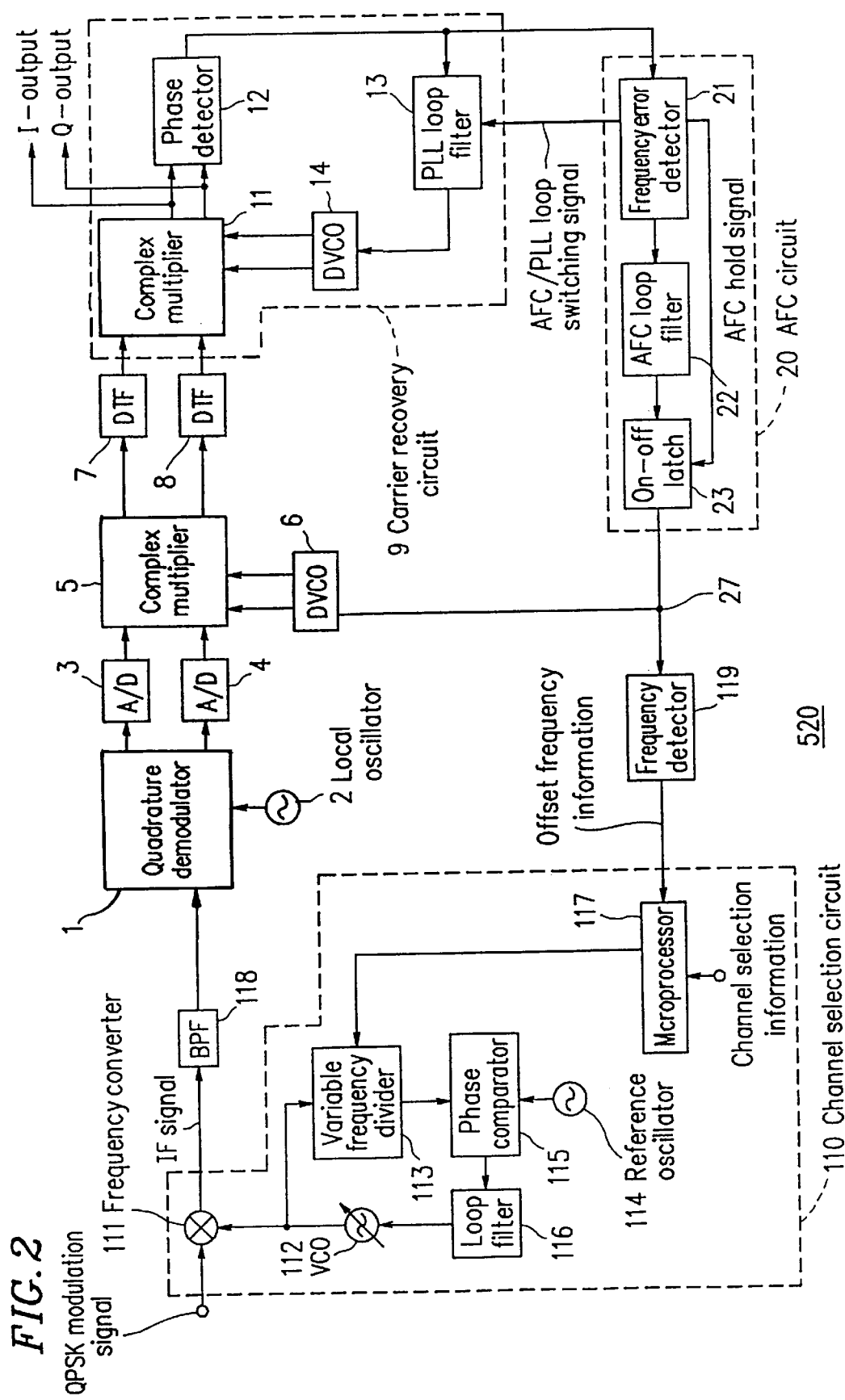
FIG. 2 is a block diagram of a demodulation apparatus in a second example according to the present invention.

FIG. 2 is a block diagram of a demodulation apparatus 520 in a second example according to the present invention.

In the demodulation apparatus 510 shown in FIG. 1, frequency control is performed in two systems, namely, the frequency tracking circuit 10 and the AFC circuit 20 for phase locking. In the demodulation apparatus 520 shown in FIG. 2, the frequency control is performed only in the AFC circuit 20. The same elements as those in FIG. 1 bear the same reference numerals, and detailed description thereof will be omitted.

In the demodulation apparatus 520, even if the QPSK modulation signal is significantly offset from a prescribed frequency, the offset frequency of the IF signal with respect to the oscillation frequency of the local oscillator 2 can be compensated for to a value which is substantially the same as the oscillation frequency of the reference oscillator 114 whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 3

Figure 3:
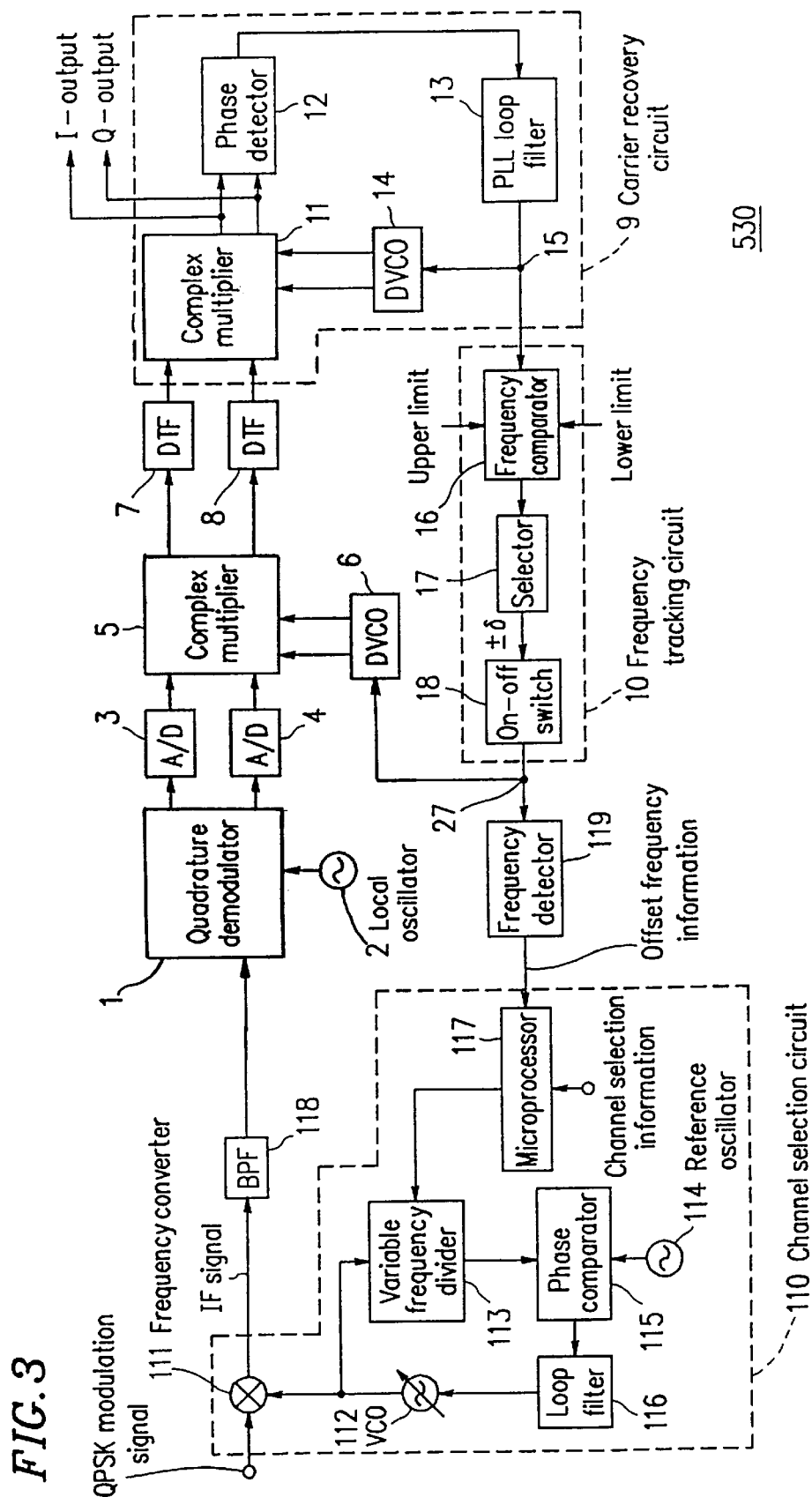
FIG. 3 is a block diagram of a demodulation apparatus in a third example according to the present invention.

FIG. 3 is a block diagram of a demodulation apparatus 530 in a third example according to the present invention.

In the demodulation apparatus 510 shown in FIG. 1, frequency control is performed in two systems, namely, the frequency tracking circuit 10 and the AFC circuit 20 for phase locking. In the demodulation apparatus 530 shown in FIG. 3, the frequency control is performed only in the frequency tracking circuit 10. The same elements as those in FIG. 1 bear the same reference numerals, and detailed description thereof will be omitted.

In the demodulation apparatus 530, even if the QPSK modulation signal is significantly offset from a prescribed frequency, the offset frequency of the IF signal with respect to the oscillation frequency of the local oscillator 2 can be compensated for whichever channel is selected when the frequency detector 119 detects the offset frequency. Such compensation is realized by superimposing the offset frequency on the frequency dividing ratio of the variable frequency divider 113. The offset frequency is restricted within an oscillation frequency range of the reference oscillator 114. Accordingly, by setting the frequency range which can be pulled in by the carrier recovery circuit 9 to be slightly larger than the oscillation frequency of the reference oscillator 114, phase locking is realized with certainty in the carrier recovery circuit 9 even if the selected channel is changed, and problems such as extension of channel selection time are avoided.

Further, even if the offset frequency of the IF signal with respect to the oscillation frequency of the local oscillator 2 gradually changes during the operation of the demodulation apparatus 530, the spectrum deviation of the I and Q baseband signals which are input to the DTFs 7 and 8 can be restricted within the range between the upper limit and the lower limit (of the frequency comparator 16) by tracking the frequency of the DVCO 6 while maintaining the phase locking state of the carrier recovery circuit 9. Accordingly, the deterioration in the error rate caused by the spectrum deviation of the I and Q baseband signals which are input to the DTFs 7 and 8 can be restricted to a value corresponding to the upper and the lower limits or less.

EXAMPLE 4

Figure 4:
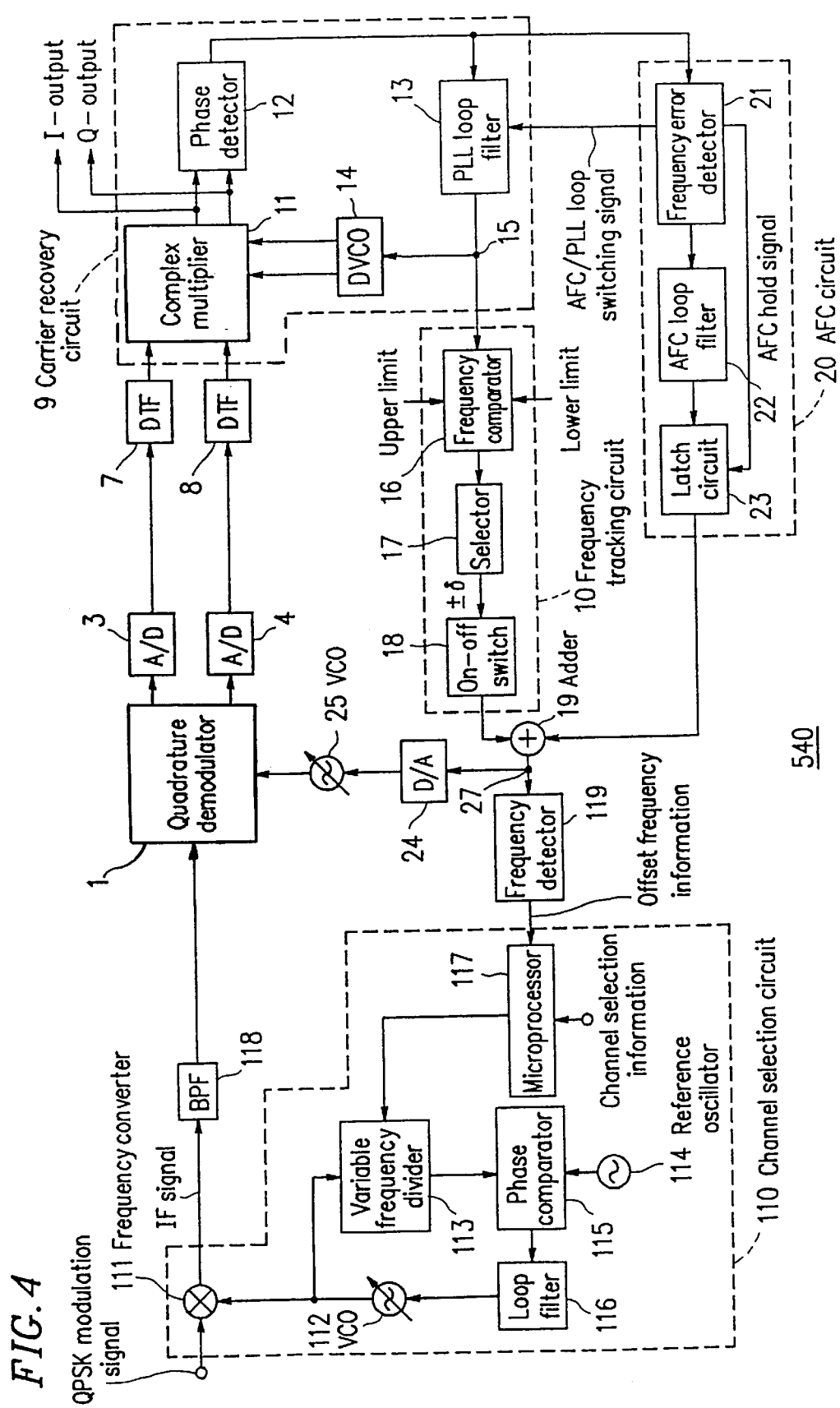
FIG. 4 is a block diagram of a demodulation apparatus in a fourth example according to the present invention.

FIG. 4 is a block diagram of a demodulation apparatus 540 in a fourth example according to the present invention.

The same elements as those in FIG. 1 bear the same reference numerals, and detailed description thereof will be omitted.

A QPSK modulation signal which is input to a channel selection circuit 110 is processed with frequency conversion by a frequency converter 111 to be an IF signal. After an unnecessary spurious component is removed from the IF signal by a BPF 118, the IF signal is input to a quadrature demodulator 1. The configuration and the functions of the channel selection circuit 110 are the same as those in the demodulation apparatus 510 in FIG. 1, and detailed description thereof will be omitted here.

The IF signal is then converted into an I baseband signal and a Q baseband signal based on an output signal from a VCO 25. The I and Q baseband signals have a quadrature relationship to each other. The I and Q baseband signals which are generated as analog signals are converted into I and Q baseband signals each having a digital value by A/D converters 3 and 4, respectively. The digital I and Q baseband signals respectively have waves thereof shaped by DTFs 7 and 8 and are input to a carrier recovery circuit 9. The configuration and the functions of the carrier recovery circuit 9 are the same as those in the demodulation apparatus 510 in FIG. 1, and detailed description thereof will be omitted here.

An AFC circuit 20, as in the demodulation apparatus 510 shown in FIG. 1, includes a frequency error detector 21, an AFC loop filter 22, and a latch circuit 23. The frequency error detector 21 detects a frequency difference between the center frequency of the IF signal and the oscillation frequency of the VCO 25 based on the phase error signal sent from a phase detector 12. The frequency error is smoothed by the AFC loop filter 22 and sent to a D/A converter 24 via the latch circuit 23 and an adder 19 to be converted into an analog signal. The resultant analog signal is input to the VCO 25 as a control signal. Thus, the operating frequency of the VCO 25 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the VCO 25 is held by the latch circuit 23, and thus the VCO 25 operates at a constant oscillation frequency. Moreover, when the detected frequency error is less than the reference value, an AFC/PLL loop switching signal is supplied to the PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output. The operating frequency of a DVCO 14 is maintained at a constant frequency when the AFC loop operates but the PLL loop does not operate. The constant frequency is usually the zero frequency.

The configuration and the functions of the frequency tracking circuit 10 are basically the same as those in the demodulation apparatus 510 in FIG. 1, except that the oscillation frequency of the VCO 25 is tracked in the demodulation apparatus 540 although the oscillation frequency of the DVCO 6 is tracked in the demodulation apparatus 510. The same elements as those in FIG. 1 bear the same reference numerals, and detailed description thereof will be omitted.

A frequency detector 119 detects the frequency deviation of the oscillation frequency of the VCO 25 from a prescribed frequency, namely, an offset frequency of the VCO 25 based on the digital signal input to a frequency setting terminal 27 of the VCO 25. Information on the detected offset frequency of the VCO 25 is sent to a microprocessor 117 in the channel selection circuit 110.

The AFC circuit 20 and the frequency tracking circuit 10 operate the VCO 25 at a frequency which is equal to the center frequency of the IF signal so as to avoid spectrum deviation of the signals which are input to the DTFs 7 and 8. As a result, the frequency detected by the frequency detector 119 and the offset frequency of the IF signal with respect to the prescribed frequency are substantially equal to each other.

The microprocessor 117 corrects the frequency dividing ratio for a variable frequency divider 113 corresponding to the channel selection information based on the frequency information sent from the frequency detector 119. In detail, the frequency detected by the frequency detector 119 is approximated with a value obtained by multiplying a minimum frequency control width of a VCO 112 by an integer, and the frequency dividing ratio is offset in a positive direction or a negative direction based on the value obtained by the approximation. By offsetting the frequency dividing ratio, the frequency deviation of the QPSK modulation signal from the prescribed frequency is compensated for by the channel selection circuit 110. As a result, the offset frequency of the IF signal with respect to the oscillation frequency of the VCO 25 is restricted to a frequency range which is substantially the same as the frequency of the reference oscillator 114.

In the demodulation apparatus 540 shown in FIG. 4, even if the offset frequency of the IF signal with respect to the oscillation frequency of the VCO 25 operating at a constant hold frequency changes by a drift of the center frequency of the QPSK modulation signal after the operation of the AFC circuit 20 is stopped by the AFC hold signal, the spectrum deviation of the I and Q baseband signals which are input to the DTFs 7 and 8 can be restricted within the range between the upper limit and the lower limit (of the frequency comparator 16) by tracking the oscillation frequency of the VCO 25 by the frequency tracking circuit 10 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the VCO 25 is performed slowly while the phase locking of the carrier recovery circuit 9 is maintained, the deterioration in the error rate caused by the frequency tracking of the VCO 25 is restricted. Moreover, the frequency tracking of the VCO 25 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the VCO 25 can be substantially eliminated. Thus, demodulation characteristics are not deteriorated by the operation of the frequency tracking circuit 10.

Even if the QPSK modulation signal is significantly offset from the prescribed frequency, the offset frequency of the IF signal with respect to the oscillation frequency of the VCO 25 can be compensated for whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 5

Figure 5:
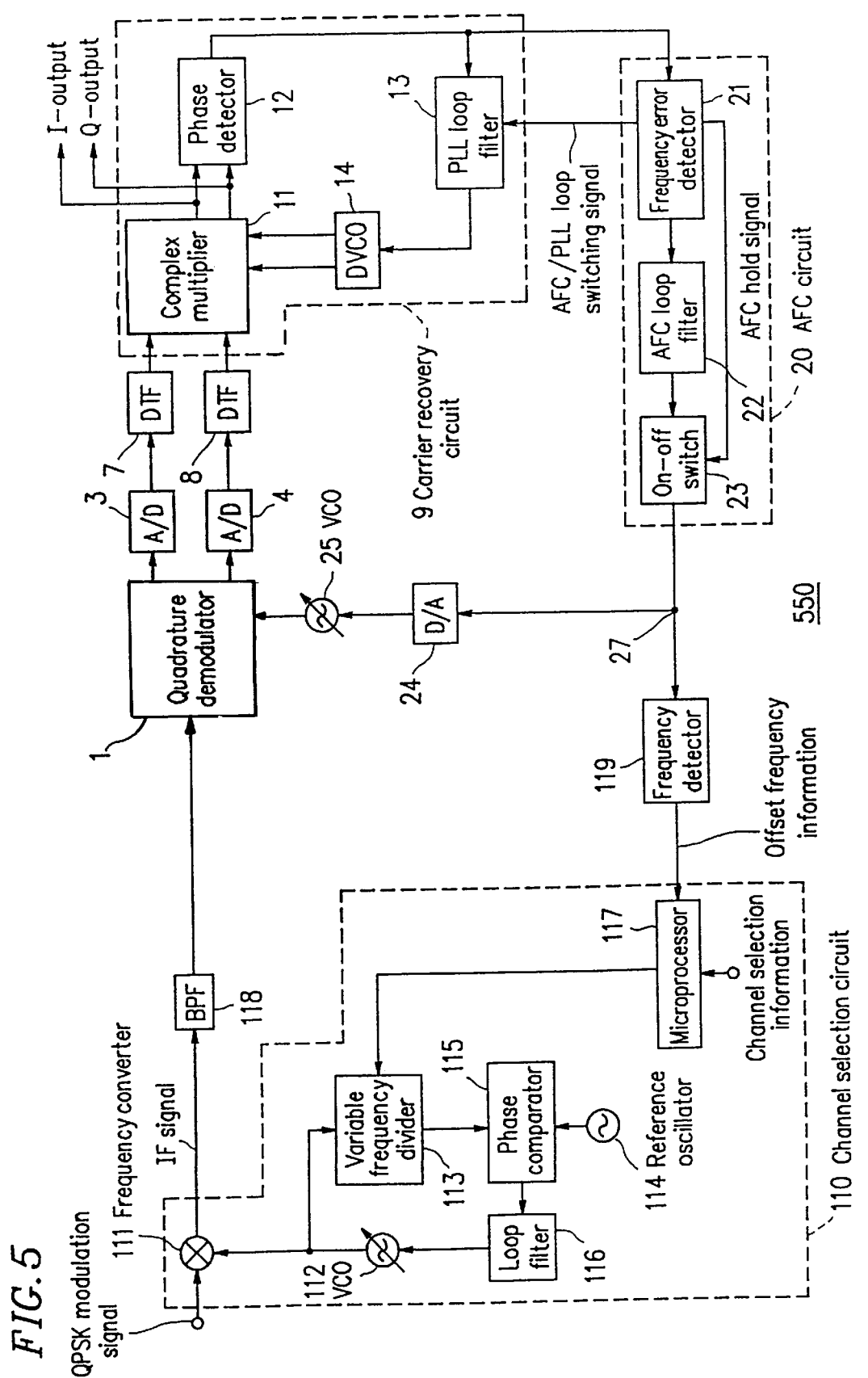
FIG. 5 is a block diagram of a demodulation apparatus in a fifth example according to the present invention.

FIG. 5 is a block diagram of a demodulation apparatus 550 in a fifth example according to the present invention.

In the demodulation apparatus 540 shown in FIG. 4, frequency control is performed in two systems, namely, the frequency tracking circuit 10 and the AFC circuit 20 for phase locking. In the demodulation apparatus 550 shown in FIG. 5, the frequency control is performed only in the AFC circuit 20. The same elements as those in FIG. 4 bear the same reference numerals, and detailed description thereof will be omitted.

In the demodulation apparatus 550, even if the QPSK modulation signal is significantly offset from a frequency, the offset frequency of the IF signal with respect to the oscillation frequency of the VCO 25 can be compensated for to a value which is substantially the same as the oscillation frequency of the reference oscillator 114 whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 6

Figure 6:
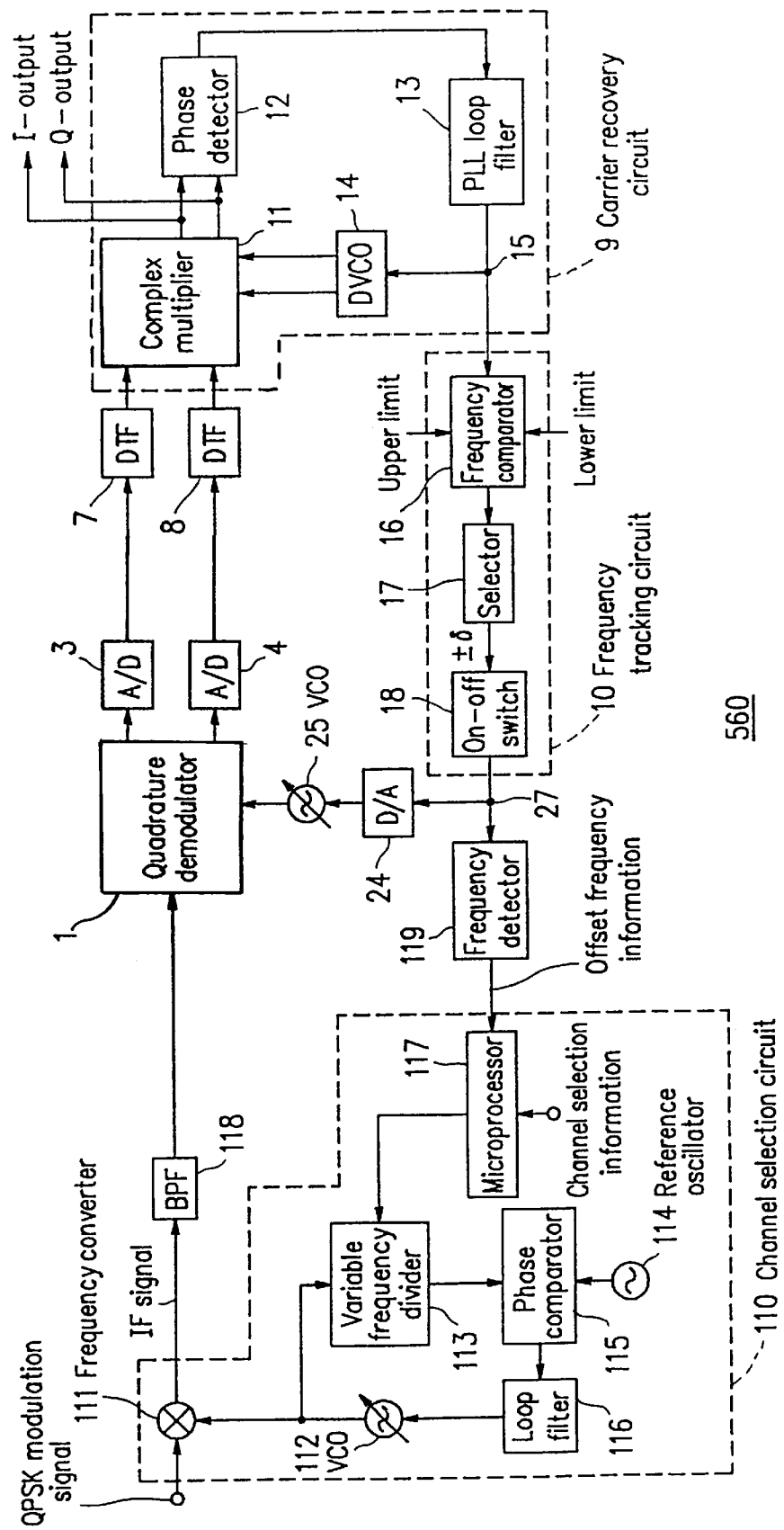
FIG. 6 is a block diagram of a demodulation apparatus in a sixth example according to the present invention.

FIG. 6 is a block diagram of a demodulation apparatus 560 in a sixth example according to the present invention.

In the demodulation apparatus 540 shown in FIG. 4, frequency control is performed in two systems, namely, the frequency tracking circuit 10 and the AFC circuit 20 for phase locking. In the demodulation apparatus 560 shown in FIG. 6, the frequency control is performed only in the frequency tracking circuit 10. The same elements as those in FIG. 4 bear the same reference numerals, and detailed description thereof will be omitted.

In the demodulation apparatus 560, even if the QPSK modulation signal is significantly offset from a predetermined frequency, the offset frequency of the IF signal with respect to the oscillation frequency of the VCO 25 can be compensated for whichever channel is selected when the frequency detector 119 detects the offset frequency. Such compensation is realized by superimposing the offset frequency on the frequency dividing ratio of the variable frequency divider 113. The offset frequency is restricted within a frequency range of the reference oscillator 114. Accordingly, by setting the frequency range which can be pulled in by the carrier recovery circuit 9 to be slightly larger than the oscillation frequency of the reference oscillator 114, phase locking is realized with certainty in the carrier recovery circuit 9 even if the selected channel is changed, and problems such as extension of channel selection time are avoided.

Further, even if the offset frequency of the IF signal with respect to the oscillation frequency of the VCO 25 gradually changes during the operation of the demodulation apparatus 560, the spectrum deviation of the I and Q baseband signals which are input to the DTFs 7 and 8 can be restricted within the range between the upper limit and the lower limit (of the frequency comparator 16) by tracking the oscillation frequency of the VCO 25 while maintaining the phase locking state of the carrier recovery circuit 9. Accordingly, the deterioration in the error rate caused by the spectrum deviation of the I and Q baseband signals which are input to the DTFs 7 and 8 can be restricted to a value corresponding to the upper and the lower limits or less.

EXAMPLE 7

Figure 7:
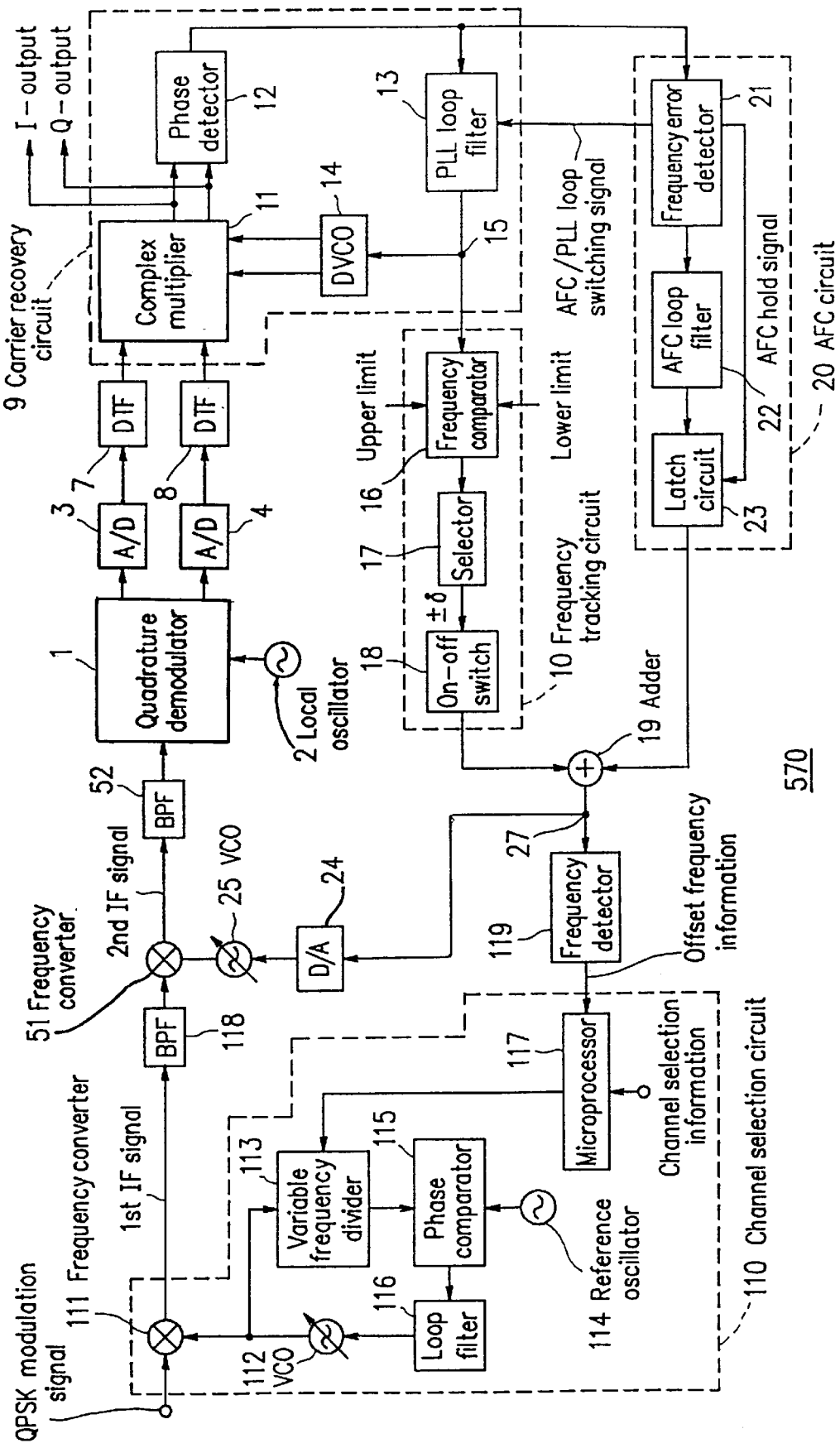
FIG. 7 is a block diagram of a demodulation apparatus in a seventh example according to the present invention.

FIG. 7 is a block diagram of a demodulation apparatus 570 in a seventh example according to the present invention. The same elements as those in FIGS. 1 and 4 bear the same reference numerals, and detailed description thereof will be omitted.

A QPSK modulation signal which is input to a channel selection circuit 110 is processed with frequency conversion by a frequency converter 111 to be a first IF signal. After an unnecessary spurious component is removed from the IF signal by a BPF 118, the IF signal is input to a frequency converter 51. The configuration and the functions of the channel selection circuit 110 are the same as those in the demodulation apparatus 510 in FIG. 1 and the demodulation apparatus 540 in FIG. 4, and detailed description thereof will be omitted here.

The first IF signal is converted into a second IF signal by the frequency converter 51 and a VCO 25. The resultant second IF signal is input to a quadrature demodulator 1 via a BPF 52. The second IF signal is then converted into an I baseband signal and a Q baseband signal based on an output signal from a local oscillator 2. The I baseband signal and the Q baseband signal have quadrature relationship to each other. The I and Q baseband signals which are generated as analog signals are converted into I and Q baseband signals each having a digital value by A/D converters 3 and 4, respectively. The digital I and Q baseband signals respectively have waves thereof shaped by DTFs 7 and 8 and are input to a carrier recovery circuit 9. The configuration and the functions of the carrier recovery circuit 9 are the same as those in the demodulation apparatus 510 in FIG. 1 and the demodulation apparatus 540 in FIG. 4, and detailed description thereof will be omitted here.

An AFC circuit 20, as in the demodulation apparatus 510 shown in FIG. 1 and the demodulation apparatus 540 shown in FIG. 4, includes a frequency error detector 21, an AFC loop filter 22, and a latch circuit 23. The frequency error detector 21 detects a frequency difference between the center frequency of the second IF signal and the oscillation frequency of the local oscillator 2 based on the phase error signal sent from a phase detector 12. The frequency error is smoothed by the AFC loop filter 22 and sent to a D/A converter 24 via the latch circuit 23 and an adder 19 to be converted into an analog signal. The resultant analog signal is input to a VCO 25 as a control signal. Thus, the oscillation frequency of the VCO 25 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the VCO 25 is held by the latch circuit 23, and thus the VCO 25 operates at a constant oscillation frequency. When the detected frequency error is less than the reference value, an AFC/PLL loop switching signal is supplied to a PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output. The operating frequency of the DVCO 14 is maintained at a constant frequency when the AFC loop operates but the PLL loop does not operate. The constant frequency is usually the zero frequency.

The configuration and the functions of a frequency tracking circuit 10 of this example are basically the same as those in the demodulation apparatus 510 in FIG. 1, except that the oscillation frequency of the VCO 25 is tracked in the demodulation apparatus 570 although the oscillation frequency of the DVCO 6 is tracked in the demodulation apparatus 510. The same elements as those in FIGS. 1 and 4 bear the same reference numerals, and detailed description thereof will be omitted.

A frequency detector 119 detects the frequency deviation of the oscillation frequency of the VCO 25 from a prescribed frequency, namely, an offset frequency of the VCO 25 based on the digital signal input to a frequency setting terminal 27 of the VCO 25. Information on the detected offset frequency of the VCO 25 is sent to a microprocessor 117 in the channel selection circuit 110.

The AFC circuit 20 and the frequency tracking circuit 10 operate the VCO 25 so that the center frequency of the second IF signal will be equal to the oscillation frequency of the local oscillator 2 so as to avoid spectrum deviation of the signals which are input to the DTFs 7 and 8. As a result, the frequency detected by the frequency detector 119 and the offset frequency of the second IF signal with respect to the oscillation frequency of the local oscillator 2 are substantially equal to each other.

The microprocessor 117 corrects the frequency dividing ratio for a variable frequency divider 113 corresponding to the channel selection information based on the frequency information sent from the frequency detector 119. In detail, the frequency detected by the frequency detector 119 is approximated with a value obtained by multiplying a minimum frequency control width of the VCO 112 by an integer, and the frequency dividing ratio is offset in a positive direction or a negative direction based on the value obtained by the approximation. By offsetting the frequency dividing ratio, the frequency deviation of the QPSK modulation signal from the prescribed frequency is compensated for by the channel selection circuit 110. As a result, the offset frequency of the second IF signal with respect to the oscillation frequency of the local oscillator 2 is restricted to a frequency range which is substantially the same as the frequency of a reference oscillator 114.

In the demodulation apparatus 570 shown in FIG. 7, even if the offset frequency of the second IF signal with respect to the oscillation frequency of the local oscillator 2 changes by a drift of the center frequency of the QPSK modulation signal after the operation of the AFC circuit 20 is stopped by the AFC hold signal, the spectrum deviation of the I and Q baseband signals which are input to the DTFs 7 and 8 can be restricted within the range between the upper limit and the lower limit (of a frequency comparator 16) by tracking the oscillation frequency of the VCO 25 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the VCO 25 is performed slowly while the phase locking of the carrier recovery circuit 9 is maintained, the deterioration in the error rate caused by the frequency tracking of the VCO 25 is restricted. Moreover, the frequency tracking of the VCO 25 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the VCO 25 can be substantially eliminated. Thus, demodulation characteristics are not deteriorated by the operation of the frequency tracking circuit 10.

Even if the QPSK modulation signal is significantly offset from the frequency, the offset frequency of the second IF signal with respect to the oscillation frequency of the local oscillator 2 can be compensated for whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 8

Figure 8:
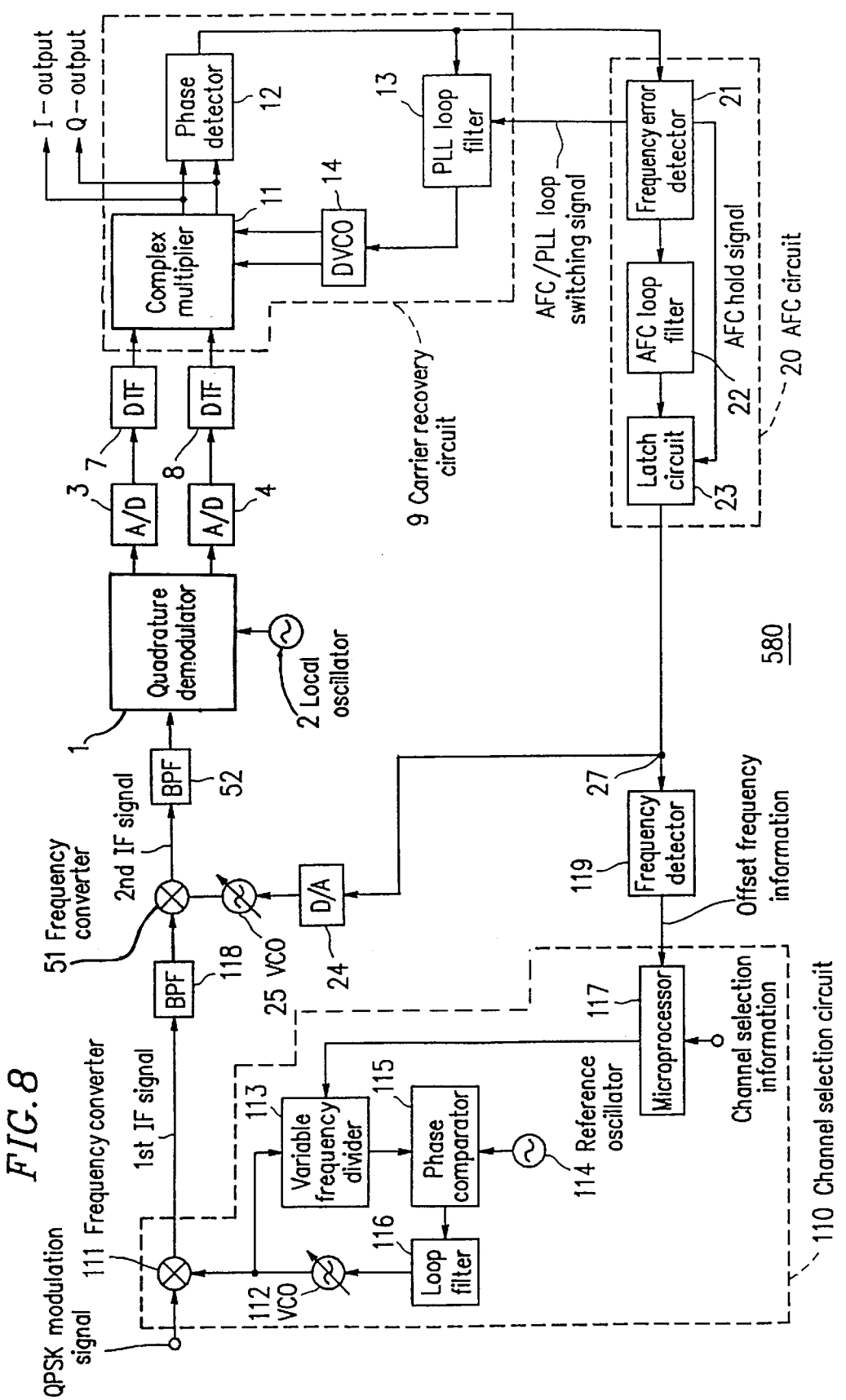
FIG. 8 is a block diagram of a demodulation apparatus in an eighth example according to the present invention.

FIG. 8 is a block diagram of a demodulation apparatus 580 in an eighth example according to the present invention.

In the demodulation apparatus 570 shown in FIG. 7, frequency control is performed in two systems, namely, the frequency tracking circuit 10 and the AFC circuit 20 for phase locking. In the demodulation apparatus 580 shown in FIG. 8, the frequency control is performed only in the AFC circuit 20. The same elements as those in FIG. 7 bear the same reference numerals, and detailed description thereof will be omitted.

In the demodulation apparatus 580, even if the QPSK modulation signal is significantly offset from a prescribed frequency, the offset frequency of the second IF signal with respect to the oscillation frequency of the local oscillator 2 can be compensated for to a value which is substantially the same as the oscillation frequency of the reference oscillator 114 whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 9

Figure 9:
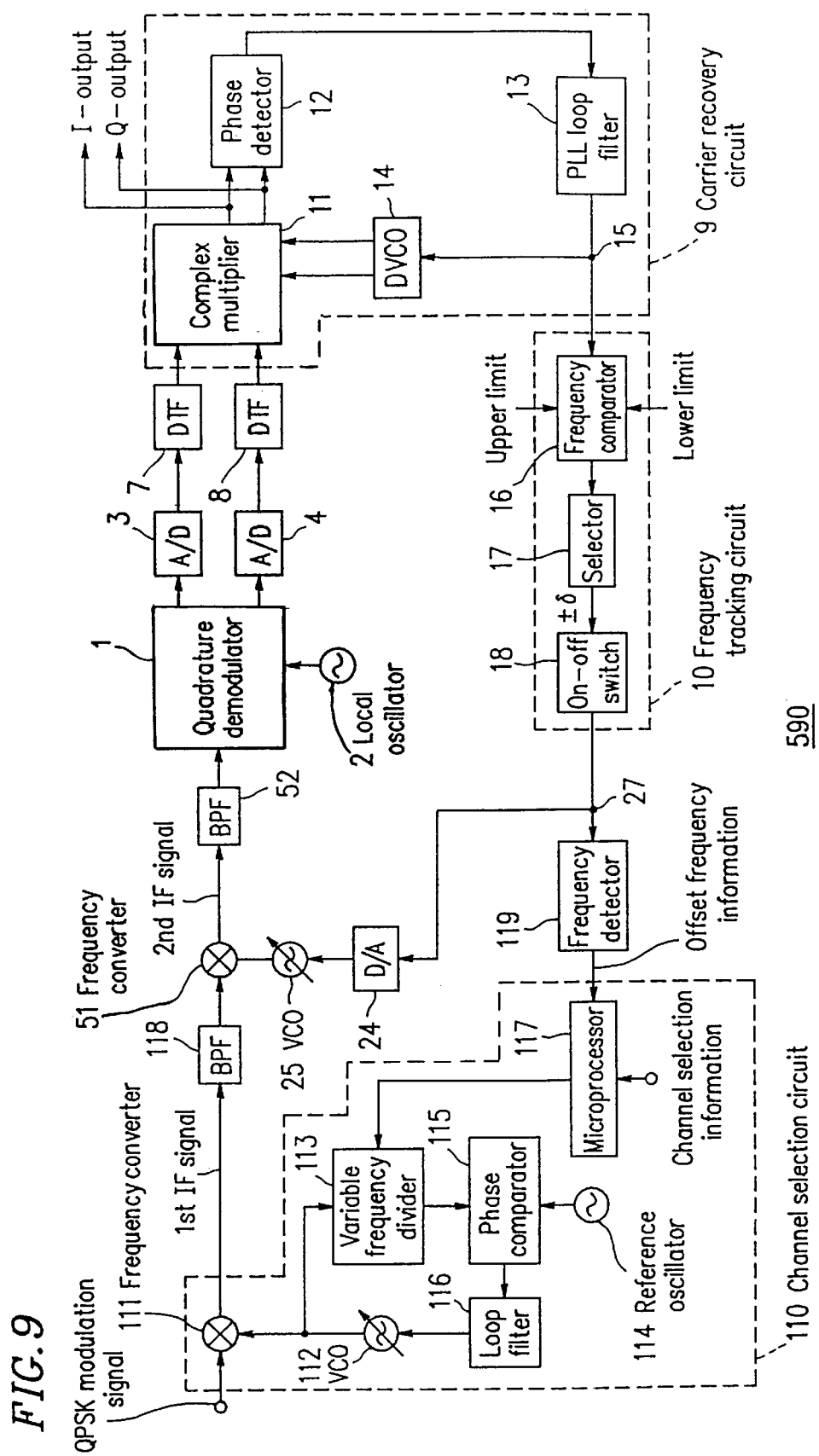
FIG. 9 is a block diagram of a demodulation apparatus in a ninth example according to the present invention.

FIG. 9 is a block diagram of a demodulation apparatus 590 in a ninth example according to the present invention.

In the demodulation apparatus 570 shown in FIG. 7, frequency control is performed in two systems, namely, the frequency tracking circuit 10 and the AFC circuit 20 for phase locking. In the demodulation apparatus 590 shown in FIG. 9, the frequency control is performed only in the frequency tracking circuit 10. The same elements as those in FIG. 7 bear the same reference numerals, and detailed description thereof will be omitted.

In the demodulation apparatus 590, even if the QPSK modulation signal is significantly offset from a prescribed frequency, the offset frequency of the second IF signal with respect to the oscillation frequency of a local oscillator 2 can be compensated for whichever channel is selected when the frequency detector 119 detects the offset frequency. Such compensation is realized by superimposing the offset frequency on the frequency dividing ratio of the variable frequency divider 113. The offset frequency is restricted within a frequency range of the reference oscillator 114. Accordingly, by setting the frequency range which can be pulled in by the carrier recovery circuit 9 to be slightly larger than the oscillation frequency of the reference oscillator 114, phase locking is realized with certainty in the carrier recovery circuit 9 even if the selected channel is changed, and problems such as extension of channel selection time are avoided.

Further, even if the offset frequency of the second IF signal with respect to the oscillation frequency of the local oscillator 2 gradually changes during the operation of the demodulation apparatus 590, the frequency of the second IF signal is prevented from offsetting with respect to the oscillation frequency of the local oscillator 2 and thus spectrum deviation of the I and Q baseband signals which are input to the DTFs 7 and 8 can be restricted within the range between the upper limit and the lower limit (of the frequency comparator 16) by tracking the frequency of the VCO 25 while maintaining the phase locking state of the carrier recovery circuit 9. Accordingly, the deterioration in the error rate caused by the spectrum deviation of the I and Q baseband signals which are input to the DTFs 7 and 8 can be restricted to a value corresponding to the upper and the lower limits or less.

EXAMPLE 10

Figure 10:
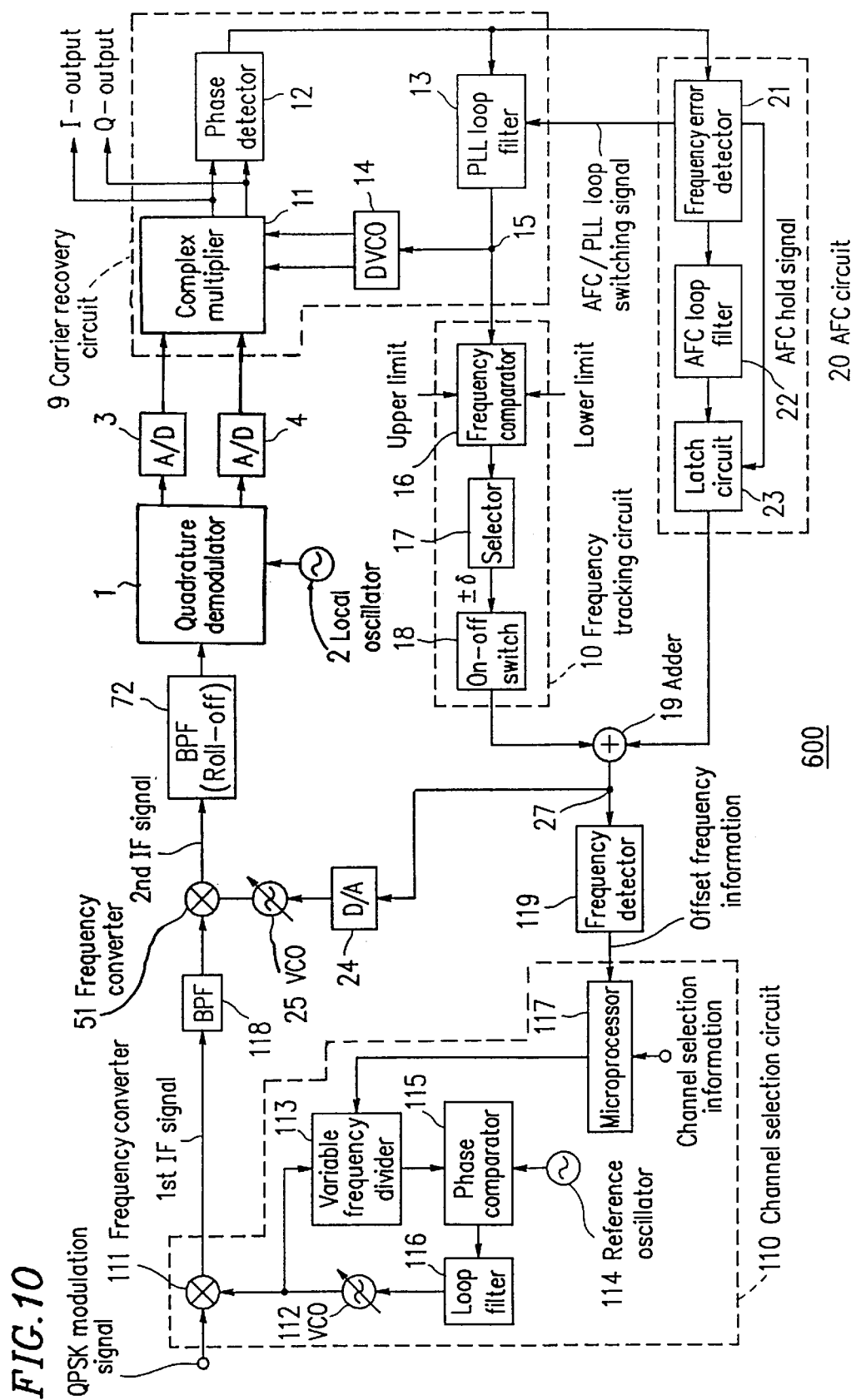
FIG. 10 is a block diagram of a demodulation apparatus in a tenth example according to the present invention.

FIG. 10 is a block diagram of a demodulation apparatus 600 in a tenth example according to the present invention. The same elements as those in FIGS. 1, 4 and 7 bear the same reference numerals, and detailed description thereof will be omitted. In the demodulation apparatus 570 in FIG. 7, the DTFs 7 and 8 have a wave-shaping function. In the demodulation apparatus 600 shown in FIG. 10, a BPF 72 has a wave-shaping function, and the center frequency of the BPF 72 is selected to be equal to the oscillation frequency of a local oscillator 2.

In the demodulation apparatus 600 shown in FIG. 10, even if the offset frequency of the second IF signal with respect to the oscillation frequency of the local oscillator 2 or the center frequency of the BPF 72 changes by a drift of the center frequency of the QPSK modulation signal or the oscillation frequency of the VCO 25 after the operation of the AFC circuit 20 is stopped by the AFC hold signal, the spectrum deviation of the second IF signal which is input to the BPF 72 can be restricted within the range between the upper limit and the lower limit (of the frequency comparator 16) by tracking the oscillation frequency of the VCO 25 by the frequency tracking circuit 10 while maintaining the phase locking state of the carrier recovery circuit 9. By such operation, the deterioration in the error rate caused by the spectrum deviation of the second IF signal which is input to the BPF 72 can be restricted to a value corresponding to the upper and lower limits or less.

Even if the QPSK modulation signal is significantly offset from a prescribed frequency, the offset frequency of the first IF signal with respect to the prescribed frequency can be compensated for whichever channel is selected when the frequency detector 119 detects the offset frequency. Such compensation is realized by superimposing the offset frequency on the frequency dividing ratio of the variable frequency divider 113. Thus, the frequency deviation of the second IF signal with respect to the oscillation frequency of the local oscillator 2 can be restricted down to the frequency of the reference oscillator 114 or less. Accordingly, even if the offset frequency increases, problems such as inferior operation of the AFC circuit 20 and extension of pull in time of the frequency of the AFC circuit 20 are avoided.

Further, since the BPF 72 has a wave-shaping function, the ability of eliminating an interference signal on adjacent channels is improved, and thus an error rate characteristic of the demodulation apparatus 600 are not deteriorated.

EXAMPLE 11

Figure 11:
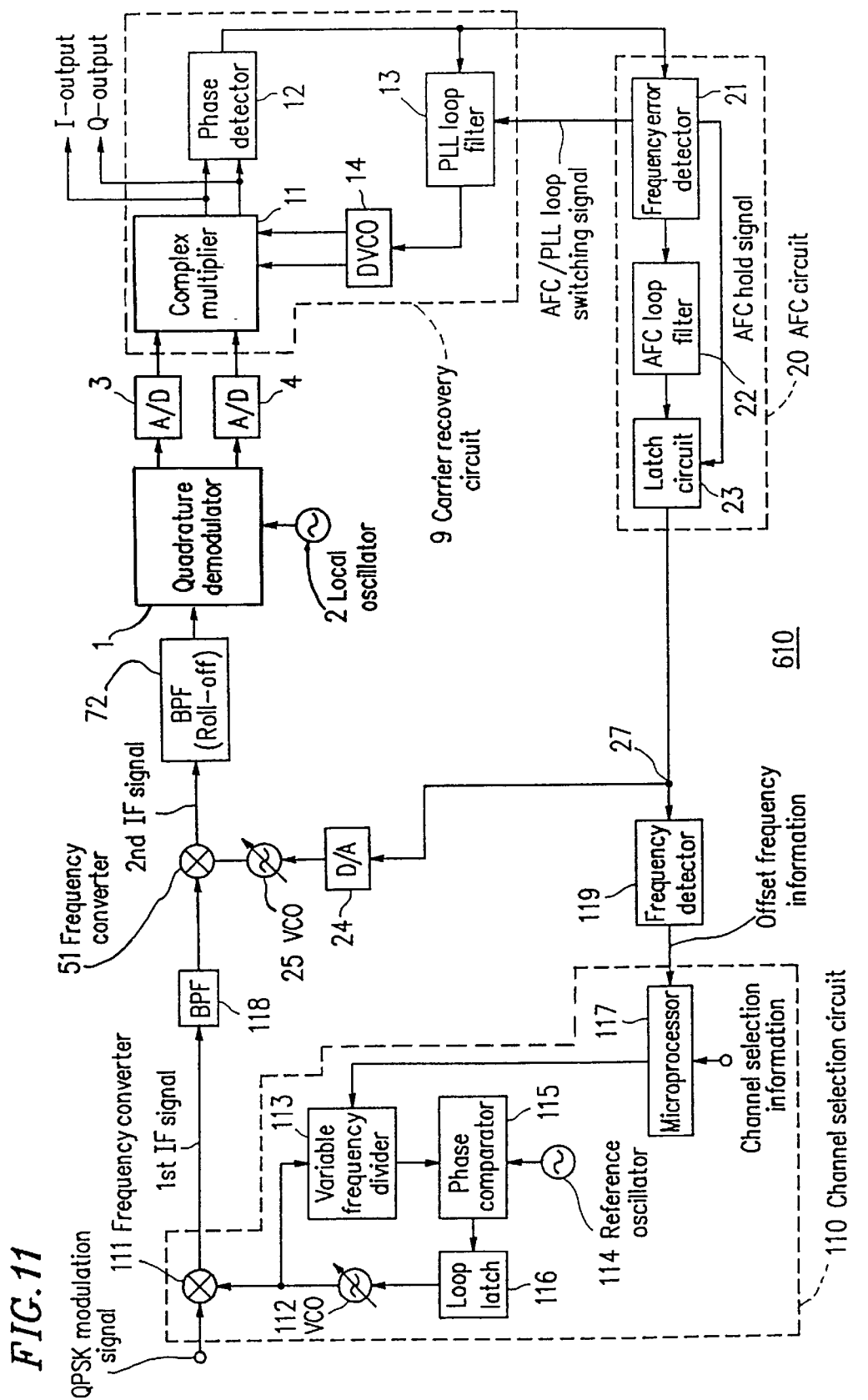
FIG. 11 is a block diagram of a demodulation apparatus in an eleventh example according to the present invention.

FIG. 11 is a block diagram of a demodulation apparatus 610 in an eleventh example according to the present invention.

The demodulation apparatus 610 has the features of both the demodulation apparatus 580 shown in FIG. 8 and the demodulation apparatus 600 shown in FIG. 10. Accordingly, the functions and effects of the demodulation apparatus 610 are substantially the same as those in the demodulation apparatuses 580 and 600 except that the ability of eliminating an interference signal on adjacent channels is further improved in the demodulation apparatus 610.

In the demodulation apparatus 580 in FIG. 8, the DTFs 7 and 8 have a wave-shaping function; whereas in the demodulation apparatus 610 in FIG. 11, the BPF 72 has a wave-shaping function, and the center frequency of the BPF 72 is selected to be equal to the oscillation frequency of the local oscillator 2. Further, in the demodulation apparatus 600 in FIG. 10, frequency control is performed in the two systems, namely, in the frequency tracking circuit 10 and the AFC circuit 20; whereas in the demodulation apparatus 610 in FIG. 11, frequency control is performed only in the AFC circuit 20.

The same elements as those in FIGS. 8 and 10 bear the same reference numerals, and detailed description thereof will be omitted.

EXAMPLE 12

Figure 12:
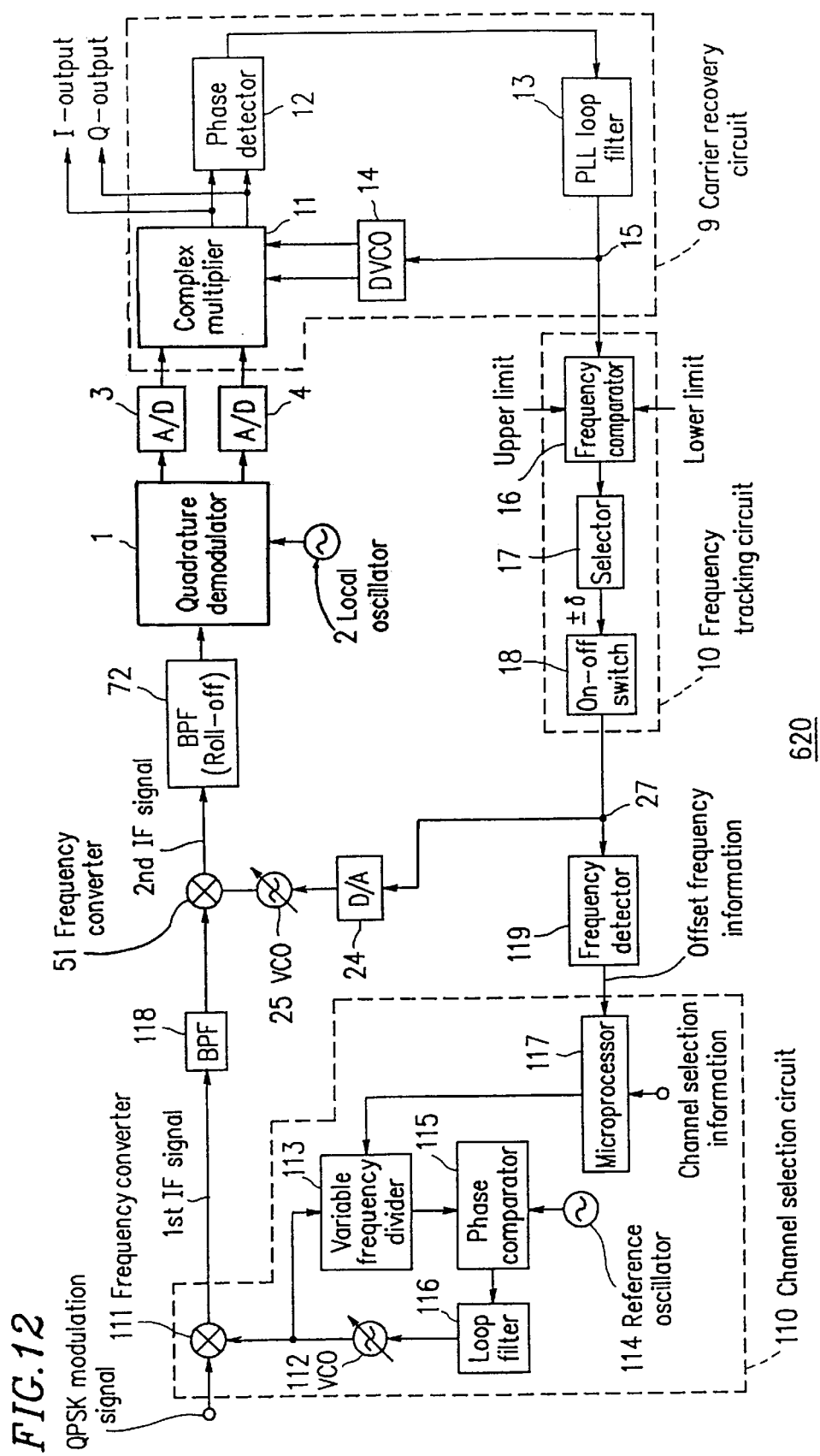
FIG. 12 is a block diagram of a demodulation apparatus in a twelfth example according to the present invention.

FIG. 12 is a block diagram of a demodulation apparatus 620 in a twelfth example according to the present invention.

The demodulation apparatus 620 has the functions of both the demodulation apparatus 590 shown in FIG. 9 and the demodulation apparatus 600 shown in FIG. 10. Accordingly, the demodulation apparatus 620 functions in substantially the same manner as and have effects is achieved by the demodulation apparatuses 590 and 600 except that the ability of eliminating an interference signal on adjacent channels is further improved in the demodulation apparatus 620.

In the demodulation apparatus 590 in FIG. 9, the DTFs 7 and 8 have a wave-shaping function; whereas in the demodulation apparatus 620 in FIG. 12, the BPF 72 has a wave-shaping function, and the center frequency of the BPF 72 is selected to be equal to the oscillation frequency of the local oscillator 2. Further, in the demodulation apparatus 600 in FIG. 10, frequency control is performed in the two systems, namely, in the frequency tracking circuit 10 and the AFC circuit 20; whereas in the demodulation apparatus 620 in FIG. 12, frequency control is performed only in the AFC circuit 20.

The same elements as those in FIGS. 9 and 10 bear the same reference numerals, and detailed description thereof will be omitted.

EXAMPLE 13

Figure 13:
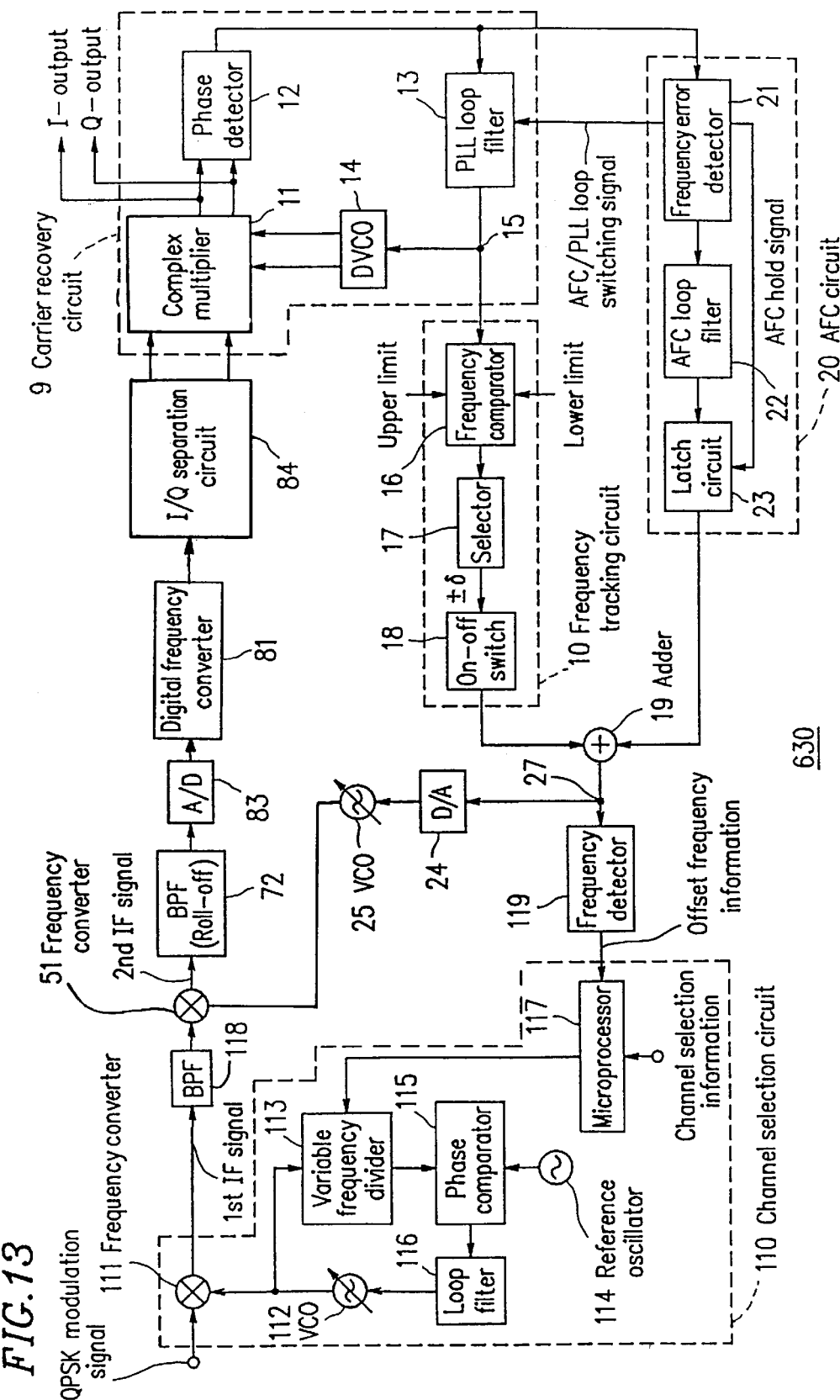
FIG. 13 is a block diagram of a demodulation apparatus in a thirteenth example according to the present invention.

FIG. 13 is a block diagram of a demodulation apparatus 13 in a thirteenth example according to the present invention. In the demodulation apparatus 600 in FIG. 10, the analog I and Q baseband signals are converted into digital I and Q baseband signals; whereas in the demodulation apparatus 630 in FIG. 13, an A/D converter 83 converts a second IF signal which is an analog signal into a digital signal.

A QPSK modulation signal which is input to a channel selection circuit 110 is processed with frequency conversion by a frequency converter 111 to be a first IF signal. After an unnecessary spurious component is removed from the first IF signal by a BPF 118, the first IF signal is input to a frequency converter 51. The configuration and the functions of the channel selection circuit 110 are the same as those in the demodulation apparatus 600 in FIG. 10, and detailed description thereof will be omitted here.

The first IF signal is converted into a second IF signal by the frequency converter 51 and a VCO 25. The resultant second IF signal is input to the A/D converter 83 via a BPF 72 as a wave-shaping filter. The A/D converter 83 converts the input analog second IF signal into a digital second IF signal. The second IF signal is converted into a digital baseband signal by a digital frequency converter 81, and then an I baseband signal and a Q baseband signal are generated from the digital baseband signal by an I/Q separation circuit 84. The I baseband signal and the Q baseband signal have a quadrature relationship to each other. The I and Q baseband signals are input to the carrier recovery circuit 9. The configuration and the functions of the carrier recovery circuit 9 are the same as those in the demodulation apparatus 600 in FIG. 10, and detailed description thereof will be omitted here.

The center frequency fc of the BPF 72 and a sampling frequency of the A/D converter 83 are selected so as to fulfill equation (1).

$$fc=(2n+1)fs/4(n=0, 1, 2, \ldots ) \qquad (1)$$

The AFC circuit 20, as in the demodulation apparatus 600 shown in FIG. 10, includes a frequency error detector 21, an AFC loop filter 22, and a latch circuit 23. The frequency error detector 21 detects a frequency difference between the center frequency of the second IF signal and the oscillation frequency of an effective local oscillator (not shown in FIG. 13) included in the digital frequency converter 81 provided by equation (1), based on the phase error signal sent from a phase detector 12. The frequency error is smoothed by the AFC loop filter 22 and sent to a D/A converter 24 via the latch circuit 23 and an adder 19 to be converted into an analog signal. The resultant analog signal is input to the VCO 25 as a control signal. Thus, the oscillation frequency of the VCO 25 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the VCO 25 is held by the latch circuit 23, and thus the VCO 25 operates at a constant oscillation frequency. When the detected frequency error is less than the reference value, an AFC/PLL loop switching signal is supplied to a PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output. The operating frequency of a DVCO 14 is maintained at a constant frequency when the AFC loop operates but the PLL loop does not operate. Usually, the operating frequency of the DVCO 14 is maintained at the zero frequency.

A frequency tracking circuit 10, as in the demodulation apparatus 600, includes a frequency comparator 16, a selector 17, and an on-off switch 18. In the state where the phase locking is realized in the carrier recovery circuit 9, the DVCO 14 operates at a relatively stable oscillation frequency although a phase noise is superimposed. The frequency comparator 16 compares the operating frequency of the DVCO 14 (including both a positive frequency and a negative frequency) with a positive upper limit and a negative lower limit of the frequency, using a signal which is input to a frequency setting terminal 15 of the DVCO 14. The frequency comparator 16 sends a selection signal to the selector 17 corresponding to the comparison result, based on whether the operating frequency is more than the upper limit, less than the lower limit, or within the range between the upper limit and the lower limit. The selector 17 outputs a frequency tracking signal corresponding to the input selection signal. In detail, the frequency tracking signal is a signal for increasing the frequency of the VCO 25 by a constant value (+δ), a signal for decreasing the frequency of the VCO 25 by a constant value (−δ), or a signal for maintaining the frequency with no change. The frequency tracking signal is input to an adder 19 through the on-off switch 18, and tracks the oscillation frequency of the VCO 25. The on-off switch 18 is set to be "ON" only when the carrier recovery circuit 9 is in a phase locking state, and thus the I and Q baseband signals are accurately output.

Even if the frequency of the VCO 25 changes by the frequency tracking signal, it takes some time for the PLL loop to respond to the change, thus to obtain the stable operation of the carrier recovery circuit 9. Accordingly, in order to maintain the phase locking state of the carrier recovery circuit 9, a sharp and/or significant change of the frequency of the VCO 25 should be avoided, and the frequency change needs to be smoothed. Such smoothing is realized by reducing the change (±δ) of the frequency of the VCO 25 or restricting the number of times by which the frequency tracking signal is input to the adder 19 per unit time by the on-off switch 18.

As is described above, the frequency tracking circuit 10 outputs a frequency tracking signal so as to increase the oscillation frequency of the VCO 25 when the oscillation frequency of the DVCO 14 exceeds the upper limit and so as to decrease the oscillation frequency of the VCO 25 when the oscillation frequency of the DVCO 14 is less than the lower limit. Accordingly, even if the center frequency of the second IF signal changes so as to offset from the center frequency of the BPF 72 after the AFC circuit 20 stops operating, the oscillation frequency of the VCO 25 is tracked so as to avoid the spectrum deviation of the second IF signal which is input to the BPF 72 from going beyond the frequency range between the upper limit and the lower limit of the frequency comparator 16. As a result, the oscillation frequency of the DVCO 14 is controlled not to go beyond the frequency range between the upper limit and the lower limit (of the frequency comparator 16). In other words, the frequency tracking loop of the demodulation apparatus 630 operates so as to avoid the spectrum deviation of the signal which is input to the BPF 72 from going beyond the upper limit or the lower limit.

A frequency detector 119 detects an offset frequency of the oscillation frequency of the VCO 25 with respect to a prescribed frequency based on the digital signal which is input to a frequency setting terminal 27 of the VCO 25. Information on the detected offset frequency of the VCO 25 is sent to a microprocessor 117 in the channel selection circuit 110.

The AFC circuit 20 and the frequency tracking circuit 10 operate the VCO 25 so that the center frequency of the second IF signal will be equal to the center frequency of the BPF 72 so as to avoid spectrum deviation of the signal which is input to the BPF 72. As a result, the frequency detected by the frequency detector 119 and the spectrum deviation (offset frequency) of the first IF signal with respect to a spectrum frequency are substantially equal to each other.

The microprocessor 117 corrects the frequency dividing ratio for a variable frequency divider 113 corresponding to the channel selection information based on the frequency information sent from the frequency detector 119. In detail, the frequency detected by the frequency detector 119 is approximated with a value obtained by multiplying a minimum frequency control width of a VCO 112 by an integer, and the frequency dividing ratio is offset in a positive direction or a negative direction based on the value obtained by the approximation. By offsetting the frequency dividing ratio, the frequency deviation of the QPSK modulation signal from the prescribed frequency is compensated for by the channel selection circuit 110. As a result, the frequency deviation of the second IF signal with respect to the center frequency of the BPF 72 is restricted to a frequency range which is substantially the same as the frequency of the reference oscillator 114.

In the demodulation apparatus 630 shown in FIG. 13, even if the frequency of the second IF signal changes by a drift of the center frequency of the QPSK modulation signal or the oscillation frequency of the VCO 25 after the operation of the AFC circuit 20 is stopped by the AFC hold signal, the spectrum deviation of the second IF signal which is input to the BPF 72 can be restricted within the range between the upper limit and the lower limit (of the frequency comparator 16) by tracking the frequency of the VCO 25 by the frequency tracking circuit 10 while maintaining the phase locking state of the carrier recovery circuit 9. By such operation, the deterioration in the error rate caused by the spectrum deviation of the second IF signal which is input to the BPF 72 can be restricted to a value corresponding to the upper and lower limits or less.

Further, since the frequency tracking of the VCO 25 is performed slowly while the phase locking of the carrier recovery circuit 9 is maintained, the deterioration in the error rate caused by the frequency tracking of the VCO 25 is restricted. Moreover, the frequency tracking of the VCO 25 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the VCO 25 can be substantially eliminated. Thus, demodulation characteristics are not deteriorated by the operation of the frequency tracking circuit 10.

Even if the QPSK modulation signal is significantly offset from the prescribed frequency, the frequency deviation of the center frequency of the first IF signal from a prescribed frequency can be compensated for whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

Further, since the BPF 72 has a wave-shaping function, the ability of eliminating an interference wave on adjacent channels is improved, and thus an error rate characteristic of the demodulation apparatus 630 are not deteriorated.

EXAMPLE 14

Figure 14:
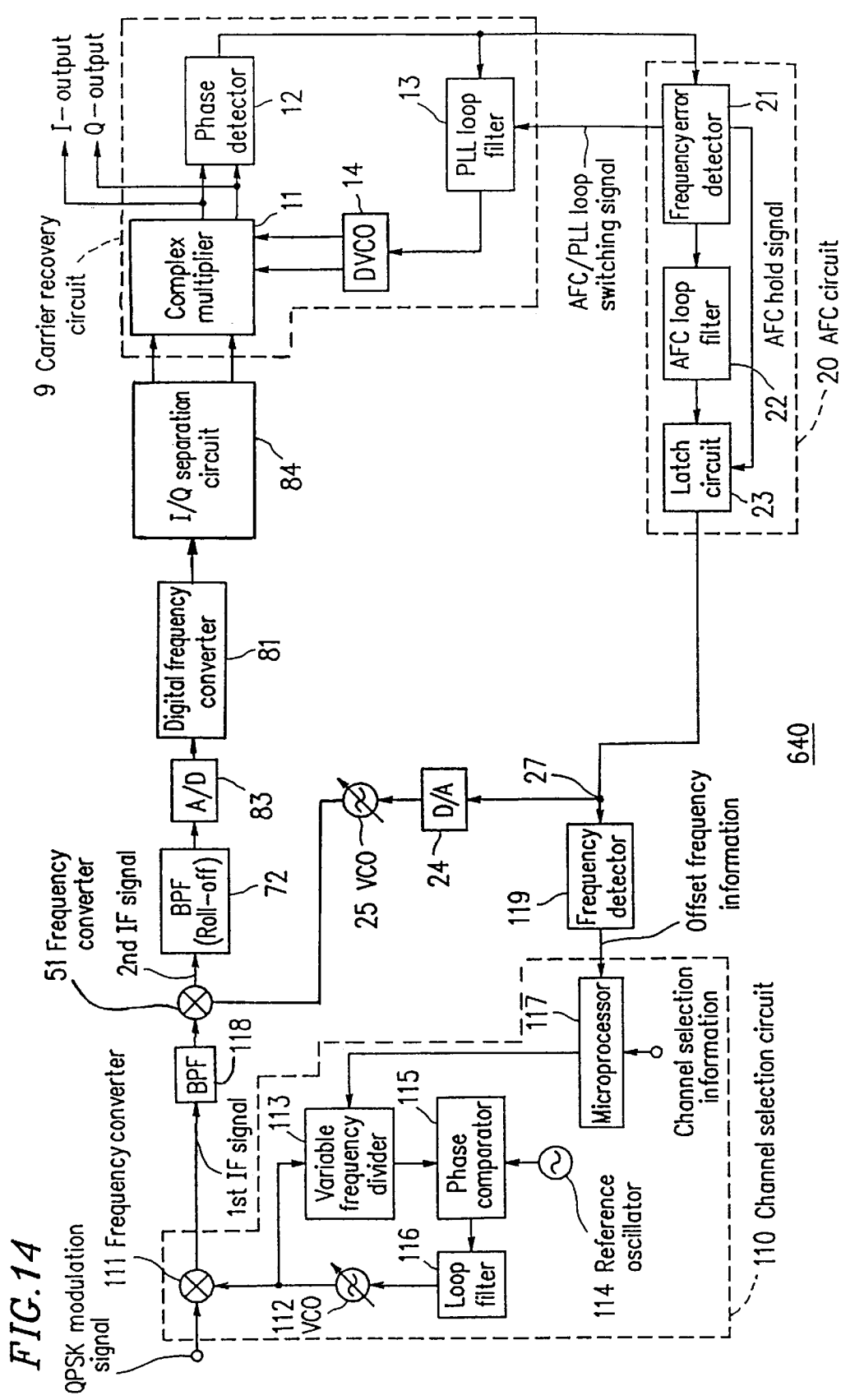
FIG. 14 is a block diagram of a demodulation apparatus in a fourteenth example according to the present invention.

FIG. 14 is a block diagram of a demodulation apparatus 640 in a fourteenth example according to the present invention.

In the demodulation apparatus 630 shown in FIG. 13, frequency control is performed in two systems, namely, the frequency tracking circuit 10 and the AFC circuit 20 for phase locking. In the demodulation apparatus 640 shown in FIG. 14, the frequency control is performed only in the AFC circuit 20. The same elements as those in FIG. 13 bear the same reference numerals, and detailed description thereof will be omitted.

In the demodulation apparatus 640, even if the QPSK modulation signal is significantly offset from a prescribed frequency, the frequency deviation of the second IF signal with respect to the oscillation frequency of the VCO 25 can be compensated for to a value which is substantially the same as the oscillation frequency of the reference oscillator 114 whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 15

Figure 15:
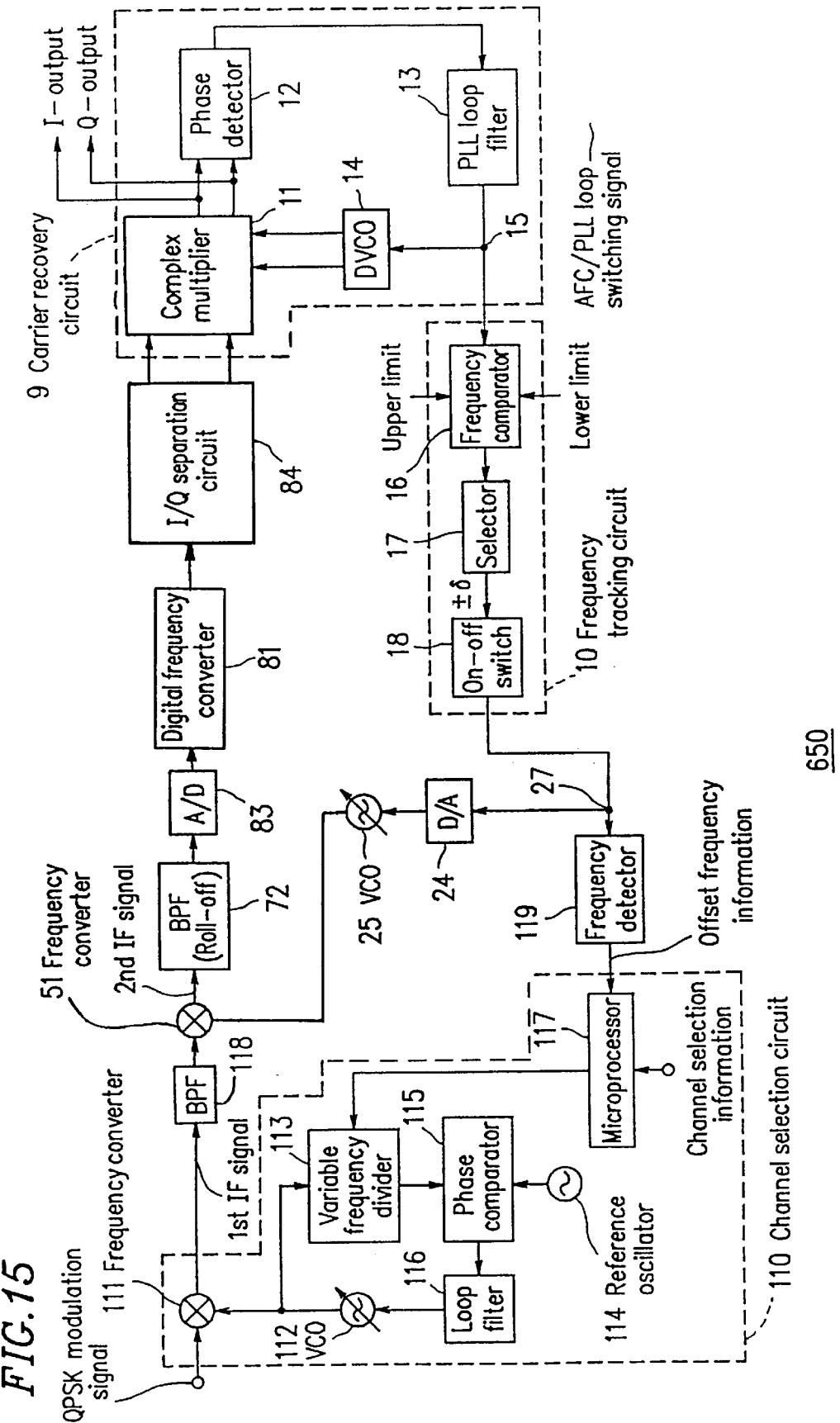
FIG. 15 is a block diagram of a demodulation apparatus in a fifteenth example according to the present invention.

FIG. 15 is a block diagram of a demodulation apparatus 650 in a fifteenth example according to the present invention.

In the demodulation apparatus 630 shown in FIG. 13, frequency control is performed in two systems, namely, the frequency tracking circuit 10 and the AFC circuit 20 for phase locking. In the demodulation apparatus 650 shown in FIG. 15, the frequency control is performed only in the frequency tracking circuit 10. The same elements as those in FIG. 13 bear the same reference numerals, and detailed description thereof will be omitted.

In the demodulation apparatus 650, even if the QPSK modulation signal is significantly offset from a prescribed frequency, the frequency deviation of the second IF signal with respect to the oscillation frequency of the VCO 25 can be compensated for whichever channel is selected when the frequency detector 119 detects the offset frequency. Such compensation is realized by superimposing the offset frequency on the frequency dividing ratio of the variable frequency divider 113. The offset frequency is restricted within a frequency of the reference oscillator 114. Accordingly, by setting the frequency range which can be pulled in by the carrier recovery circuit 9 to be slightly larger than the oscillation frequency of the reference oscillator 114, phase locking is realized with certainty in the carrier recovery circuit 9 even if the selected channel is changed, and problems such as extension of channel selection time are avoided.

Further, even if the offset frequency of the second IF signal with respect to the center frequency of the BPF 72 gradually changes during the operation of the demodulation apparatus 650, the spectrum deviation of the second IF signal which is input to the BPF 72 can be restricted within the range between the upper limit and the lower limit of the frequency comparator 16 by tracking the frequency of the VCO 25 while maintaining the phase locking state of the carrier recovery circuit 9. Accordingly, the deterioration in the error rate caused by the spectrum deviation of the second IF signal which is input to the BPF 72 having a wave-shaping function can be restricted to a value corresponding to the upper and the lower limits or less.

EXAMPLE 16

Figure 16:
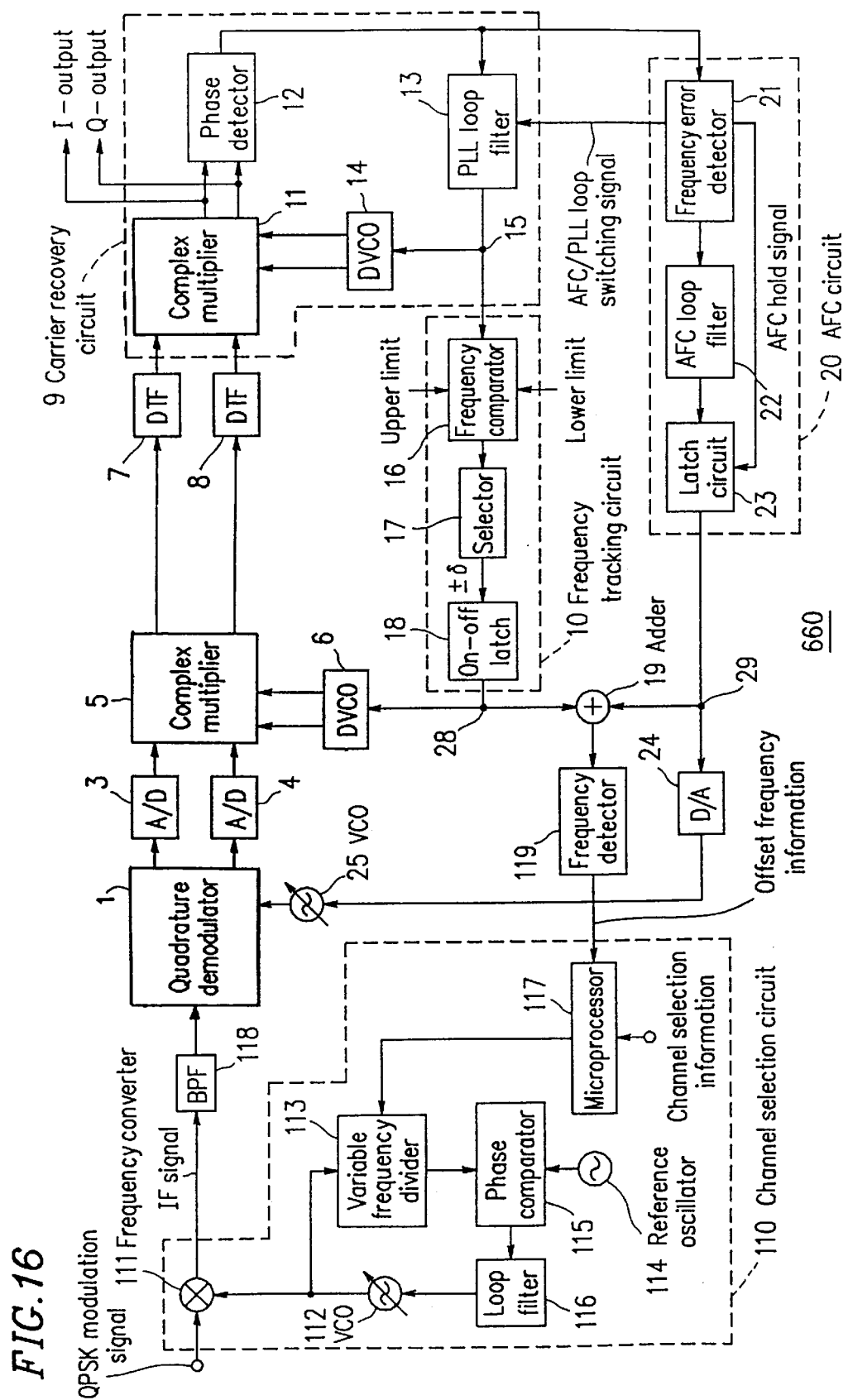
FIG. 16 is a block diagram of a demodulation apparatus in a sixteenth example according to the present invention.

FIG. 16 is a block diagram of a demodulation apparatus 660 in a sixteenth example according to the present invention. The same elements as those in FIG. 1 bear the same reference numerals, and detailed description thereof will be omitted.

A QPSK modulation signal which is input to a channel selection circuit 110 is processed with frequency conversion by a frequency converter 111 to be an IF signal. After an unnecessary spurious component is removed from the IF signal by a BPF 118, the IF signal is input to a quadrature demodulator 1. The configuration and the functions of the channel selection circuit 110 are the same as those in the demodulation apparatus 510 in FIG. 1, and thus detailed description thereof will be omitted.

The IF signal is then converted into an I baseband signal and a Q baseband signal based on an output signal from a local oscillator 2. The I baseband signal and the Q baseband signal have a quadrature relationship to each other. The I and Q baseband signals which are generated as analog signals are converted into I and Q baseband signals each having a digital value by A/D converter 3 and 4, respectively. The digital I and Q baseband signals are input to a complex multiplier 5 having a frequency conversion function. Since the complex multiplier 5 is connected to a DVCO 6 having a local oscillation function, the digital I and Q baseband signals are treated with frequency conversion by an operating frequency of the DVCO 6. Then, the I and Q baseband signals respectively have waves thereof shaped by DTFs 7 and 8 and are input to a carrier recovery circuit 9.

The carrier recovery circuit 9 includes a complex multiplier 11, a phase detector 12, an PLL loop filter 13 and a DVCO 14. These elements form a closed loop. The carrier recovery circuit 9 has a function of generating a recovered carrier from the I and Q baseband signals which is input to the complex multiplier 11. When a phase locking is realized in the carrier recovery circuit 9, the recovered I and Q baseband signals are output.

The carrier recovery circuit 9 operates in the following manner.

The I and Q baseband signals which are input to the complex multiplier 11 having a phase rotation function are output after being treated with phase rotation by the DVCO 14 and are input to the phase detector 12. The phase detector 12 detects a phase difference between the input signal and a reference phase and outputs a phase error signal. The phase error signal is smoothed by the PLL loop filter 13 and then input to the DVCO 14. The DVCO 14 outputs a recovered carrier which is in synchronization with the I and Q baseband signals to the complex multiplier 11. Accordingly, the complex multiplier 11 outputs recovered I and Q baseband signals which correspond to a transmitted data included in the QPSK modulation signal.

An AFC circuit 20, as in the demodulation apparatus 510 shown in FIG. 1, includes a frequency error detector 21, an AFC loop filter 22, and a latch circuit 23. The frequency error detector 21 detects a frequency difference between the center frequency of the IF signal and the oscillation frequency of a VCO 25 based on the phase error signal sent from the phase detector 12. The frequency error signal is smoothed by the AFC loop filter 22 and sent to a D/A converter 24 via the latch circuit 23 and an adder 19 to be converted into an analog signal.

The analog signal is then input to the VCO 25. Thus, the oscillation frequency of the VCO 25 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the VCO 25 is held by the latch circuit 23, and thus the VCO 25 operates at a constant oscillation frequency. When the detected frequency error is less than the reference value, an AFC/PLL loop switching signal is supplied to the PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a synchronization is established by the carrier recovery circuit 9, and the recovered I and Q baseband signals are output. The operating frequency of the DVCO 14 is maintained at a constant frequency when the AFC loop operates. The constant frequency is usually the zero frequency.

The configuration and the functions of the frequency tracking circuit 10 are the same as those in the demodulation apparatus 510 shown in FIG. 1.

A frequency tracking circuit 10 includes a frequency comparator 16, a selector 17, and an on-off switch 18. In the state where the phase locking is realized in the carrier recovery circuit 9, the DVCO 14 operates at a relatively stable oscillation frequency although a phase noise is superimposed. The frequency comparator 16 compares the operating frequency of the DVCO 14 (including both a positive frequency and a negative frequency) with a positive upper limit and a negative lower limit of the frequency, using a signal which is input to a frequency setting terminal 15 of the DVCO 14. The frequency comparator 16 sends a selection signal to the selector 17 corresponding to the comparison result, based on whether the operating frequency is more than the upper limit, less than the lower limit, or within the range between the upper limit and the lower limit. The selector 17 outputs a frequency tracking signal corresponding to the input selection signal. In detail, the frequency tracking signal is a signal for increasing the frequency of the DVCO 6 by a constant value (+δ), a signal for decreasing the frequency of the DVCO 6 by a constant value (−δ), or a signal for maintaining the frequency with no change. The frequency tracking signal tracks the operating frequency of the DVCO 6 via the on-off switch 18. The on-off switch 18 is set to be "ON" only when the carrier recovery circuit 9 is in a phase locking state and thus the I and Q baseband signals are accurately output, The operating frequency of the DVCO 6 is maintained at a constant frequency when the AFC loop operates but the PLL loop does not operate. The constant frequency is usually the zero frequency.

Even if the frequency of the DVCO 6 changes by the frequency tracking signal, it takes some time for the PLL loop to respond to the change, thus to obtain the stable operation of the carrier recovery circuit 9. Accordingly, in order to maintain the phase locking state of the carrier recovery circuit 9, a sharp and/or significant change of the frequency of the DVCO 6 should be avoided, and the frequency change needs to be smoothed. Such smoothing is realized by reducing the change (±δ) of the frequency of the DVCO 6 or restricting the number of times by which the frequency tracking signal is input to the adder 19 per unit time by the on-off switch 18.

As is described above, the frequency tracking circuit 10 outputs a frequency tracking signal so as to increase the oscillation frequency of the DVCO 6 when the oscillation frequency of the DVCO 14 exceeds the upper limit and so as to decrease the oscillation frequency of the DVCO 6 when the oscillation frequency of the DVCO 14 is less than the lower limit. Accordingly, even if the center frequency of the IF signal changes with respect to the VCO 25 operating at a constant oscillation frequency after the AFC circuit 20 stops operating, the oscillation frequency of the DVCO 6 is tracked so as to prevent the spectrum deviation of the signals which are input to the DTFs 7 and 8 from going beyond the frequency range determined by the upper limit and the lower limit of the frequency comparator 16. As a result, the oscillation frequency of the DVCO 14 is controlled not to go beyond the frequency range between the upper limit and the lower limit (of the frequency comparator 16). In other words, the frequency tracking loop of the demodulation apparatus 660 operates so as to avoid the spectrum deviation of the signals which are input to the DTFs 7 and 8 from going beyond the range between the upper limit and the lower limit.

A frequency detector 119 detects an offset frequency of the IF signal with respect to the prescribed frequency, based on the output signal from the adder 19. Information on the detected offset frequency is sent to a microprocessor 117 in the channel selection circuit 110.

The microprocessor 117 Corrects the frequency dividing ratio for the variable frequency divider 113 corresponding to the channel selection information based on the frequency information sent from a frequency detector 119. In detail, the frequency detected by the frequency detector 119 is approximated with a value obtained by multiplying a minimum frequency control width of a VCO 112 by an integer, and the frequency dividing ratio is offset in a positive direction or a negative direction based on the value obtained by the approximation. By offsetting the frequency dividing ratio, the frequency deviation of the QPSK modulation signal from the prescribed frequency is compensated for by the channel selection circuit 110. As a result, the offset frequency of the IF signal with respect to the prescribed frequency is restricted to a frequency range which is substantially the same as the frequency of a reference oscillator 114.

In the demodulation apparatus 660 shown in FIG. 16, even if the frequency of the IF signal changes by a drift of the center frequency of the QPSK modulation signal with respect to the VCO 25 operating at a constant hold frequency after the operation of the AFC circuit 20 is stopped by the AFC hold signal, the spectrum deviation of the I and Q baseband signals which are input to the DTFs 7 and 8 can be restricted within the range between the upper limit and the lower limit (of the frequency comparator 16) by tracking the frequency of the DVCO 6 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the DVCO 6 is performed slowly while the phase locking of the carrier recovery circuit 9 is maintained, the deterioration in the error rate caused by the frequency tracking of the DVCO 6 is restricted. Moreover, the frequency tracking of the DVCO 6 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the DVCO 6 can be substantially eliminated. Thus, demodulation characteristics are not deteriorated by the operation of the frequency tracking circuit 10.

Even if the QPSK modulation signal is significantly offset from the prescribed frequency, the offset frequency of the IF signal with respect to a prescribed frequency can be compensated for whichever channel is selected when the frequency detector 119 detects the offset frequency. Such compensation is realized by superimposing the offset frequency on the frequency dividing ratio of the variable frequency divider 113. Accordingly, even if the offset frequency increases, problems such as inferior operation of the AFC circuit 20 and extension of pull in time of the frequency of the AFC circuit 20 are avoided.

EXAMPLE 17

Figure 17:
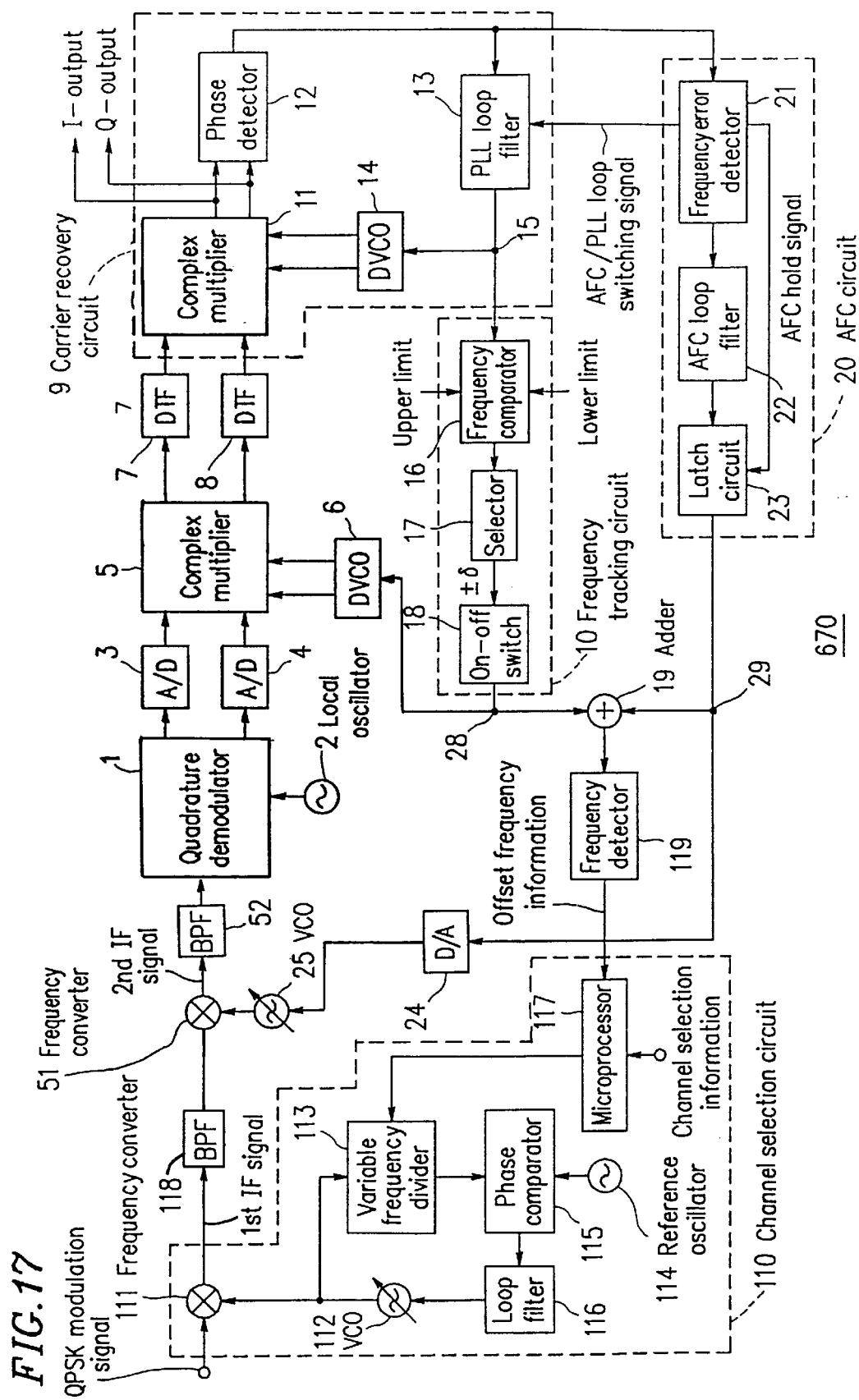
FIG. 17 is a block diagram of a demodulation apparatus in a seventeenth example according to the present invention.

FIG. 17 is a block diagram of a demodulation apparatus 670 in a seventeenth example according to the present invention. The same elements as those in FIG. 16 bear the same reference numerals, and detailed description thereof will be omitted.

A QPSK modulation signal which is input to a channel selection circuit 110 is processed with frequency conversion by a frequency converter 111 to be a first IF signal. After an unnecessary spurious component is removed from the first IF signal by a BPF 118, the first IF signal is input to a frequency converter 51. The configuration and the functions of the channel selection circuit 110 are the same as those in the demodulation apparatuses 510 and 540, and detailed description thereof will be omitted.

The first IF signal is then converted into a second IF signal by a frequency converter 51 and a VCO 25. The resultant second IF signal is input to the quadrature demodulator 1 via a BPF 52. The second IF signal is then converted into an I baseband signal and a Q baseband signal based on an output signal from a local oscillator 2. The I baseband signal and the Q baseband signal have a quadrature relationship to each other. The I and Q baseband signals which are generated as analog signals are converted into I and Q baseband signals each having a digital value by A/D converter 3 and 4, respectively.

In the demodulation apparatus 660 in FIG. 16, the operating frequency of the DVCO 6 is tracked by the frequency tracking circuit 10, and the oscillation frequency of the VCO 25 which is input to the quadrature demodulator 1 is controlled by an AFC circuit 20. In the demodulation apparatus 670 in FIG. 17, the operating frequency of the DVCO 6 is tracked by the frequency tracking circuit 10 as in the demodulation apparatus 660, but the AFC circuit 20 tracks the oscillation frequency of the VCO 25 which is input to the frequency converter 51. A constant oscillation frequency of the local oscillator 2 is input to the quadrature demodulator 1. The demodulation apparatuses 660 and 670 have the same configuration except for the above-mentioned points.

In the demodulation apparatus 670 shown in FIG. 17, even if the offset frequency of the second IF signal changes with respect to the oscillation frequency of the local oscillator 2 by a drift of the frequency of the QPSK modulation signal, the VCO 25 or the local oscillator 2 after the operation of the AFC circuit 20 is stopped by the AFC hold signal, the spectrum deviation of the I and Q baseband signals which are input to DTFs 7 and 8 can be restricted within the range between the upper limit and the lower limit (of a frequency comparator 16) by tracking the frequency of the DVCO 6 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the DVCO 6 is performed slowly while the phase locking of the carrier recovery circuit 9 is maintained, the deterioration in the error rate caused by the frequency tracking of the DVCO 6 is restricted. Moreover, the frequency tracking of the DVCO 6 is performed by comparing the frequency of a DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the DVCO 6 can be substantially eliminated. Thus, demodulation characteristics are not deteriorated by the operation of the frequency tracking circuit 10.

Even if the QPSK modulation signal is significantly offset from the prescribed frequency, the offset frequency of the second IF signal with respect to a oscillation frequency of the local oscillator 2 can be compensated for whichever channel is selected when a frequency detector 119 detects the offset frequency. Such compensation is realized by superimposing the offset frequency on the frequency dividing ratio of a variable frequency divider 113. Accordingly, even if the offset frequency increases, problems such as inferior operation of the AFC circuit 20 and extension of pull in time of the frequency of the AFC circuit 20 are avoided.

EXAMPLE 18

Figure 18:
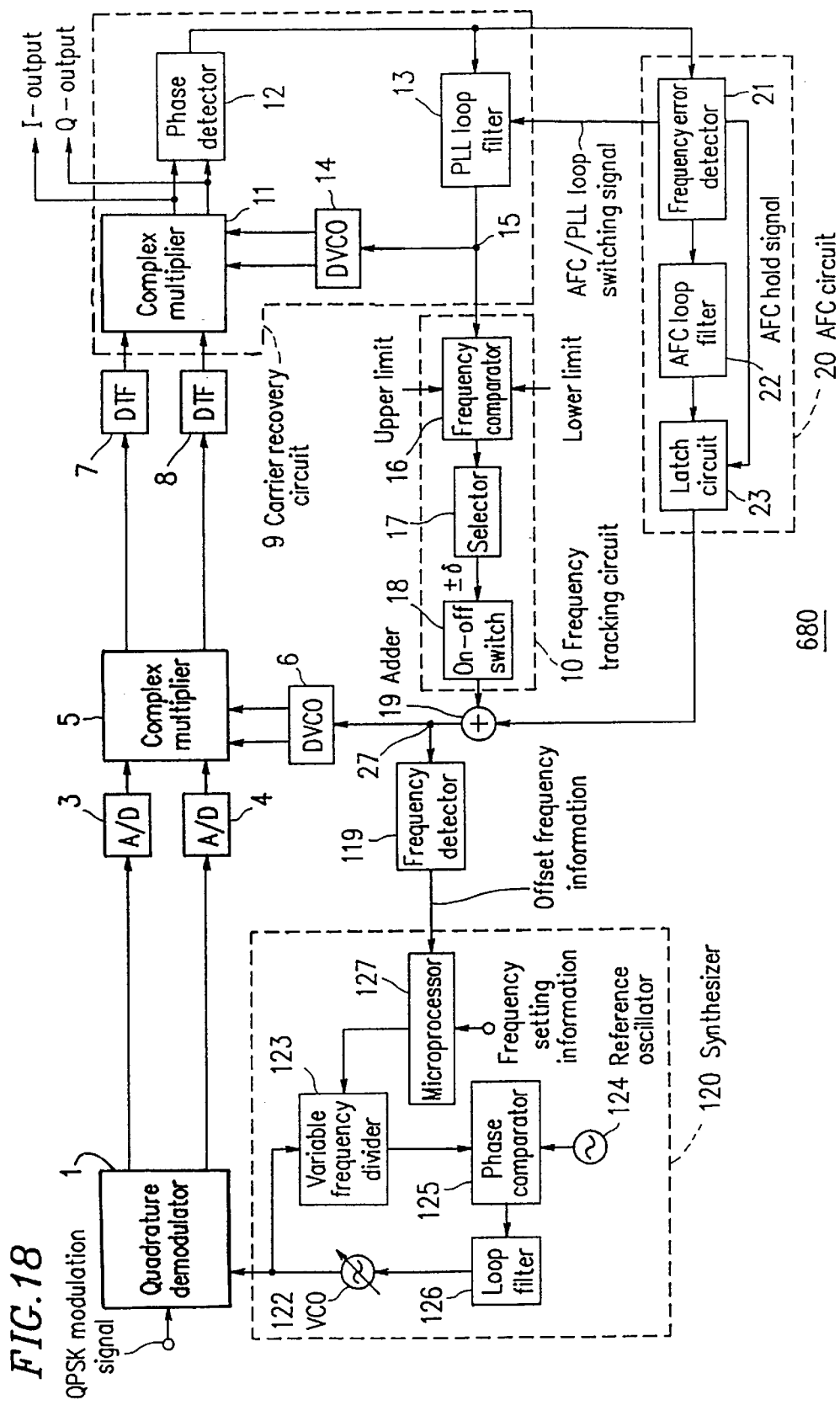
FIG. 18 is a block diagram of a demodulation apparatus in an eighteenth example according to the present invention.

FIG. 18 is a block diagram of a demodulation apparatus 680 in an eighteenth example according to the present invention. The same elements as those in FIG. 1 bear the same reference numerals, and detailed description thereof will be omitted.

A QPSK modulation signal is first processed with frequency conversion by a channel selection circuit (not shown) and then input to a quadrature demodulator 1. The QPSK modulation signal is then converted into an I baseband signal and a Q baseband signal based on an output signal from a VCO 122 of a synthesizer 120. The I and Q baseband signals have quadrature relationship to each other.

The synthesizer 120 includes, the VCO 122, a variable frequency divider 123, a reference oscillator 124, a phase comparator 125, a loop filter 126, and a microprocessor 127. In the synthesizer 120, a frequency dividing ratio of the variable frequency divider 123 is set based on frequency setting information which is input to the microprocessor 127. The frequency of the VCO 122 is divided at the frequency dividing ratio which is set in this manner. A phase difference (phase error) between the output signal from the variable frequency divider 123 and an output signal from the reference oscillator 124 is detected by the phase comparator 125. The detected phase error is first smoothed by the loop filter 126 and then fedback as a control signal for the VCO 122. In this manner, the VCO 122 performs stable oscillation at a frequency obtained by multiplying the frequency of the reference oscillator 124 by an integer. Such an integer corresponds to the frequency dividing ratio of the variable frequency divider 123.

The I and Q baseband signals which are generated as analog signals are converted into I and Q baseband signals each having a digital value by A/D converters 3 and 4, respectively. The digital I and Q baseband signals are input to a complex multiplier 5 having a frequency conversion function. Since the complex multiplier is connected to a DVCO 6 having a local oscillation function, the digital I and Q baseband signals are treated with frequency conversion by an operating frequency of the DVCO 6. Then, the I and Q baseband signals respectively have waves thereof shaped by DTFs 7 and 8 and are input to a carrier recovery circuit 9.

The carrier recovery circuit 9 includes a complex multiplier 11, a phase detector 12, a PLL loop filter 13 and a DVCO 14. These elements form a closed loop. The carrier recovery circuit 9 has a function of generating a recovered carrier from the I and Q baseband signals which are input to the complex multiplier 11. When a phase locking is realized in the carrier recovery circuit 9, the recovered I and Q baseband signals are output.

The carrier recovery circuit 9 operates in the following manner.

The I and Q baseband signals which are input to the complex multiplier 11 having a phase rotation function are output after being treated with phase rotation by the DVCO 14 and are input to the phase detector 12. The phase detector 12 detects a phase difference between the input signal and a reference phase and outputs a phase error signal. The phase error signal is smoothed by the PLL loop filter 13 and then input to the DVCO 14. The DVCO 14 outputs a recovered carrier which is in synchronization with the I and Q baseband signals which are input to the complex multiplier 11. Accordingly, the complex multiplier 11 outputs recovered I and Q baseband signals which correspond to a transmitted data included in the QPSK modulation signal.

An AFC circuit 20 includes a frequency error detector 21, an AFC loop filter 22, and a latch circuit 23. The frequency error detector 21 detects a frequency difference between the center frequency of the QPSK modulation signal and the oscillation frequency of the VCO 122 based on the phase error signal sent from the phase detector 12. The frequency error signal is smoothed by the AFC loop filter 22 and input to the DVCO 6 via the latch circuit 23 as a control signal. Thus, the operating frequency of the DVCO 6 is controlled to compensate for the frequency error. When the detected frequency error is less than a reference value, an AFC hold signal is supplied to the latch circuit 23 from the frequency error detector 21. By the AFC hold signal, data for controlling the oscillation frequency of the DVCO 6 is held by the latch circuit 23, and thus the DVCO 6 operates at a constant oscillation frequency. Moreover, when the detected frequency error is less than the reference value, an AFC/PLL loop switching signal is supplied to the PLL loop filter 13 from the frequency error detector 21 to operate the PLL loop filter 13. Thus, the carrier recovery circuit 9 pulls in a frequency error which cannot be removed by the AFC circuit 20 and compensates for such a frequency error. Simultaneously, a phase locking is established by the carrier recovery circuit 9, and the recovered I and Q baseband signals are output. The operating frequency of the DVCO 14 is maintained at a constant frequency when the AFC loop operates but the PLL loop does not operate. The constant frequency is usually zero frequency.

A frequency tracking circuit 10 includes a frequency comparator 16, a selector 17, and an on-off switch 18. In the state where the phase locking is realized in the carrier recovery circuit 9, the DVCO 14 operates at a relatively stable oscillation frequency. The frequency comparator 16 compares the operating frequency of the DVCO 14 (including both a positive frequency and a negative frequency) with a positive upper limit and a negative lower limit of the frequency, using a signal which is input to a frequency setting terminal of the DVCO 14. The frequency comparator 16 sends a selection signal to the selector 17 corresponding to the comparison result, based on whether the operating frequency is more than the upper limit, is less than the lower limit, or is within the range between the upper limit and the lower limit. The selector 17 outputs a frequency tracking signal corresponding to the input selection signal. In detail, the frequency tracking signal is a signal for increasing the frequency of the DVCO 6 by a constant value ($+\delta$), a signal for decreasing the frequency of the DVCO 6 by a constant value ($-\delta$), or a signal for maintaining the frequency with no change. The frequency tracking signal is input to an adder 19 through the on-off switch 18, and tracks the oscillation frequency of the DVCO 6. The on-off switch 18 is set to be "ON" only when the carrier recovery circuit 9 is in a phase locking state and thus the I and Q baseband signals are accurately output.

Even if the frequency of the DVCO 6 changes by the frequency tracking signal, it takes some time for the PLL loop to respond to the change, thus to obtain the stable operation of the carrier recovery circuit 9. Accordingly, in order to maintain the phase locking state of the carrier recovery circuit 9, a sharp and/or significant change of the frequency of the DVCO 6 should be avoided, and the frequency change needs to be smoothed. Such smoothing is realized by reducing the change ($\pm\delta$) of the frequency of the DVCO 6 or restricting the number of times by which the frequency tracking signal is input to the adder 19 per unit time by the on-off switch 18.

As is described above, the frequency tracking circuit 10 outputs a frequency tracking signal so as to increase the oscillation frequency of the DVCO 6 when the oscillation frequency of the DVCO 14 exceeds the upper limit and so as to decrease the oscillation frequency of the DVCO 6 when the oscillation frequency of the DVCO 14 is less than the lower limit. Accordingly, even if the offset frequency of the QPSK modulation signal with respect to the VCO 122 changes after the AFC circuit 20 stops operating, the oscillation frequency of the DVCO 6 is tracked so as to avoid the spectrum deviation of the signals which are input to the DTFs 7 and 8 from going beyond the frequency range between the upper limit and the lower limit of the frequency comparator 16. As a result, the oscillation frequency of the DVCO 14 is controlled not to go beyond the frequency range between the upper limit and the lower limit (of the frequency comparator 16). In other words, the frequency tracking loop of the demodulation apparatus 680 operates so as to avoid the spectrum deviation of the signals which are input to the DTFs 7 and 8 from going beyond the upper limit or the lower limit.

A frequency detector 119 detects the operating frequency of the DVCO 6 based on the signal input to a frequency setting terminal 27 of the DVCO 6. Information on the operating frequency of the DVCO 6 (offset frequency information) is sent to the microprocessor 127 in the synthesizer 120.

The AFC circuit 20 and the frequency tracking circuit 10 operate the DVCO 6 at a frequency equal to the offset frequency of the QPSK modulation signal with respect to the oscillation frequency of the VCO 122 so as to avoid spectrum deviation of the signals which are input to the DTFs 7 and 8. As a result, the frequency detected by the frequency detector 119 and the offset frequency of the QPSK modulation signal with respect to the oscillation frequency of the VCO 122 have the same value in the range between the upper limit and the lower limit of the frequency converter 16.

The microprocessor 127 corrects the frequency dividing ratio for the variable frequency divider 123 corresponding to the frequency setting information based on the offset frequency information sent from the frequency detector 119. In detail, the frequency detected by the frequency detector 119 is approximated with a value obtained by multiplying a minimum frequency control width of the VCO 122 by an integer, and the frequency dividing ratio is offset in a positive direction or a negative direction based on the value obtained by the approximation. By offsetting the frequency dividing ratio, the frequency deviation of the QPSK modulation signal from the oscillation frequency of the VCO 122 is compensated for. As a result, the offset frequency of the QPSK modulation signal with respect to the oscillation frequency of the VCO 122 is restricted to a frequency range which is substantially the same as the frequency of the reference oscillator 124.

In the demodulation apparatus 680 shown in FIG. 18, even if the spectrum deviation of the I and Q baseband signals changes or increases by a drift of the frequency of the QPSK modulation signal after the operation of the AFC circuit 20 is stopped by the AFC hold signal, the spectrum deviation of the I and Q baseband signals which are input to the DTFs 7 and 8 can be restricted within the range between the upper limit and the lower limit (of the frequency comparator 16) by tracking the frequency of the DVCO 6 while maintaining the phase locking state of the carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the DVCO 6 is performed slowly while the phase locking of the carrier recovery circuit 9 is maintained, the deterioration in the error rate caused by the frequency tracking of the DVCO 6 is restricted. Moreover, the frequency tracking of the DVCO 6 is performed by comparing the frequency of the DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the DVCO 6 can be substantially eliminated. Thus, demodulation characteristics are not deteriorated by the operation of the frequency tracking circuit 10.

Even if the QPSK modulation signal processed with frequency conversion by the channel selection circuit is significantly offset from the prescribed frequency, the frequency deviation of the QPSK modulation signal with respect to the VCO 122 can be compensated for whichever channel is selected when the frequency detector 119 detects the offset frequency. Such compensation is realized by superimposing the offset frequency on the frequency dividing ratio of the variable frequency divider 123. Accordingly, even if the QPSK modulation signal is significantly offset from the prescribed frequency, problems such as inferior operation of the AFC circuit 20 and extension of pull in time of the frequency of the AFC circuit 20 are avoided.

EXAMPLE 19

Figure 19:
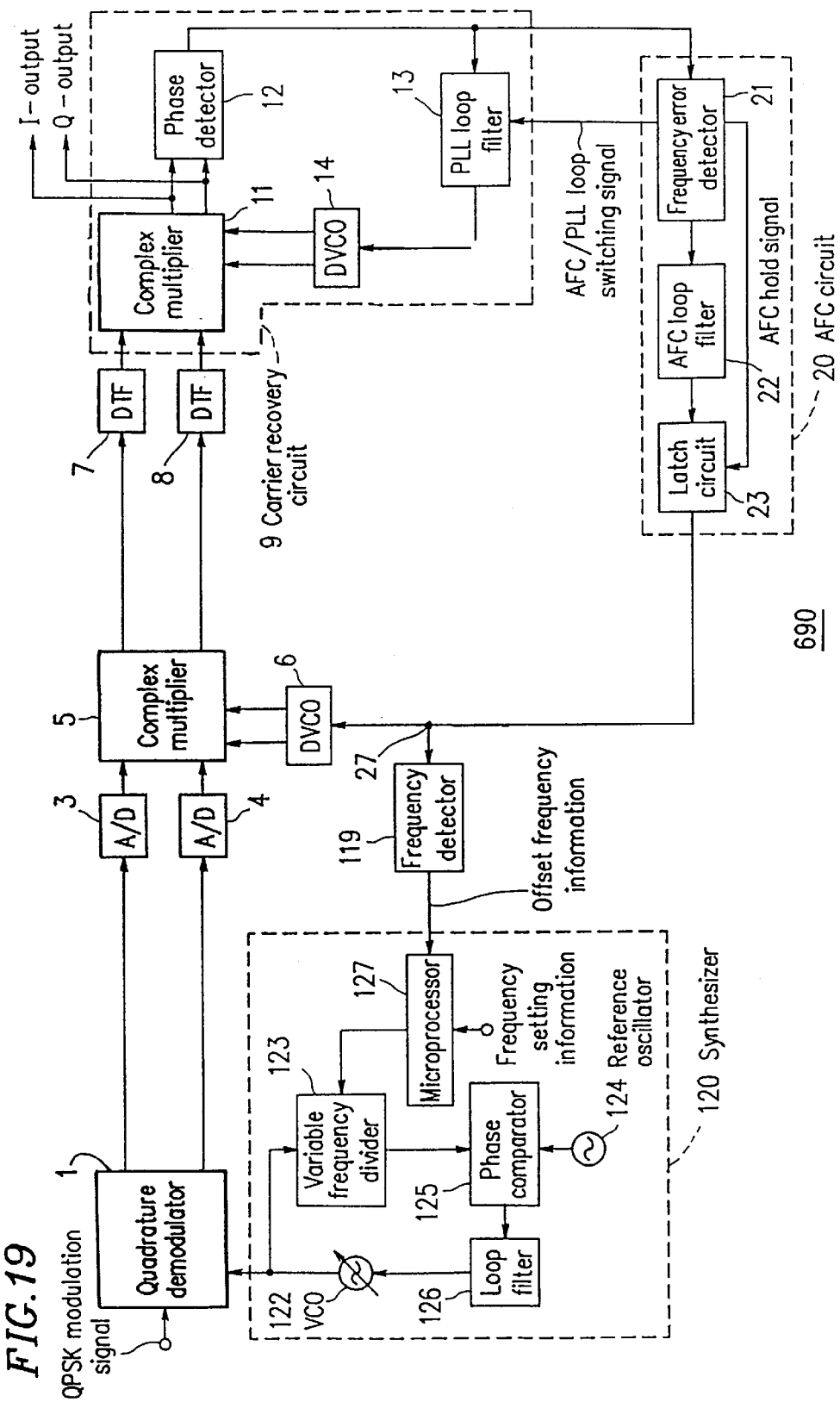
FIG. 19 is a block diagram of a demodulation apparatus in a nineteenth example according to the present invention.

FIG. 19 is a block diagram of a demodulation apparatus 690 in a nineteenth example according to the present invention.

In the demodulation apparatus 680 shown in FIG. 18, frequency control is performed in two systems, namely, the frequency tracking circuit 10 and the AFC circuit 20 for phase locking. In the demodulation apparatus 690 shown in FIG. 19, the frequency control is performed only in the AFC circuit 20. The same elements as those in FIG. 1 bear the same reference numerals, and detailed description thereof will be omitted.

In the demodulation apparatus 690, even if the QPSK modulation signal processed with frequency conversion by the channel selection circuit is significantly offset from a prescribed frequency, the frequency deviation of the QPSK modulation signal with respect to the oscillation frequency of the VCO 122 can be compensated for to a value which is substantially the same as the oscillation frequency of the reference oscillator 124 whichever channel is selected when the frequency detector 119 detects the offset frequency. Such compensation is realized by superimposing the offset frequency on the frequency dividing ratio of the variable frequency divider 123. Accordingly, even if the offset frequency of the QPSK modulation signal from the prescribed frequency increases, problems such as inferior operation of the AFC circuit 20 and extension of pull in time of the frequency of the AFC circuit 20.

EXAMPLE 20

Figure 20:
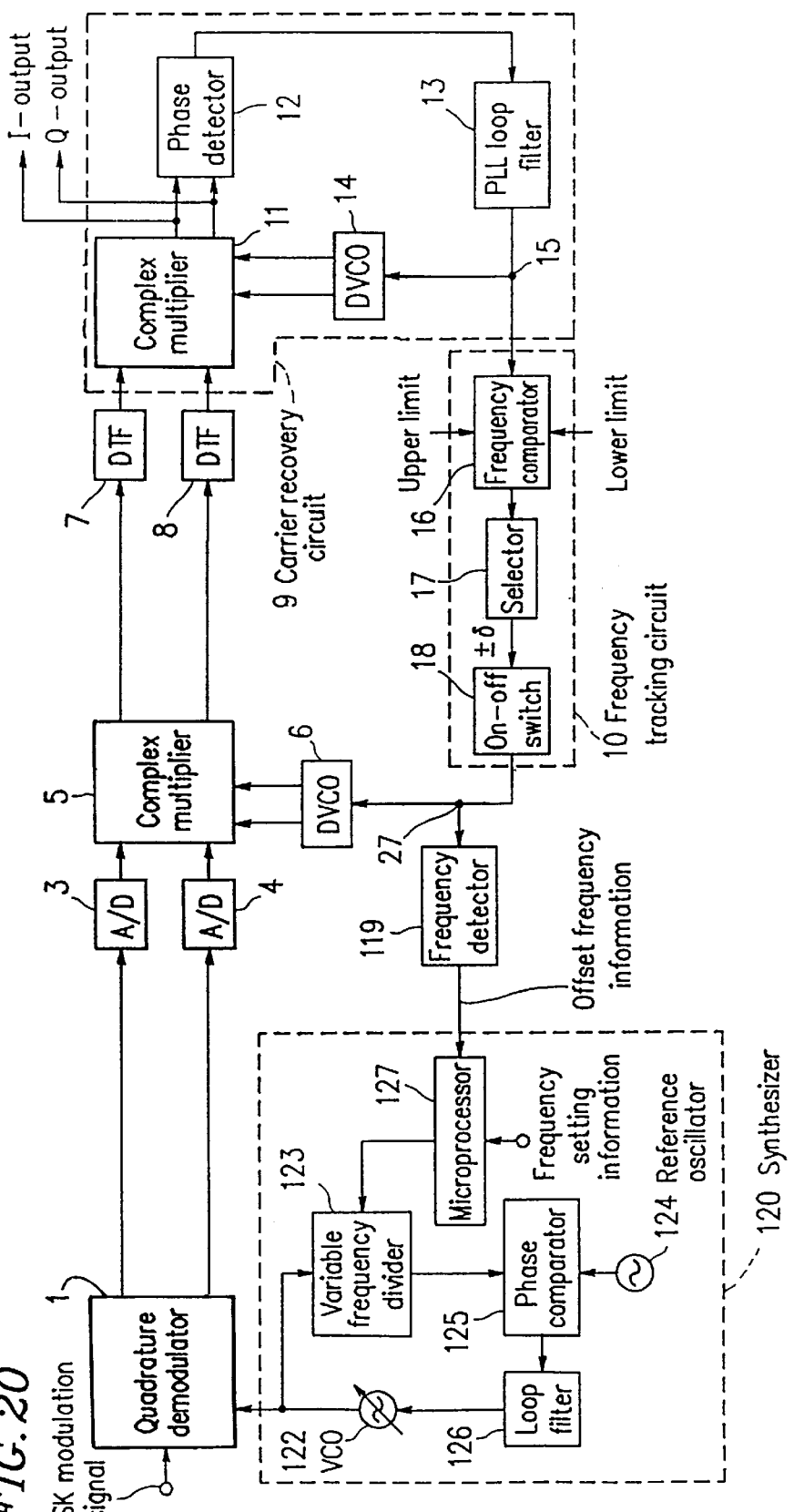
FIG. 20 is a block diagram of a demodulation apparatus in a twentieth example according to the present invention.

FIG. 20 is a block diagram of a demodulation apparatus 700 in a twentieth example according to the present invention.

In the demodulation apparatus 680 shown in FIG. 18, frequency control is performed in two systems, namely, the frequency tracking circuit 10 and the AFC circuit 20 for phase locking. In the demodulation apparatus 700 shown in FIG. 20, the frequency control is performed only in the frequency tracking circuit 10. The same elements as those in FIG. 18 bear the same reference numerals, and detailed description thereof will be omitted.

In the demodulation apparatus 700, even if the QPSK modulation signal is significantly offset from a prescribed frequency, the frequency deviation of the QPSK modulation signal with respect to the oscillation frequency of the VCO 122 can be compensated for to a frequency range similar to the frequency range of the reference oscillator 124 whichever channel is selected when the frequency detector 119 detects the offset frequency. Such compensation is realized by superimposing the offset frequency on the frequency dividing ratio of the variable frequency divider 123. Accordingly, by setting the frequency pulled in by the carrier recovery circuit 9 to be slightly larger than that of the oscillation frequency of the reference oscillator 124, phase locking is realized with certainly in the carrier recovery circuit 9 even if the selected channel is changed, and problems such as extension of channel selection time are avoided.

Further, even if the offset frequency of the QPSK modulation signal with respect to the oscillation frequency of the VCO 122 gradually changes during the operation of the demodulation apparatus 700, the spectrum deviation of the I and Q baseband signals which are input to the DTFs 7 and 8 can be restricted within the range between the upper limit and the lower limit (of the frequency comparator 16) by tracking the frequency of the DVCO 6 while maintaining the phase locking state of the carrier recovery circuit 9. Accordingly, the deterioration in the error rate caused by the spectrum deviation of the I and Q baseband signals which are input to the DTFs 7 and 8 can be restricted to a value corresponding to the upper and the lower limits or less.

EXAMPLE 21

Figure 21:
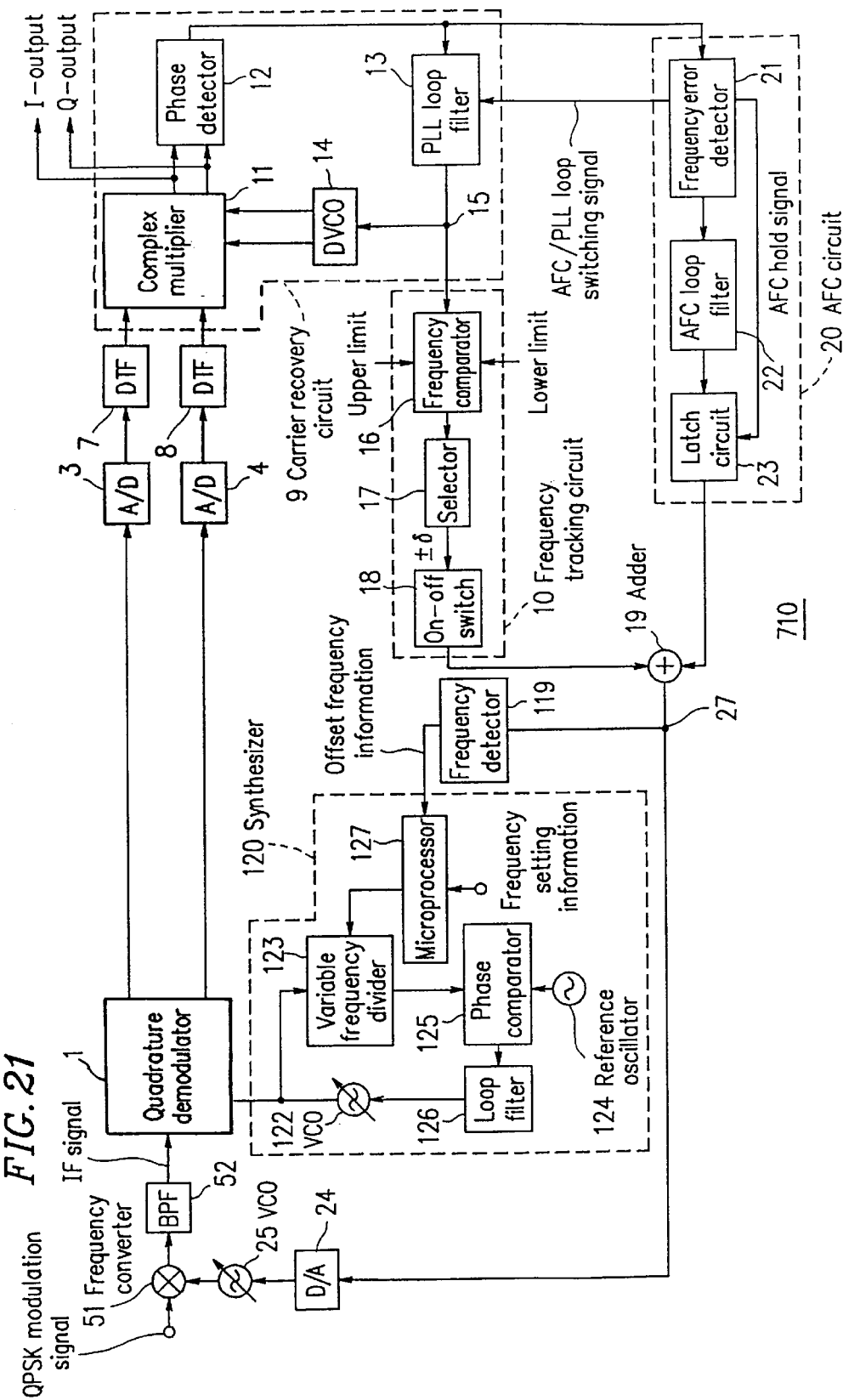
FIG. 21 is a block diagram of a demodulation apparatus in a twenty-first example according to the present invention.

FIG. 21 is a block diagram of a demodulation apparatus 710 in a twenty-first example according to the present invention. The same elements as those in FIG. 7 bear the same reference numerals, and detailed description thereof will be omitted.

In the demodulation apparatus 570 in FIG. 7, the local oscillator 2 is connected to a quadrature demodulator 1. The offset frequency detected by the frequency detector 119 is compensated for by a channel selection circuit 110. In the demodulation apparatus 710 in FIG. 21, a synthesizer 120 is connected to the quadrature demodulator 1 as an oscillator, and the offset frequency detected by the frequency detector 119 is compensated for by the synthesizer 120. The configuration and the functions of the synthesizer 120 are the same as in the demodulation apparatus 680 in FIG. 18, and detailed description thereof will be omitted.

In the demodulation apparatus 710 shown in FIG. 21, even if the offset frequency of the IF signal with respect to the oscillation frequency of a VCO 122 changes by a drift of the center frequency of the QPSK modulation signal or the oscillation frequency of a VCO 25 after the operation of an AFC circuit 20 is stopped by the AFC hold signal, the spectrum deviation of the I and Q baseband signals which are input to the DTFs 7 and 8 can be restricted within the range between the upper limit and the lower limit of a frequency comparator 16 by tracking the frequency of the VCO 25 while maintaining the phase locking state of a carrier recovery circuit 9. By such operation, the deterioration in the error rate caused by the spectrum deviation of the I and Q baseband signals which are input to the DTFs 7 and 8 can be restricted to a value corresponding to the upper and lower limits or less.

Further, since the frequency tracking of the VCO 25 is performed slowly while the synchronization of the carrier recovery circuit 9 is maintained, the deterioration in the error rate caused by the frequency tracking of the VCO 25 is restricted. Moreover, the frequency tracking of the VCO 25 is performed by comparing the frequency of a DVCO 14 with the upper limit or the lower limit of the frequency comparator 16. Such frequency tracking is basically independent from the operation of the PLL loop of the carrier recovery circuit 9. Accordingly, even if the C/N ratio of the QPSK modulation signal is excessively low, influence of jitter in the carrier recovery circuit 9 on the frequency tracking of the VCO 25 can be substantially eliminated. Thus, demodulation characteristics are not deteriorated by the operation of a frequency tracking circuit 10.

Even if the QPSK modulation signal is significantly offset from the prescribed frequency, the offset frequency of the IF signal with respect to the oscillation frequency of the VCO 122 can be compensated for to a frequency range similar to the frequency of a reference oscillator 124 whichever channel is selected when the frequency detector 119 detects the offset frequency. Such compensation is realized by superimposing the offset frequency on the frequency dividing ratio of a variable frequency divider 123. Accordingly, even if the offset frequency increases, problems such as inferior operation of the AFC circuit 20 and extension of pull in time of the frequency of the AFC circuit 20 are avoided.

EXAMPLE 22

Figure 22:
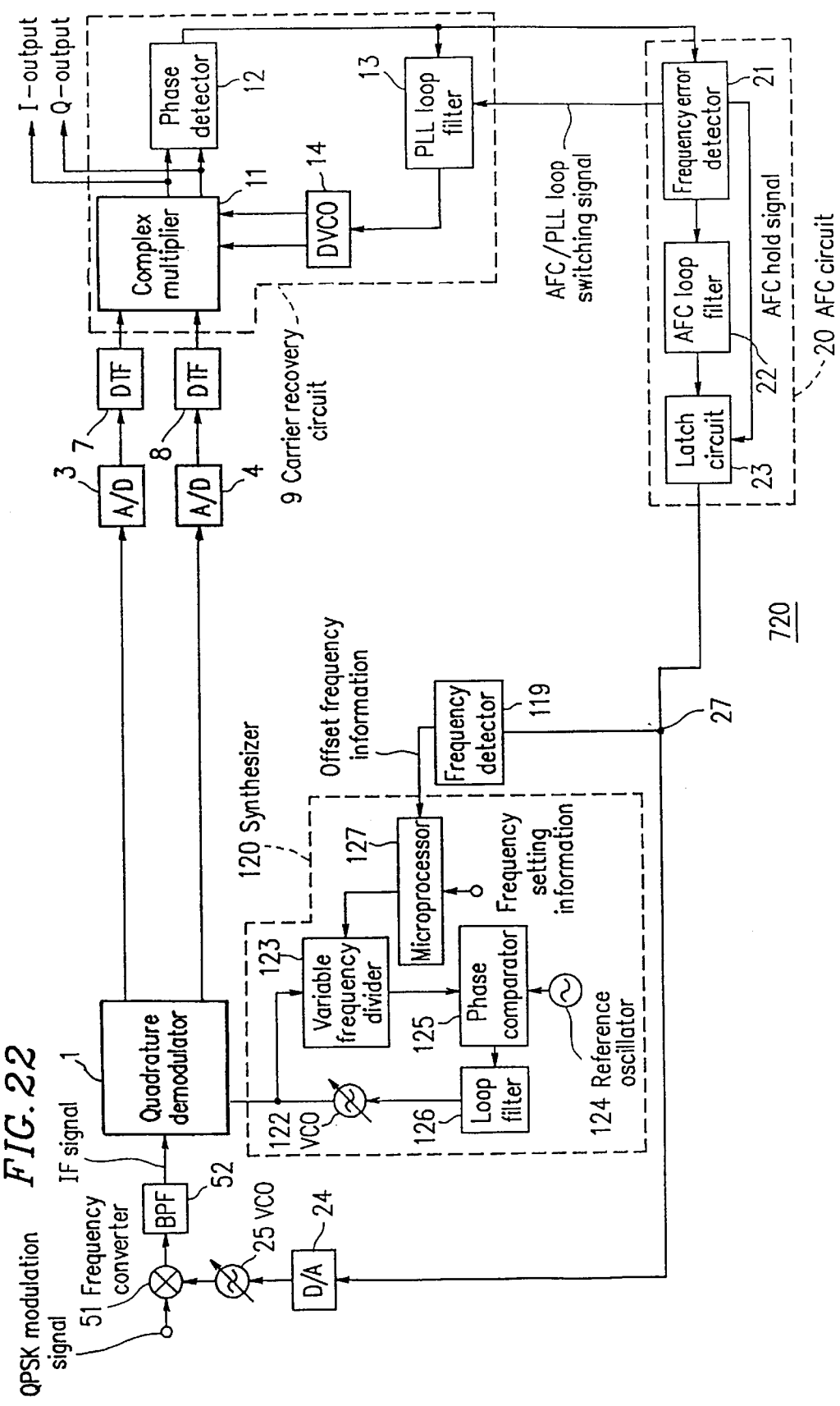
FIG. 22 is a block diagram of a demodulation apparatus in a twenty-second example according to the present invention.

FIG. 22 is a block diagram of a demodulation apparatus 720 in a twenty-second example according to the present invention.

In the demodulation apparatus 710 shown in FIG. 21, frequency control is performed in two systems, namely, the frequency tracking circuit 10 and the AFC circuit 20 for phase locking. In the demodulation apparatus 720 shown in FIG. 22, the frequency control is performed only in the AFC circuit 20. The same elements as those in FIG. 21 bear the same reference numerals, and detailed description thereof will be omitted.

In the demodulation apparatus 720, even if the QPSK modulation signal is significantly offset from a prescribed frequency, the offset frequency of the IF signal with respect to the oscillation frequency of the VCO 122 can be compensated for to a value which is substantially the same as the oscillation frequency of the reference oscillator 124 whichever channel is selected when the frequency detector 119 detects the offset frequency. Such compensation is realized by superimposing the offset frequency on the frequency dividing ratio of the variable frequency divider 123. Accordingly, even if the offset frequency increases, problems such as inferior operation of the AFC circuit 20 and extension of pull in time of the frequency of the AFC circuit 20.

EXAMPLE 23

Figure 23:
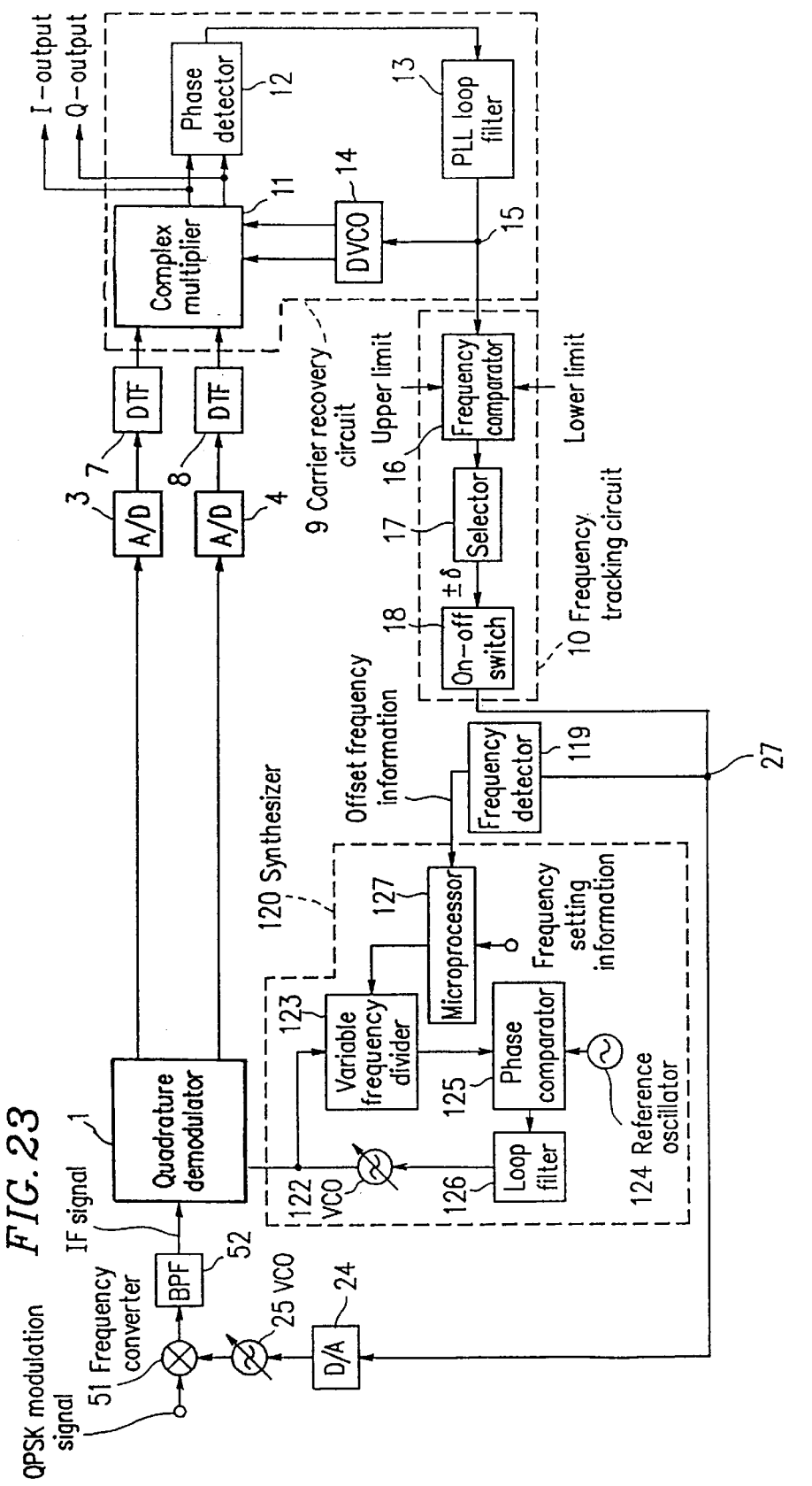
FIG. 23 is a block diagram of a demodulation apparatus in a twenty-third example according to the present invention.

FIG. 23 is a block diagram of a demodulation apparatus 730 in a twenty-third example according to the present invention.

In the demodulation apparatus 710 shown in FIG. 21, frequency control is performed in two systems, namely, the frequency tracking circuit 10 and the AFC circuit 20 for phase locking. In the demodulation apparatus 730 shown in FIG. 23, the frequency control is performed only in the frequency tracking circuit 10. The same elements as those in FIG. 21 bear the same reference numerals, and detailed description thereof will be omitted.

In the demodulation apparatus 730, even if the QPSK modulation signal is significantly offset from a prescribed frequency, the offset frequency of the IF signal with respect to the oscillation frequency of the VCO 122 can be compensated for to a frequency range similar to the frequency of the reference oscillation 124 whichever channel is selected when the frequency detector 119 detects the offset frequency. Such compensation is realized by superimposing the offset frequency on the frequency dividing ratio of the variable frequency divider 123. Accordingly, by setting the frequency range which can be pulled in by the carrier recovery circuit 9 to be slightly larger than the oscillation frequency of the reference oscillator 124, phase locking is realized with certainty in the carrier recovery circuit 9 even if the selected channel is changed, and problems such as extension of channel selection time are avoided.

Further, even if the offset frequency of the IF signal with respect to the oscillation frequency of the VCO 122 gradually changes during the operation of the demodulation apparatus 730 due to a drift of the center frequency of the QPSK modulation signal or the oscillation frequency of the VCO 25, the spectrum deviation of the I and Q baseband signals which are input to the DTFs 7 and 8 can be restricted within the range between the upper limit and the lower limit of the frequency comparator 16 by tracking the frequency of the VCO 25 while maintaining the phase locking state of the carrier recovery circuit 9. Accordingly, the deterioration in the error rate caused by the spectrum deviation of the I and Q baseband signals which are input to the DTFs 7 and 8 can be restricted to a value corresponding to the upper and the lower limits or less.

EXAMPLE 24

Figure 24:
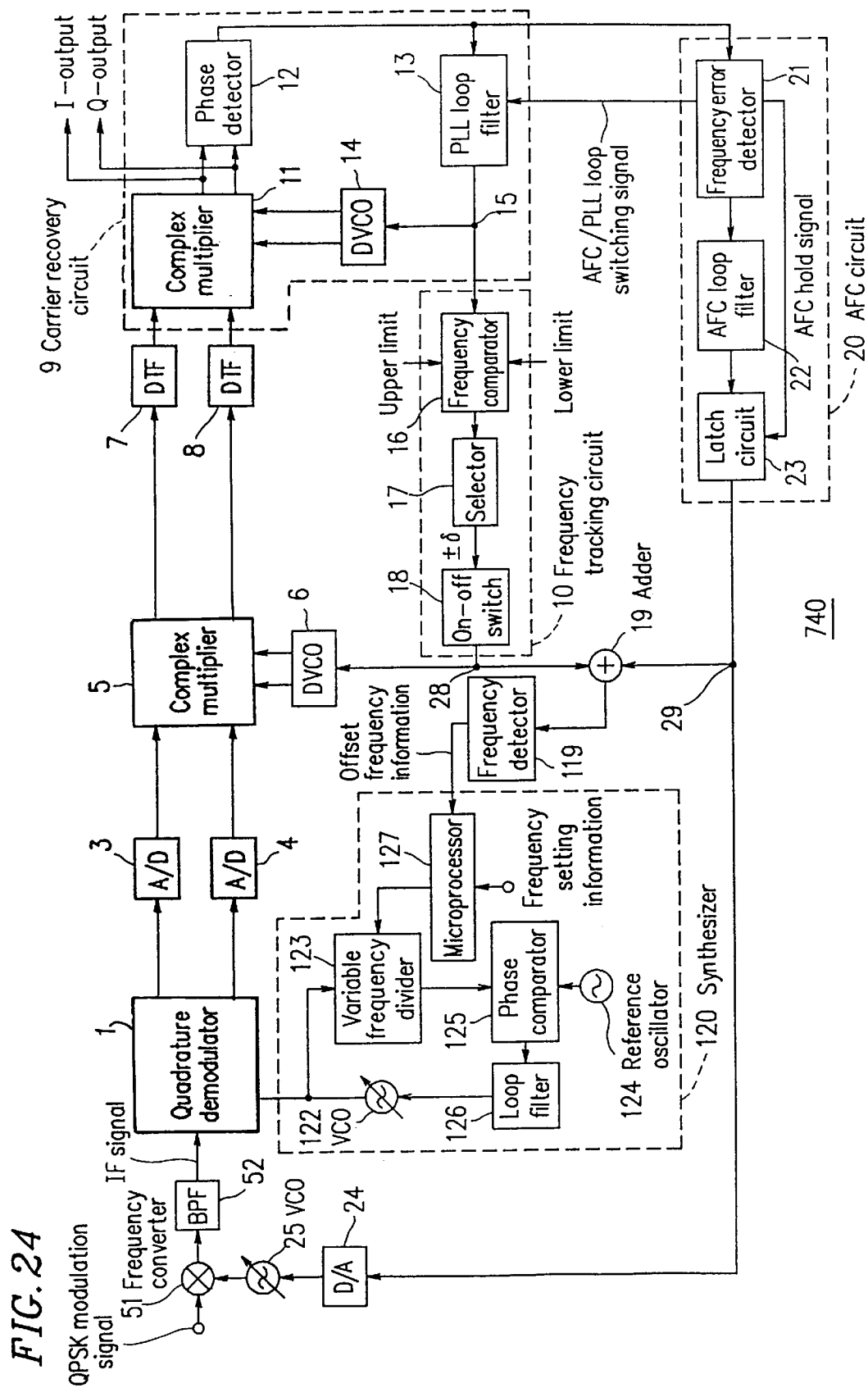
FIG. 24 is a block diagram of a demodulation apparatus in a twenty-fourth example according to the present invention.

FIG. 24 is a block diagram of a demodulation apparatus 740 in a twenty-fourth example according to the present invention. The same elements as those in FIG. 17 bear the same reference numerals, and detailed description thereof will be omitted.

In the demodulation apparatus 670 in FIG. 17, the local oscillator 2 is connected to the quadrature demodulator 1. The offset frequency detected by the frequency detector 119 is compensated for by the channel selection circuit 110. In the demodulation apparatus 740 in FIG. 24, a synthesizer 120 is connected to a quadrature demodulator 1 as an oscillator, and the offset frequency detected by a frequency detector 119 is compensated for by the synthesizer 120. The configuration and the functions of the synthesizer 120 are the same as in the demodulation apparatus 680 in FIG. 18, and detailed description thereof will be omitted.

In the demodulation apparatus 740, even if the QPSK modulation signal is significantly offset from the prescribed frequency, the offset frequency of the IF signal with respect to a oscillation frequency of a VCO 122 can be compensated for to the oscillation frequency of the reference oscillator 124 or less whichever channel is selected when the frequency detector 119 detects the offset frequency. Such compensation is realized by superimposing the offset frequency on the frequency dividing ratio of a variable frequency divider 123. Accordingly, even if the offset frequency increases, problems such as inferior operation of an AFC circuit 20 and extension of pull in time of the frequency of the AFC circuit 20 are avoided.

Further, even if the frequency deviation of the IF signal with respect to the oscillation frequency of the VCO 122 gradually changes by a drift of the center frequency of the QPSK modulation signal or the oscillation frequency of a VCO 25, the spectrum deviation of the I and Q baseband signals which are input to DTFs 7 and 8, which are brought by the changes in the frequency of the IF signal, can be restricted within the range between the upper limit and the lower limit of a frequency comparator 16 by tracking the frequency of a DVCO 6 while maintaining the phase locking state of a carrier recovery circuit 9. Accordingly, the deterioration in the error rate caused by the spectrum deviation of the I and Q baseband signals which are input to the DTFs 7 and 8 having a wave-shaping function can be restricted to a value corresponding to the upper and the lower limits or less.

EXAMPLE 25

Figure 25:
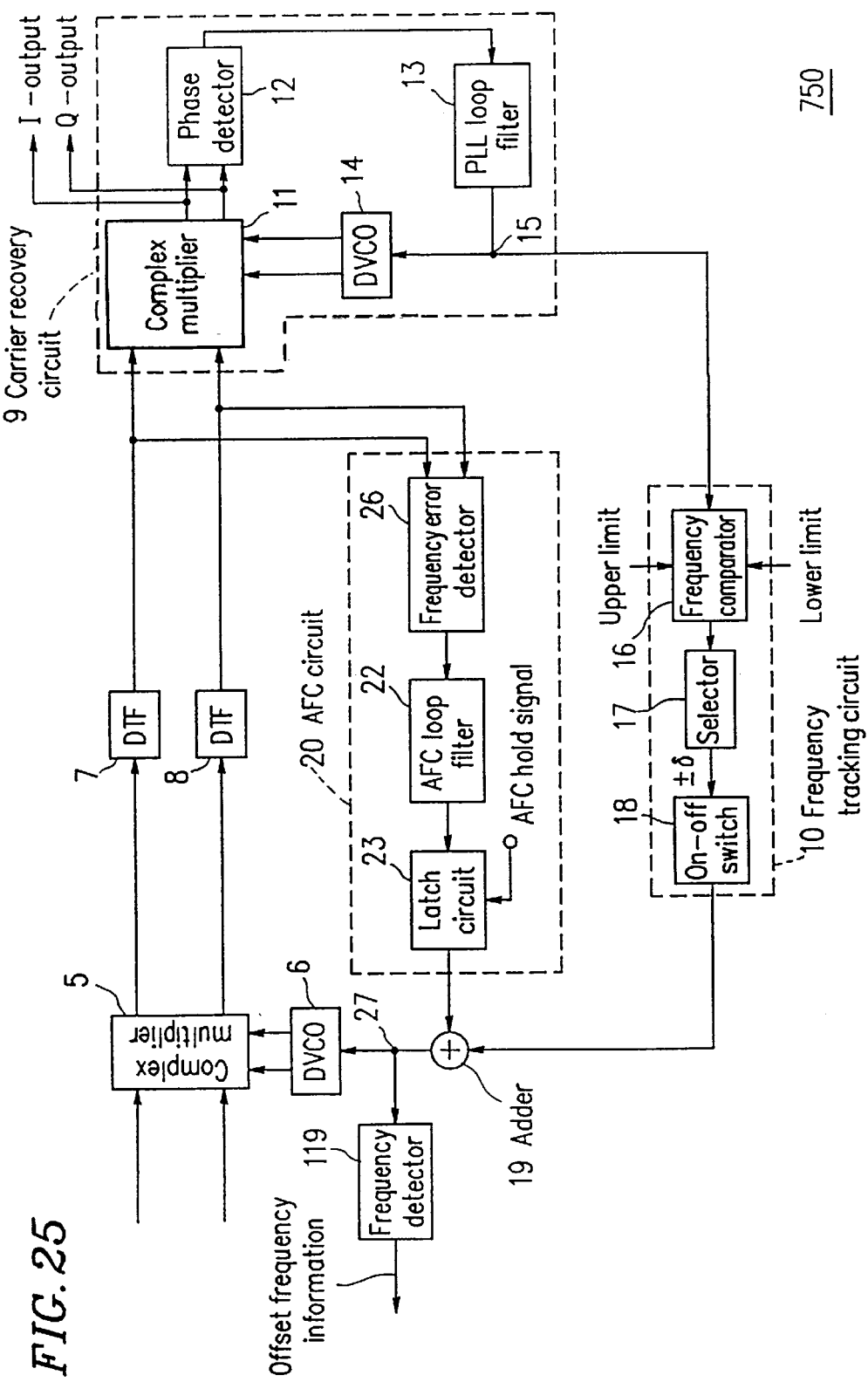
FIG. 25 is a partial block diagram of a demodulation apparatus in a twenty-fifth example according to the present invention.

FIG. 25 is a block diagram illustrating a part of a demodulation apparatus 750 in a twenty-fifth example according to the present invention.

In the demodulation apparatuses in the previous examples each including the AFC circuit 20, the frequency error detector 21 is connected to the phase detector 12. The frequency error of the I and Q baseband signals which are input to the complex multiplier 11 in the carrier recovery circuit 9 is obtained by a phase error signal obtained by the phase detector 12. In the demodulation apparatus 750 shown in FIG. 25, a frequency error detector 26 is connected to an input to the complex multiplier 11, and detects a frequency error or a spectrum deviation of the I and Q baseband signals which are input to the complex multiplier 11 in the carrier recovery circuit 9.

In the case when the frequency error of the I and Q baseband signals which are input to the complex multiplier 11 is sufficiently large, the AFC circuit 20 operates and thus the AFC loop functions so as to restrict the frequency error to be less than a reference value. The reference value is set to be within a frequency range which can be pulled in by the carrier recovery circuit 9. When the frequency error is reduced to less than the reference value and thus the carrier recovery circuit 9 which has not been in a phase locking state obtains the phase locking state, an AFC hold signal is supplied to the latch circuit 23, and thus the DVCO 6 operates at a constant oscillation frequency. When a synchronization is established in the carrier recovery circuit 9, the frequency tracking circuit 10 functions.

The AFC hold signal can be introduced after it is determined whether or not a frequency error detected by the frequency error detector 26 is less than the reference value. Alternatively, the AFC hold signal can be introduced after it is determined whether or not the carrier recovery circuit 9 is in a phase locking state. The frequency error detector 26 can have a general configuration including a delay device, a complex multiplier, and a frequency discriminator.

In the demodulation apparatus 750 in FIG. 25, the AFC loop in the AFC circuit 20 is independent from the state of the carrier recovery circuit 9. Accordingly, the AFC hold signal, which is a control signal for the AFC circuit 20, can be generated regardless of the state of the carrier recovery circuit 9. As a result, control of the entire demodulation apparatus 750 can be simplified.

In order to improve the precision for detecting the frequency error by the frequency error detector 26, the detection period needs to be extended. The carrier recovery circuit 9, which performs synchronous detection, detects the acquisition of carrier synchronism and the loss of carrier synchronism at a relatively high speed. Accordingly, by using a synchronous detection signal for the AFC hold signal, the speed of the loop control in the AFC circuit 20 can be raised, and thus the pull in time for the frequency can be shortened.

EXAMPLE 26

Figure 26:
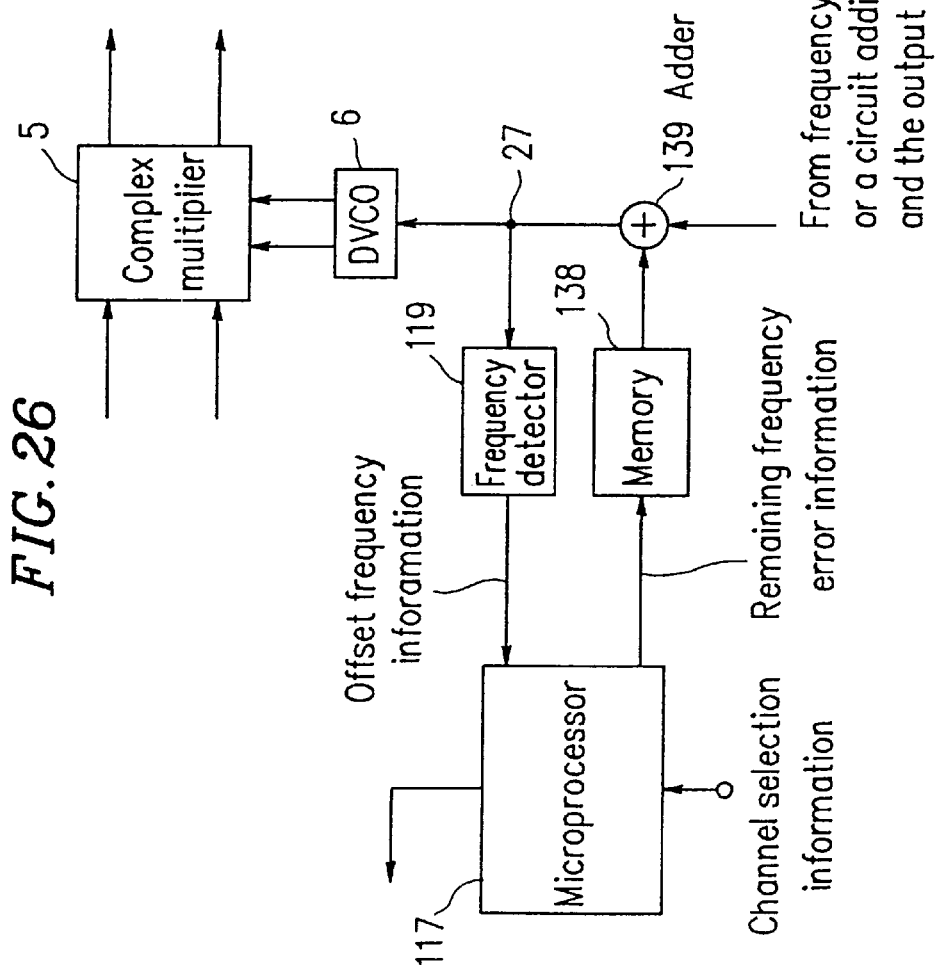
FIG. 26 is a partial block diagram of a demodulation apparatus in a twenty-sixth example according to the present invention.

FIG. 26 is a block diagram illustrating a part of a demodulation apparatus in a twenty-sixth example according to the present invention.

In the demodulation apparatuses in the previous examples, the frequency detected by the frequency detector 119 is added to the frequency dividing ratio of the variable frequency divider in the channel selection circuit 110 or in the synthesizer 120 as an offset frequency. In the demodulation apparatus 760 in FIG. 26, an offset frequency is added to the frequency dividing ratio of the variable frequency divider, and further a frequency error which cannot be removed by such addition (referred to as a "remaining frequency error") is obtained by the microprocessor 117. Information on the obtained remaining frequency error is returned to an adder 139 via a memory 138. The adder 139 has an output from the frequency tracking circuit 10, an output from the AFC circuit 20, or the sum of the two outputs, and the information on the remaining frequency error is added thereto. The result of the addition is fedback to the DVCO 6 as an offset frequency from a zero frequency, and thus the operating frequency of the DVCO 6 is controlled. Consequently, the oscillation frequency of the oscillator in the loop of the AFC circuit 20 or the frequency tracking circuit 10 is adjusted.

Especially in the case when the frequency tracking circuit 10 and the AFC circuit 20 control separate oscillators (the VCO or the DVCO), the demodulation apparatus 760 is designed to allow the oscillator controlled by the AFC circuit 20 to perform initial offset frequency setting of the oscillation frequency.

Hereinafter, a method for introducing remaining frequency error information will be described, referring to the demodulation apparatus 510 in FIG. 1 as an example.

For example, channel 1 is selected by the channel selection information. Where the center frequency of a QPSK modulation signal for channel 1 is fs1, the oscillation frequency of the VCO 112 with respect to channel 1 is f11, and the oscillation frequency of the local oscillator 2 is fo+Δf (Δf: deviation from the prescribed frequency), offset frequency information s1 obtained by the frequency detector 119 is given by equation (2) under the condition of fs1<f11.

$$s1 = f11 - fs1 - (fo + \Delta f) \quad (2)$$

In the case when the channel selection information is switched to select channel 2, the frequency deviation t of the I and Q baseband signals which are input to the complex multiplier 5 is given by equation (3) where the center frequency of the QPSK modulation signal for channel 2 is fs2, the oscillation frequency of the VCO 112 with respect to channel 2 is f12 under the condition of f2s<f12.

$$t = f12 - fs2 - (fo + \Delta f) \quad (3)$$

Equation (3) is expressed by equation (4) using s1.

$$t = s1 - (fs2 - fs1) + (f12 - f11) \quad (4)$$

The first term of the right side of equation (4) is offset frequency information obtained by the frequency detector 119, and the second term of the right side of equation (4) corresponds to a gap between frequencies of the channels 1 and 2 obtained from the channel selection information which is input to the microprocessor 117. The third term of the right side indicates a value obtained by multiplying the reference oscillation frequency of the reference oscillator 114 by an integer, and is determined so that the frequency deviation t will be a minimum value or the vicinity thereof.

The value t of the frequency deviation obtained from equation (4) using the above-mentioned three pieces of information is referred to as the remaining frequency error information. The I and Q baseband signals, having a frequency deviation t and input to the complex multiplier 5, are processed with frequency conversion by the operating frequency initially set for the DVCO 6 (set to be equal to the remaining frequency error t). The resultant signals are input to the carrier recovery circuit 9 as I and Q baseband signals with no spectrum deviation.

The above-described method for introducing the remaining frequency error information can be applied to the demodulation apparatus in each of the previous examples. In such a case, each piece of information mentioned in the above description is replaced with appropriate information in accordance with the configuration of each demodulation apparatus.

In the demodulation apparatus 760 in FIG. 26, the remaining frequency error which cannot be removed by adding an offset frequency to the frequency dividing ratio of the variable frequency divider 113 is compensated for by initial setting of the oscillation frequency of the oscillator in the loop of the AFC circuit 20 or the frequency tracking circuit 10. As a result, even if the frequency of the reference oscillator 114 in the channel selection circuit 110 or the reference oscillator 124 in the synthesizer 120 increases, the spectrum deviation of the I and Q baseband signals which are input to the carrier recovery circuit 9 does not increase at the time of channel selection. Accordingly, even in a demodulation apparatus having specification which prohibits phase noise of an oscillator in the channel selection circuit 110 or the synthesizer 120 to be ignored (for example, in the case where the transmission rate of the digital modulation signal is slow), deterioration on the error rate is avoided by increasing the frequency of the reference oscillator 114 or 124.

EXAMPLE 27

Figure 27:
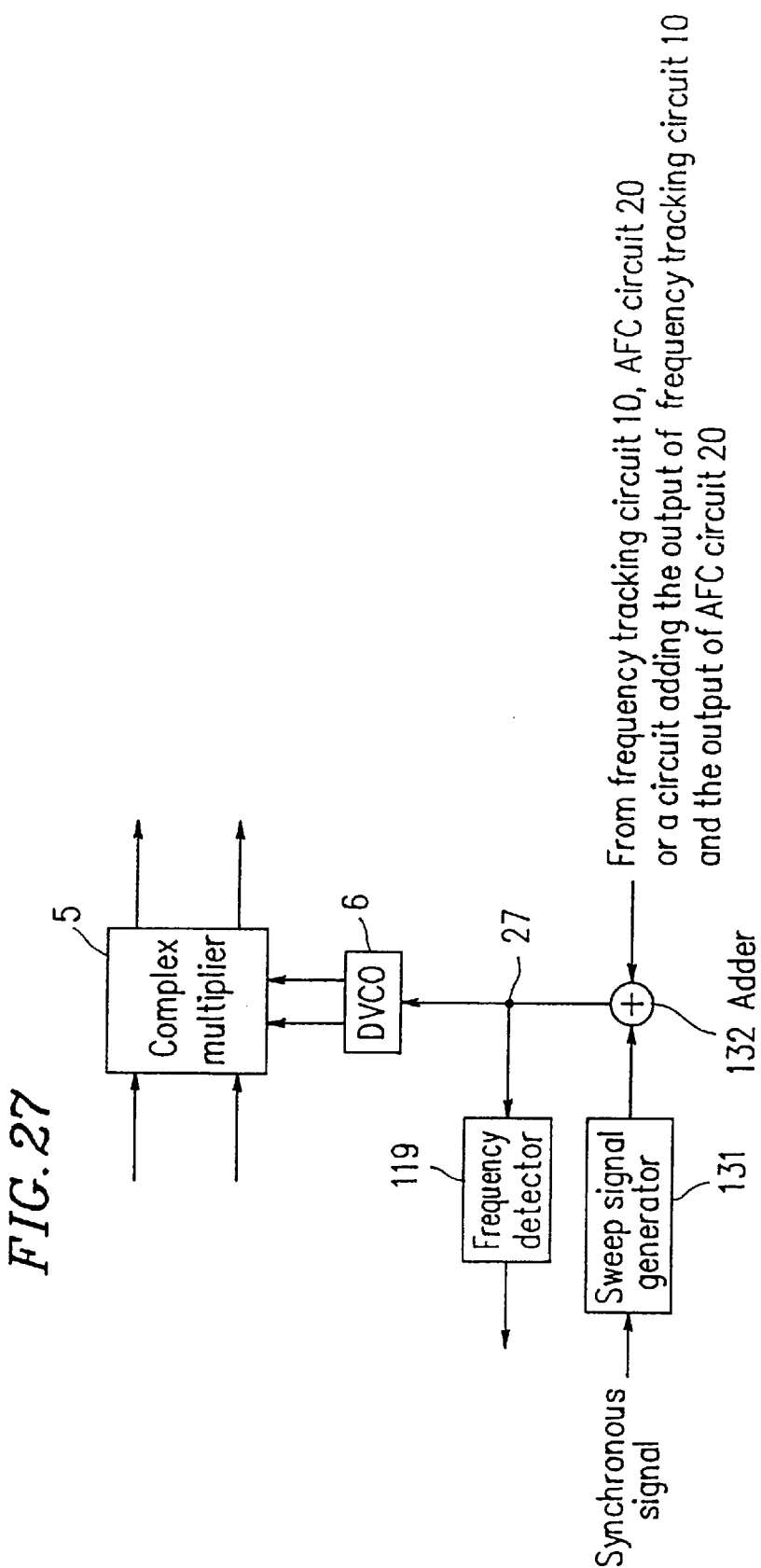
FIG. 27 is a partial block diagram of a demodulation apparatus shown in one of FIGS. 1 through 3 and 18 through 20 in which a DVCO is connected to a sweep signal generator.

FIG. 27 is a block diagram illustrating a part of a demodulation apparatus in a twenty-seventh example according to the present invention.

In detail, when the demodulation apparatus in any one of FIGS. 1 through 3 and FIGS. 18 through 20 is determined to be out of phase locking, a sweep signal generator 131 operates to forcibly sweep the operating frequency of the DVCO 6. The output signal from the sweep signal generator 131 is added to an adder 132. The adder 132 receives an output from the frequency tracking circuit 10, an output from the AFC circuit 20, or the sum of the two outputs. The output signal from the sweep signal generator 131 is added thereto. The result of the addition is fedback to the DVCO 6 as an offset frequency, and thus the operating frequency of the DVCO 6 is controlled. Consequently, the oscillation frequency of the oscillator in the loop in the AFC circuit 20 or the frequency tracking circuit 10 is controlled.

By such a configuration, even if a QPSK modulation signal having a large offset frequency is input to the demodulation apparatus when the demodulation apparatus starts up, the operating frequency of the DVCO 6 is swept in advance so as to counteract the offset frequency. Thus, the operating frequency of the DVCO 6 can be controlled so that the spectrum deviation of the digital I and Q baseband signals which are input to the complex multiplier 5 will be within the frequency range which can be pulled in by the AFC circuit 20 or the carrier recovery circuit 9. As a result, even if a QPSK modulation signal having a large offset frequency is input to the demodulation apparatus, the demodulation apparatus can operate normally.

EXAMPLE 28

Figure 28:
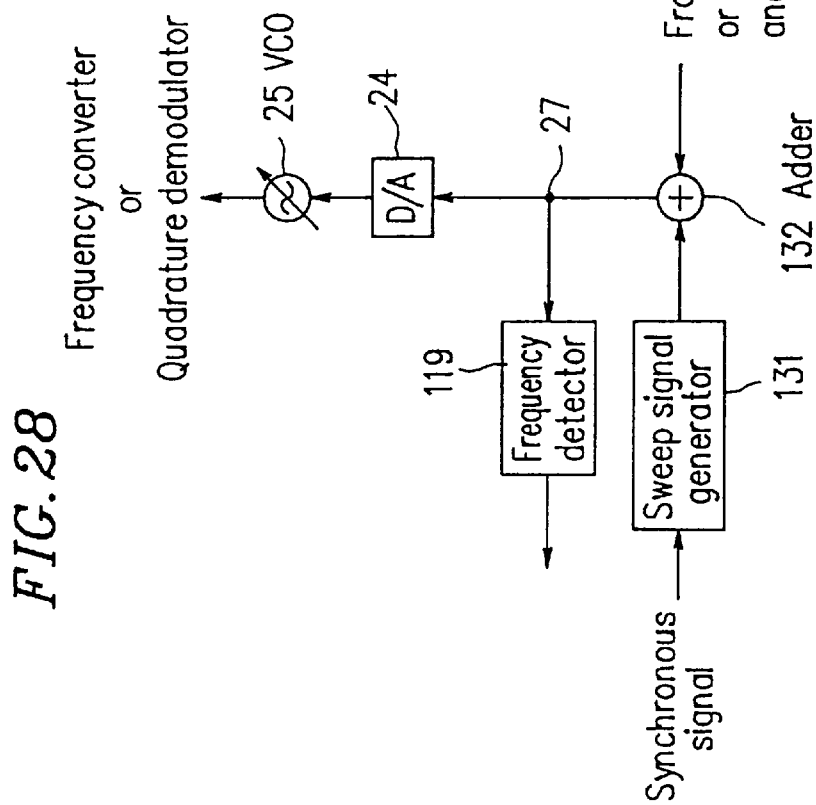
FIG. 28 is a partial block diagram of a demodulation apparatus shown in one of FIGS. 4 through 15 and 21 through 23 in which a VCO is connected to a sweep signal generator.

FIG. 28 is a block diagram illustrating a part of a demodulation apparatus in a twenty-eighth example according to the present invention.

In detail, when the demodulation apparatus in any one of FIGS. 4 through 15 and FIGS. 21 through 23 is determined to be out of phase locking, a sweep signal generator 131 operates to forcibly sweep the operating frequency of the VCO 25. The output signal from the sweep signal generator 131 is added to an adder 132. The adder 132 receives an output from the frequency tracking circuit 10, an output from the AFC circuit 20, or the sum of the two outputs. The output signal from the sweep signal generator 131 is added thereto. The result of the addition is fedback to the VCO 25 as an offset frequency, and thus the operating frequency of the VCO 25 is controlled. Consequently, the oscillation frequency of the oscillator in the loop in the AFC circuit 20 or the frequency tracking circuit 10 is controlled.

By such a configuration, even if a QPSK modulation signal having a large offset frequency is input to the demodulation apparatus when the demodulation apparatus starts up, the operating frequency of the VCO 25 is swept in advance so as to counteract the offset frequency. Thus, the oscillation frequency of the VCO 25 can be controlled so that the frequency deviation of the IF signal or the second IF signal which is input to the quadrature demodulator 1 or the frequency converter 51 will be within the frequency range which can be pulled in by the AFC circuit 20 or the carrier recovery circuit 9. As a result, even if a QPSK modulation signal having a large offset frequency is input to the demodulation apparatus, the demodulation apparatus can operate normally.

EXAMPLE 29

Figure 29:
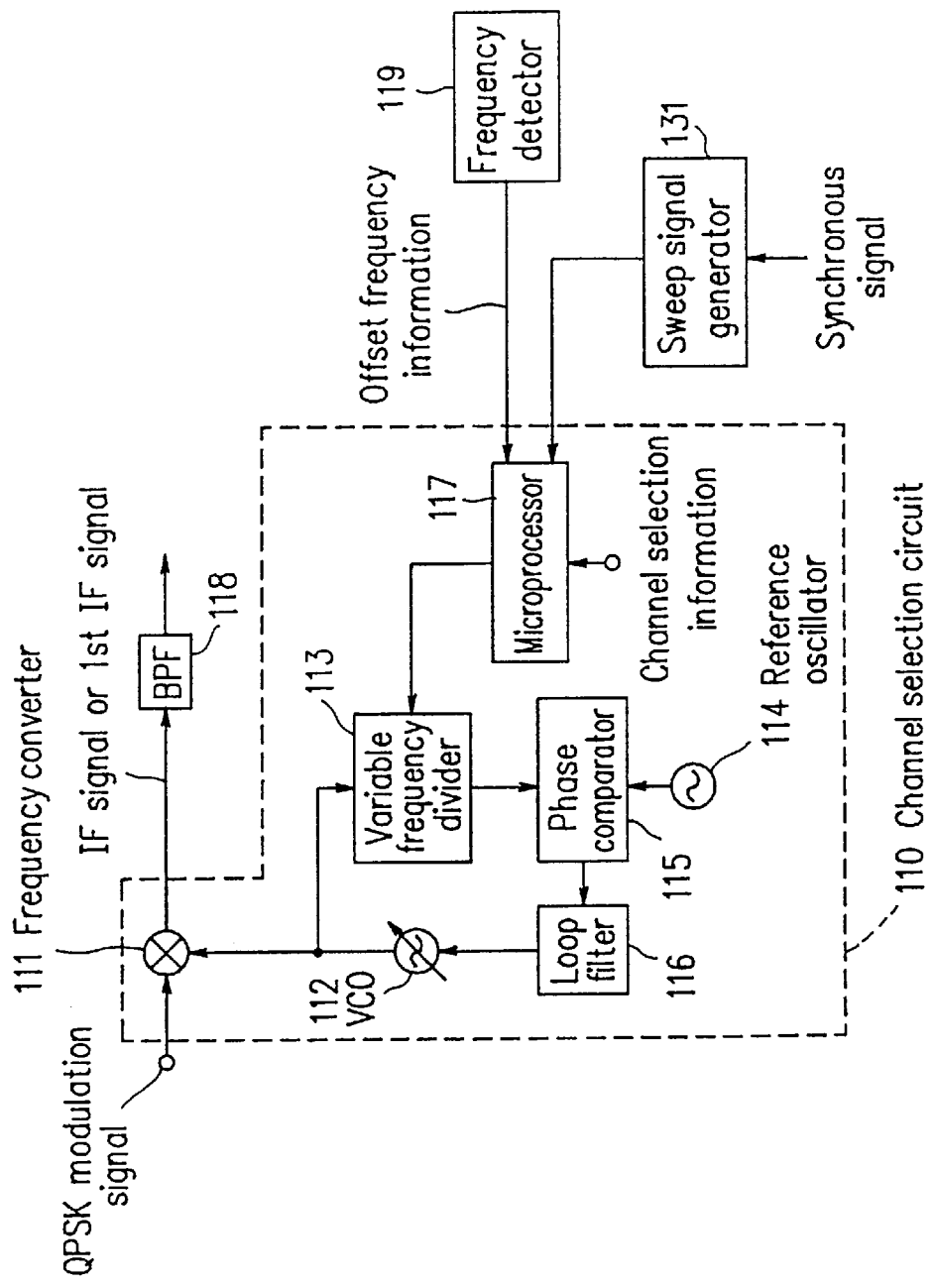
FIG. 29 is a partial block diagram of a demodulation apparatus shown in one of FIGS. 1 through 17 in which a channel selection circuit is connected to a sweep signal generator.

FIG. 29 is a block diagram illustrating a part of a demodulation apparatus in a twenty-ninth example according to the present invention.

In detail, when the demodulation apparatus in any one of FIGS. 1 through 17 is determined to be out of phase locking, a sweep signal generator 131 operates to supply a sweep signal to the microprocessor 117. The microprocessor 117 changes the frequency dividing ratio of the variable frequency divider 113 in the channel selection circuit 110 in accordance with the signal from the sweep signal generator 131 so as to forcibly sweep the frequency of the VCO 112.

By such a configuration, even if a QPSK modulation signal having a large offset frequency is input to the demodulation apparatus when the demodulation apparatus starts up, the operating frequency of the VCO 112 is swept in advance so as to counteract the offset frequency. Thus, the oscillation frequency of the VCO 112 can be controlled so that the frequency deviation of the first IF signal or the second IF signal which is input to the quadrature demodulator 1 or the frequency converter 111 will be within the frequency range which can be pulled in by the AFC circuit 20 or the carrier recovery circuit 9. As a result, even if a QPSK modulation signal having a large offset frequency is input to the demodulation apparatus, the demodulation apparatus can operate normally.

EXAMPLE 30

Figure 30:
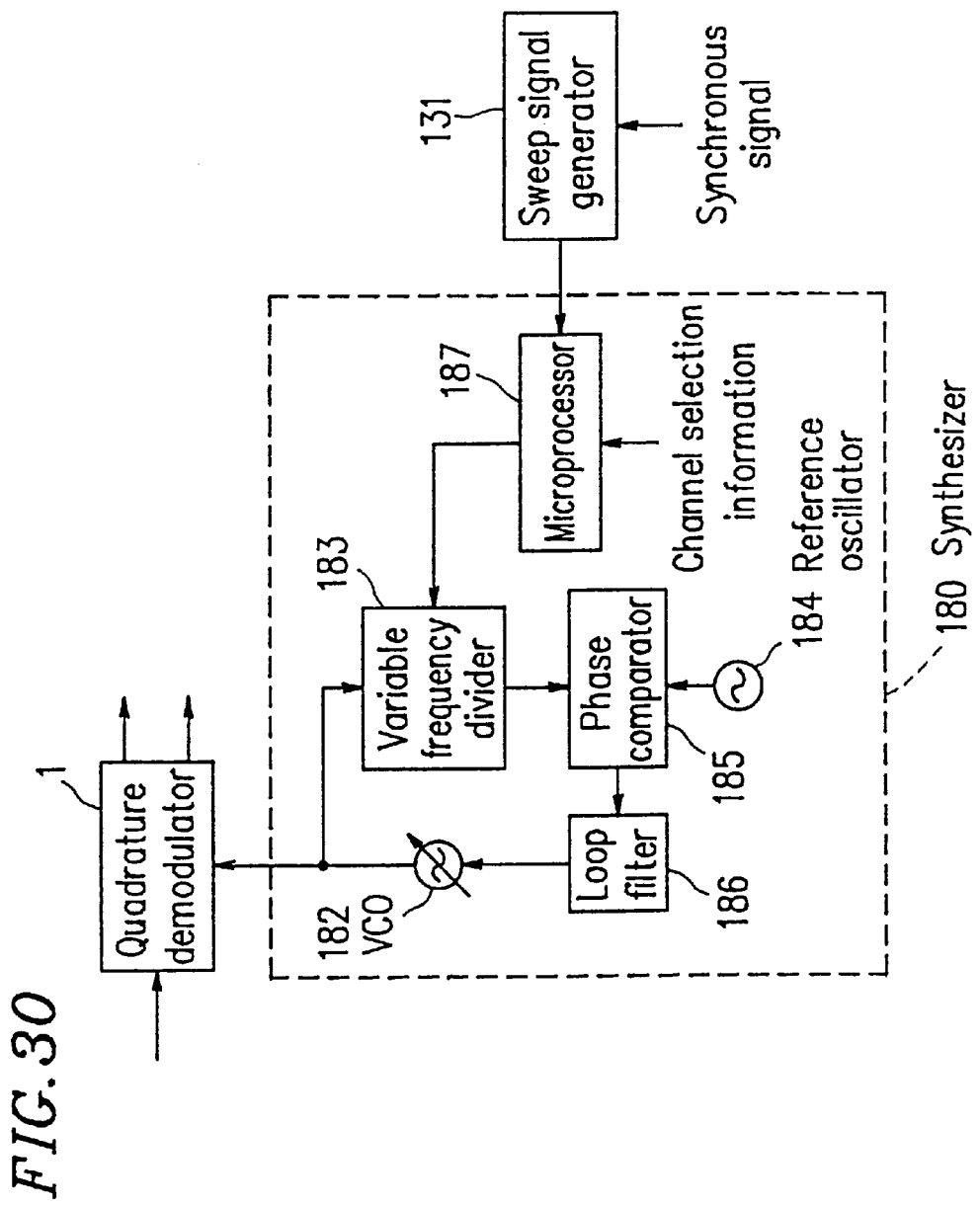
FIG. 30 is a partial block diagram of a demodulation apparatus shown in one of FIGS. 1 through 3, 7 through 9, and 17 in which a local oscillator is replaced with a synthesizer and the synthesizer is connected to a sweep signal generator.

FIG. 30 is a block diagram illustrating a part of a demodulation apparatus in a thirtieth example according to the present invention.

In detail, the demodulation apparatus in this example is obtained from any one of FIGS. 1 through 3, FIGS. 7 through 9, and FIG. 17 by replacing the local oscillator 2 with a variable-frequency synthesizer 180. When such a demodulation apparatus is determined to be out of phase locking, a sweep signal generator 131 operates to supply a sweep signal to the microprocessor 187. The microprocessor 187 changes the frequency dividing ratio of a variable frequency divider 183 in the synthesizer 180 in accordance with the signal from the sweep signal generator 131 so as to forcibly sweep the frequency of a VCO 182.

The synthesizer 180 includes the VCO 182, the variable frequency divider 183, a reference oscillator 184, a phase comparator 185, a loop filter 186, and the microprocessor 187. The basic functions of the synthesizer 180 are the same as those in the synthesizer 120 in the previous examples, and detailed description thereof will be omitted.

By such a configuration, even if a QPSK modulation signal having a large offset frequency is input to the demodulation apparatus when the demodulation apparatus starts up, the operating frequency of the VCO 182 is swept in advance so as to counteract the offset frequency. Thus, the oscillation frequency of the VCO 182 can be controlled so that an offset frequency of the first IF signal or the second IF signal will be within the frequency range which can be pulled in by the AFC circuit 20 or the carrier recovery circuit 9. As a result, even if a QPSK modulation signal having a large offset frequency is input to the demodulation apparatus, the demodulation apparatus can operate normally.

EXAMPLE 31

Figure 31:
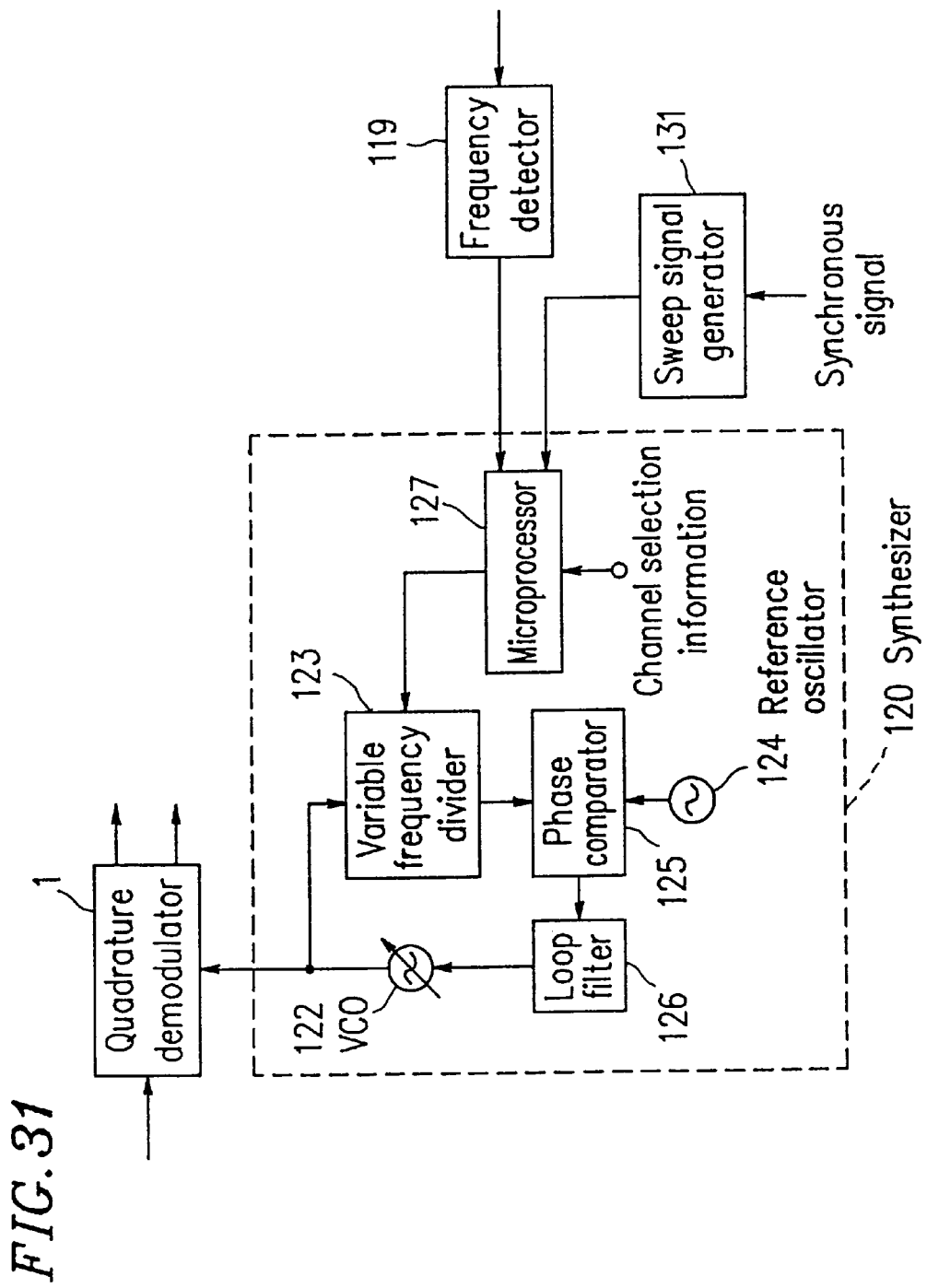
FIG. 31 is a partial block diagram of a demodulation apparatus shown in one of FIGS. 18 through 24 in which a synthesizer is connected to a sweep signal generator.

FIG. 31 is a block diagram illustrating a part of a demodulation apparatus in a thirty-first example according to the present invention.

In detail, when the demodulation apparatus in any one of FIGS. 18 through 24 is determined to be out of phase locking, a sweep signal generator 131 operates to forcibly sweep the operating frequency of the microprocessor 127. The microprocessor 127 changes the frequency dividing ratio of a variable frequency divider 123 in the synthesizer 120 in accordance with the signal from the sweep signal generator 131 so as to forcibly sweep the frequency of a VCO 122.

By such a configuration, even if a QPSK modulation signal or an IF signal having a large offset frequency is input to the quadrature demodulator 1 when the demodulation apparatus starts up, the operating frequency of the VCO 122 is swept in advance so as to counteract the offset frequency. Thus, the spectrum deviation of the I and Q baseband signals can be within the frequency range which can be pulled in by the AFC circuit 20 or the carrier recovery circuit 9. As a result, even if a QPSK modulation signal having a large offset frequency is input to the demodulation apparatus, the demodulation apparatus can operate normally.

Figure 32:
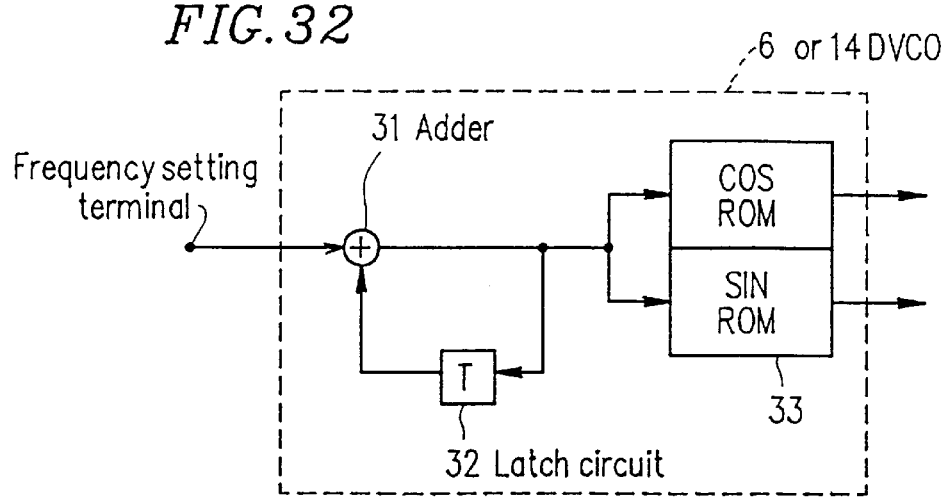
FIG. 32 is a block diagram of an example of a DVCO in a demodulation apparatus according to the present invention.

FIG. 32 is a block diagram illustrating an example of a DVCO 6 or 14 in the demodulation apparatus in the previous examples. The following description will be done regarding DVCO 6 as an example.

The DVCO 6 includes an adder 31 for allowing overflow and underflow, a latch circuit 32, and a ROM 33 storing a sine-cosine function. A signal which is input to a frequency setting terminal and a signal which is output from the adder 31 and then delayed by one clock by the latch circuit 32 are added by the adder 31, and then input to the ROM 33. The input signal to the ROM 33 corresponds to 0 to 360 degrees of an input phase of a COS signal and a SIN signal. Accordingly, the magnitude of the input signal to the DVCO 6, namely, the magnitude of the input signal to the adder 31 corresponds to a change of the phase of the COS signal and the SIN signal, namely, the oscillation frequency of the DVCO 6. The oscillation frequency of the DVCO 6 is found from the signal which is input to the frequency setting terminal of the DVCO 6.

The DVCO 14 operates in the same manner.

Figure 33:
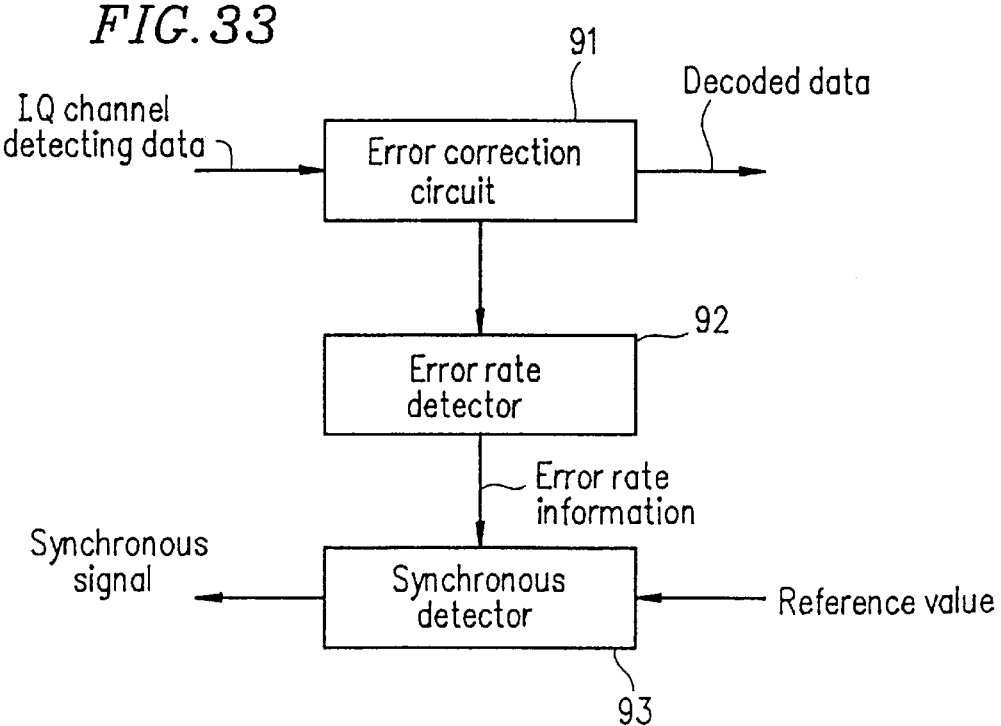
FIG. 33 is a block diagram of an example of a synchronous signal generator in a demodulation apparatus according to the present invention.

FIG. 33 is a block diagram of a system for detecting a synchronous signal.

I, Q channel data which is output from the demodulation apparatus is decoded by an error correction circuit 91 to generate decoded data. The decoded data is coded by a re-coder (not shown) in an error rate detector 92, and the resultant data is compared with the I, Q channel data. Thus, an error rate is detected. The obtained information on the error rate is compared with a reference value. If the error rate is smaller than the reference value, the demodulation apparatus is determined to be in a phase locking state, and a synchronous signal is output from a synchronous detector 93.

Figure 34:
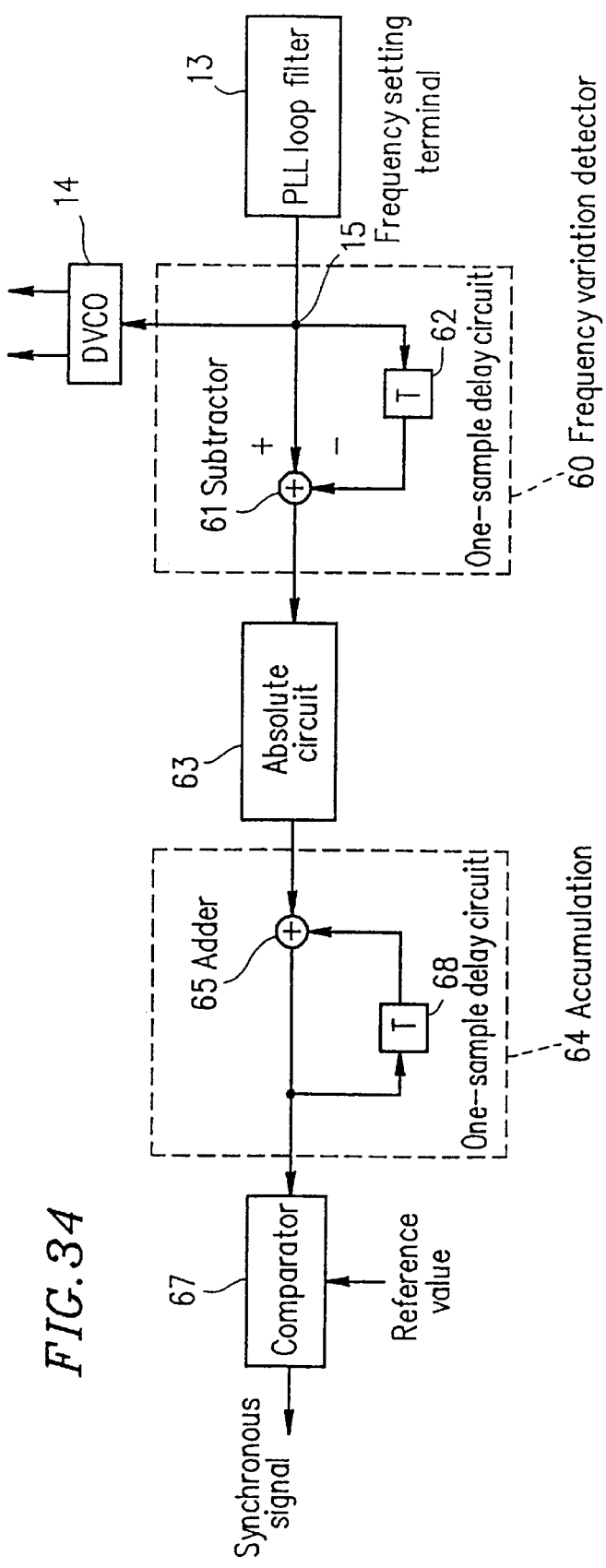
FIG. 34 is a block diagram of another example of a synchronous signal generator in a demodulation apparatus according to the present invention.

FIG. 34 is a block diagram of another system for detecting a synchronous signal.

As is described above with reference to FIG. 32, a signal which is input to a frequency setting terminal 15 of the DVCO 14 corresponds to the oscillation frequency of the DVCO 14. In a frequency variation detector 60 including a subtractor 61 and a one-sample delay circuit 62, a change amount in the frequency of the DVCO 14 is indicated as a positive or negative value as a difference between the input signal of the frequency setting terminal 15 and the input signal which is delayed by the one-sample delay circuit 62. The change amount in the frequency indicated as positive or negative value is converted into a positive frequency change amount by an absolute circuit 63, and is input to an accumulation circuit 64.

The accumulation circuit 64 includes an adder 65 and a one-sample delay circuit 68, and accumulates a certain number of input positive frequency change amounts. (The number is usually controlled by a counter.) Such an accumulated value is compared with the reference value by a comparator 67. If the accumulated value is larger than the reference value, the oscillation frequency of the DVCO 14 is unstable, and the carrier recovery circuit 9 is determined to be out of phase locking. Thus, an asynchronous signal is output. If the accumulated value is equal to or less than the reference value, the oscillation frequency of the DVCO 14 is stable, and the carrier recovery circuit 9 is determined to be in a phase locking state. Thus, a synchronous signal is output.

In the demodulation apparatus in each of FIGS. 4 through 9 and FIGS. 21 through 23, the DTFs 7 and 8 are provided after the A/D converters 3 and 4. The present invention is not limited to such a configuration. For example, a wave-shaping filter can include analog LPFs 77 and 78, in which case, the A/D converters 3 and 4 are provided after the analog LPFs 77 and 78. Such a configuration can provide the same functions and the same effects.

In each of the previous examples, a QPSK modulation signal is used as a digital modulation signal. The present invention is not limited to this. Any digital modulation signal which has an I baseband signal and a Q baseband signal having a quadrature relationship to each other and can be demodulated by a synchronous detection system can be used. For example, an offset QPSK modulation signal, an eight-phase PSK modulation signal, an MSK modulation signal, or a QAM modulation signal can be used.

In a demodulation apparatus according to the present invention, an input modulation signal is processed with frequency conversion by a conversion device to generate an IF signal. The IF signal is converted into an I baseband signal and a Q baseband signal having a quadrature relationship to each other by a demodulation device. For example, the conversion is performed using a quadrature demodulator included in the demodulation device.

The I and Q baseband signals are processed by a recovery device. For example, the I and Q baseband signals are converted into digital values by an A/D converter and then input to a first complex multiplier having a frequency conversion function. The first complex multiplier is connected to a first digital voltage-controlled oscillator having a local oscillation function. The I and Q baseband signals which are obtained by frequency conversion performed by the frequency of the first digital voltage-controlled oscillator have waveforms thereof shaped by a wave-shaping filter, and then input to a second complex multiplier having a phase rotation function. An output signal from the second complex multiplier is input to a phase detector, and a phase difference of the input signal with respect to a reference phase is detected. Based on the phase difference, a frequency error between the IF signal and the local oscillator, namely, an offset frequency of the operating frequency of the demodulation device is detected. Using the detected offset frequency, the operating frequency of the demodulation device is controlled through, for example, control of the oscillation frequency of the first digital voltage-controlled oscillator.

When the frequency error (offset frequency) between the IF signal and the local oscillator is compensated for by the first digital voltage-controlled oscillator, and the detected frequency error is reduced to a reference value or less, the frequency of the first digital voltage-controlled oscillator is fixed at a constant value. Simultaneously, a PLL circuit included in the recovery device and having a function of obtaining a recovered carrier starts operating. The PLL circuit smoothes a phase difference signal detected by the phase detector and inputs the resultant signal as a control signal for the second digital voltage-controlled oscillator. As a result, a recovered carrier in synchronization with the I and Q baseband signals which are input to the second complex multiplier are output from the second digital voltage-controlled oscillator. The output signals from the second complex multiplier are recovered I and Q signals corresponding to a transmitted data included in the input modulation signal.

In the case when the frequency error between the IF signal and the oscillation frequency of the local oscillator is compensated for by the frequency control performed by the first digital voltage-controlled oscillator and switched to the PLL circuit, and then the frequency error between the IF signal and the oscillation frequency of the local oscillator changes by a frequency drift of the input modulation signal or the local oscillator, the operating frequency of the second digital voltage-controlled oscillator follows such a frequency drift and changes simultaneously. Thus, carrier recovery is maintained. At this point, the operating frequency of the second digital voltage-controlled oscillator is compared with a range between a positive reference value and a negative reference value. If the operating frequency is out of the range, a frequency tracking signal is output to track the oscillation frequency of the first digital voltage-controlled oscillator.

The oscillation frequency of the first digital voltage-controlled oscillator is detected by the frequency detector, and the oscillation frequency of a voltage-controlled oscillator in a channel selection circuit is fine-tuned based on the resultant frequency information. By such fine-tuning, the frequency difference between the center frequency of the input modulation signal and the oscillation frequency of the local oscillator which is input to the quadrature demodulator is reduced to a minimum frequency control width of the voltage-controlled oscillator.

In the case where a fine-tune control device for fine-tuning the oscillation frequency of the voltage-controlled oscillator in the channel selection circuit controls the oscillation frequency in a step-like manner discontinuously, a remaining frequency error which is less than the minimum frequency control width of the voltage-controlled oscillator and thus cannot be compensated for by the above-mentioned fine-tuning can be compensated for by setting the initial oscillation frequency of another oscillator (for example, the first digital voltage-controlled oscillator) in the state of being offset from the center frequency. By such operation, the spectrum deviation of the I and Q baseband signals can be reduced to a minimum possible amount.

As has been described so far, in a demodulation apparatus according to the present invention, even if the center frequency of the IF signal offsets from a prescribed frequency to increase an offset frequency significantly after the operation of the AFC circuit is stopped by the AFC hold signal, the spectrum deviation of the I and Q baseband signals which are input to the DTFs can be restricted within a range between an upper limit and a lower limit of a frequency comparator by tracking the frequency of the DVCO while maintaining the phase locking state of the carrier recovery circuit. By such operation, the deterioration in the error rate caused by the spectrum deviation of the I and Q baseband signals which are input to the DTFs can be restricted to a value corresponding to the range or less.

Further, since the frequency tracking of the DVCO is performed slowly while the phase locking of the carrier recovery circuit is maintained, the deterioration in the error rate caused by the frequency tracking of the DVCO is restricted.

Moreover, the frequency tracking of the DVCO is performed by comparing the frequency of a DVCO included in the PLL loop with the upper limit or the lower limit of the frequency comparator. Such frequency tracking is basically independent from the operation of the PLL loop of the carrier recovery circuit. Accordingly, even if the C/N ratio of the QPSK modulation signal is excessively low, influence of jitter in the carrier recovery circuit on the frequency tracking of the DVCO can be substantially eliminated. Thus, demodulation characteristics do not deteriorate by the operation of the frequency tracking circuit.

Even if the QPSK modulation signal significantly offsets from the prescribed frequency, the offset frequency of the IF signal with respect to the oscillation frequency of the local oscillator can be compensated for whichever channel is selected when the frequency detector detects the offset frequency. Such compensation is realized by superimposing the offset frequency on the frequency dividing ratio of the variable frequency divider. Accordingly, even if the offset frequency increases, problems such as inferior operation of the AFC circuit and extension of pull in time of the frequency of the AFC circuit are avoided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A demodulation apparatus, comprising:
    conversion means, which includes a local oscillator for generating a local oscillation signal having an oscillation frequency which changes in accordance with channel selection information, for selecting a signal corresponding to a prescribed channel from input modulation signals in accordance with the channel selection information and performing frequency conversion of the selected signal into an IF signal;
    demodulation means for demodulating the IF signal into an I baseband signal and a Q baseband signal having a quadrature relationship to each other;
    recovery means, which includes a recovered carrier generator for generating a recovered carrier based on the I baseband signal and the Q baseband signal having the quadrature relationship to each other, for outputting a recovered I output signal and a recovered Q output signal;
    first control means for detecting a frequency error of the baseband signals based on the I baseband signal and the Q baseband signal, and feeding back the detected frequency error to a second voltage-controlled oscillator included in the first control means and having an output provided to the demodulation means so as to automatically remove the detected frequency error;
    transmission means for detecting information on an offset frequency of the second voltage-controlled oscillator, which is a difference between a frequency of the second voltage-controlled oscillator and a prescribed frequency of the second voltage-controlled oscillator, and transmitting the detected information on the offset frequency to the conversion means; and
    second control means included in the conversion means for controlling the oscillation frequency of the local oscillation signal generated by the local oscillator based on the information on the offset frequency to control a frequency of the IF signal so as to remove the offset frequency of the second voltage-controlled oscillator,
    wherein a frequency control of the second voltage-controlled oscillator in the first control means and a frequency control of the local oscillator in the conversion means are performed using different oscillating means from each other.

2. A demodulation apparatus according to claim 1, wherein the conversion means includes:
    a frequency converter for performing frequency conversion of the signal selected from the input modulation signals to generate the IF signal, and
    a channel selection circuit, including the local oscillator having the oscillation frequency which changes in accordance with the channel selection information, for supplying the local oscillation signal of the local oscillator to the frequency converter,
    wherein the demodulation means includes:
    a quadrature demodulator for demodulating the IF signal to the I baseband signal and the Q baseband signal having a quadrature relationship to each other,
    a local oscillator for generating an output to be sent to the quadrature demodulator,
    an A/D converter for converting the I baseband signal and the Q baseband signal into digital signals,
    a first complex multiplier, connected to a first digital voltage-controlled oscillator serving as the second voltage-controlled oscillator, for performing complex multiplication of the digital signals obtained by the A/D converter and an output from the first digital voltage-controlled oscillator, and
    a low-pass wave-shaping filter for shaping a waveform of the output signal from the first complex multiplier,
    wherein the recovery means includes:
    a second complex multiplier for performing complex multiplication of the output signal from the low-pass wave-shaping filter and the recovered carrier, and
    PLL means for smoothing a phase error of the output signal from the second complex multiplier and supplying the smoothed phase error to a second digital voltage-controlled oscillator to generate the recovered carrier, wherein the transmission means include a frequency detector for detecting an oscillation frequency of the first digital voltage-controlled oscillator, and wherein the channel selection circuit includes fine-tune control means for receiving the frequency information obtained by the frequency detector and fine-tuning the oscillation frequency of the local oscillator included in the channel selection circuit.

3. A demodulation apparatus according to claim 2, wherein the first control means includes at least one of:

frequency control means for detecting an error of a frequency of the I baseband signal and the Q baseband signal from a prescribed frequency and smoothing the frequency error to control the oscillation frequency of the first digital voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range.

4. A demodulation apparatus according to claim 1, wherein the conversion means includes:

a frequency converter for performing frequency conversion of the signal selected from the input modulation signals to generate the IF signal, and a channel selection circuit, including the local oscillator which comprises a first voltage-controlled oscillator, for supplying the local oscillation signal of the first voltage-controlled oscillator to the frequency converter, wherein the demodulation means includes:

a quadrature demodulator for demodulating the IF signal to the I baseband signal and the Q baseband signal having the quadrature relationship to each other, an A/D converter for converting the I baseband signal and the Q baseband signal into digital signals, and a low-pass wave-shaping filter for shaping a waveform of the output signals from the A/D converter, wherein the recovered carrier generator in the recovery means includes:

a digital voltage-controlled oscillator for generating a recovered carrier, wherein the recovery means further includes:

a complex multiplier, connected to the digital voltage-controlled oscillator, for performing complex multiplication of the digital signals obtained by the A/D converter and filtered by the low-pass wave shaping filter with the output from the digital voltage-controlled oscillator, and PLL means for smoothing a phase error of the output signal from the complex multiplier and supplying the smoothed phase error to the digital voltage-controlled oscillator to generate the recovered carrier, wherein the transmission means include a frequency detector for detecting an offset frequency of the second voltage-controlled oscillator, wherein the first control means includes automatic frequency control means for feeding back a frequency error signal detected from the baseband signals to the second voltage-controlled oscillator, and wherein the second control means is fine-tune control means for receiving the offset frequency information obtained by the frequency detector included in the transmission means and fine-tuning the oscillation frequency of the first voltage-controlled oscillator included in the channel selection circuit.

5. A demodulation apparatus according to claim 4, wherein the first control means includes at least one of:

frequency control means for detecting an error of a frequency of the I baseband signal and the Q baseband signal from a prescribed frequency and smoothing the frequency error to control the oscillation frequency of the second voltage-controlled oscillator, and a frequency tracking circuit for determining whether the oscillation frequency of the digital voltage-controlled oscillator goes beyond a range between a positive reference value and a negative reference value and, in the case when the oscillation frequency goes beyond one of the positive reference value and the negative reference value, tracking the oscillation frequency of the second voltage-controlled oscillator to limit the oscillation frequency of the digital voltage-controlled oscillator within the range.

6. A demodulation apparatus according to claim 1, wherein the conversion means includes:

a first frequency converter for performing frequency conversion of the signal selected from the input modulation signals to generate a first IF signal, a channel selection circuit, including the local oscillator having the oscillation frequency which changes in accordance with the channel selection information, for supplying the local oscillation signal of the local oscillator to the first frequency converter, and a second frequency converter, connected to the second voltage-controlled oscillator as part of the demodulating means, for performing frequency conversion of the first IF signal to generate a second IF signal, wherein the demodulation means includes:

a quadrature demodulator for demodulating the second IF signal to the I baseband signal and the Q baseband signal having a quadrature relationship to each other, a local oscillator for generating an output to be sent to the quadrature demodulator, an A/D converter for converting the I baseband signal and the Q baseband signal into digital signals, and a low-pass wave-shaping filter for shaping a waveform of the output signal from the A/D converter, wherein the recovery means includes:

a complex multiplier, connected to a digital voltage-controlled oscillator, for performing complex multiplication of the digital signals obtained by the A/D converter and the output from the digital voltage-controlled oscillator, and PLL means for smoothing a phase error of the output signal from the complex multiplier and supplying the smoothed phase error to the digital voltage-controlled oscillator to generate the recovered carrier, wherein the transmission means include a frequency detector for detecting an oscillation frequency of the second voltage-controlled oscillator, and wherein the channel selection circuit includes fine-tune control means for receiving the frequency information obtained by the frequency detector and fine-tuning the oscillation frequency of the local oscillator included in the channel selection circuit.

7. A demodulation apparatus according to claim 6, wherein the first control means includes at least one of:
   frequency control means for detecting an error of a frequency of the I baseband signal and the Q baseband signal from a prescribed frequency and smoothing the frequency error to control the oscillation frequency of the second voltage-controlled oscillator, and
   a frequency tracking circuit for determining whether the oscillation frequency of the digital voltage-controlled oscillator goes beyond a range between positive reference value and a negative reference value and, in the case when the oscillation frequency goes beyond one of the positive reference value and the negative reference value, tracking the oscillation frequency of the second voltage-controlled oscillator to allow the oscillation frequency of the digital voltage-controlled oscillator within the range.

8. A demodulation apparatus according to claim 1, wherein the conversion means includes:
   a first frequency converter for performing frequency conversion of the signal selected from the input modulation signals to generate a first IF signal,
   a channel selection circuit, including the local oscillator having an oscillation frequency which changes in accordance with the channel selection information, for supplying the local oscillation signal of the local oscillator to the first frequency converter, and
   a second frequency converter, connected to the second voltage-controlled oscillator as part of the demodulating means, for performing frequency conversion of the first IF signal to generate a second IF signal,
wherein the demodulation means includes:
   a band-pass wave-shaping filter for shaping a waveform of the second IF signal,
   a quadrature demodulator for demodulating the second IF signal to the I baseband signal and the Q baseband signal having a quadrature relationship to each other,
   a local oscillator having an oscillation frequency which is set to be equal to a center frequency of the band-pass wave-shaping filter, for generating an output to be sent to the quadrature demodulator, and
   an A/D converter for converting the I baseband signal and the Q baseband signal into digital signals,
wherein the recovery means includes:
   a complex multiplier, connected to a digital voltage-controlled oscillator, for performing complex multiplication of the digital signals obtained by the A/D converter and the recovered carrier, and
   PLL means for smoothing a phase error of the output signal from the complex multiplier and supplying the smoothed phase error to the digital voltage-controlled oscillator to generate the recovered carrier,
wherein the transmission means include a frequency detector for detecting an oscillation frequency of the second voltage-controlled oscillator, and
wherein the channel selection circuit includes fine-tune control means for receiving the frequency information obtained by the frequency detector and fine-tuning the oscillation frequency of the local oscillator included in the channel selection circuit.

9. A demodulation apparatus according to claim 8, wherein the first control means includes at least one of:
   frequency control means for detecting an error of a frequency of the I baseband signal and the Q baseband signal from a prescribed frequency and smoothing the frequency error to control the oscillation frequency of the second voltage-controlled oscillator, and
   a frequency tracking circuit for determining whether the oscillation frequency of the digital voltage-controlled oscillator goes beyond a range between positive reference value and a negative reference value and, in the case when the oscillation frequency goes beyond one of the positive reference value and the negative reference value, tracking the oscillation frequency of the second voltage-controlled oscillator to allow the oscillation frequency of the digital voltage-controlled oscillator within the range.

10. A demodulation apparatus according to claim 1, wherein the conversion means includes:
   a first frequency converter for performing frequency conversion of the signal selected from the input modulation signals to generate a first IF signal,
   a channel selection circuit, including the local oscillator having an oscillation frequency which changes in accordance with the channel selection information, for supplying the local oscillation signal of the local oscillator to the first frequency converter, and
   a second frequency converter, connected to the second voltage-controlled oscillator as part of the demodulating means, for performing frequency conversion of the first IF signal to generate a second IF signal,
wherein the demodulation means includes:
   a band-pass wave-shaping filter for shaping a waveform of the second IF signal,
   an A/D converter for converting the second IF signal into a digital signal,
   a digital frequency converter for converting the digital second IF signal obtained by the A/D converter into a digital baseband signal, and
   an I/Q separation circuit for dividing the digital baseband signal into an I baseband signal and a Q baseband signal having a quadrature relationship to each other, and
wherein the recovery means includes:
   a complex multiplier, connected to a digital voltage-controlled oscillator, for performing complex multiplication of the I baseband signal and the Q baseband signal and the recovered carrier, and
   PLL means for smoothing a phase error of the output signal from the complex multiplier and supplying the smoothed phase error to the digital voltage-controlled oscillator to generate the recovered carrier,
wherein the transmission means include a frequency detector for detecting an oscillation frequency of the second voltage-controlled oscillator, and
wherein the channel selection circuit includes fine-tune control means for receiving the frequency information obtained by the frequency detector and fine-tuning the oscillation frequency of the local oscillator included in the channel selection circuit.

11. A demodulation apparatus according to claim 10, wherein the first control means includes at least one of:
   frequency control means for detecting an error of a frequency of the I baseband signal and the Q baseband signal from a prescribed frequency and smoothing the frequency error to control the oscillation frequency of the second voltage-controlled oscillator, and
   a frequency tracking circuit for determining whether the oscillation frequency of the digital voltage-controlled oscillator goes beyond a range between positive reference value and a negative reference value and, in the case when the oscillation frequency goes beyond one of the positive reference value and the negative reference value, tracking the oscillation frequency of the second voltage-controlled oscillator to allow the oscillation frequency of the digital voltage-controlled oscillator within the range.

12. A demodulation apparatus according to claim 1, wherein the conversion means includes:

a frequency converter for performing frequency conversion of the signal selected from the input modulation signals to generate the IF signal, and a channel selection circuit, including the local oscillator having the oscillation frequency which changes in accordance with the channel selection information, for supplying the local oscillation signal of the local oscillator to the frequency converter, wherein the demodulation means includes:

a quadrature demodulator for demodulating the IF signal to the I baseband signal and the Q baseband signal having a quadrature relationship to each other, the second voltage-controlled oscillator for generating the output to be sent to the quadrature demodulator, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier, wherein the recovery means includes:

a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier, wherein the first control means includes:

frequency control means for detecting an error of a frequency of the I baseband signal and the Q baseband signal from a prescribed frequency and smoothing the frequency error to control the oscillation frequency of the second voltage-controlled oscillator, and a frequency tracking circuit for determining whether the oscillation frequency of the second digital voltage-controlled oscillator goes beyond a range between a positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range, wherein the transmission means include a frequency detector for detecting a frequency amount obtained by summing a frequency deviation of the oscillation frequency of the second voltage-controlled oscillator from a prescribed frequency and the oscillation frequency of the first digital voltage-controlled oscillator, and wherein the channel selection circuit includes fine-tune control means for receiving the frequency information obtained by the frequency detector and fine-tuning the oscillation frequency of the local oscillator included in the channel selection circuit.

13. A demodulation apparatus according to claim 1, wherein the conversion means includes:

a first frequency converter for performing frequency conversion of the signal selected from the input modulation signals to generate a first IF signal, a channel selection circuit, including the local oscillator having the oscillation frequency which changes in accordance with the channel selection information, for supplying the local oscillation signal of the local oscillator to the first frequency converter, and a second frequency converter, connected to the second voltage-controlled oscillator as part of the demodulating means, for performing frequency conversion of the first IF signal to generate a second IF signal, wherein the demodulation means includes:

a quadrature demodulator for demodulating the second IF signal to the I baseband signal and the Q baseband signal having a quadrature relationship to each other, a local oscillator for generating an output to be sent to the quadrature demodulator, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier, wherein the recovery means includes:

a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier, wherein the first control means includes:

frequency control means for detecting an error of a frequency of the I baseband signal and the Q baseband signal from a prescribed frequency and smoothing the frequency error to control the oscillation frequency of the second voltage-controlled oscillator, and a frequency tracking circuit for determining whether the oscillation frequency of the second digital voltage-controlled oscillator goes beyond a range between a positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range, wherein the transmission means include a frequency detector for detecting a frequency amount obtained by summing a frequency deviation of the oscillation frequency of the second voltage-controlled oscillator from a prescribed frequency and the oscillation frequency of the first digital voltage-controlled oscillator, and wherein the channel selection circuit includes fine-tune control means for receiving the frequency information obtained by the frequency detector and fine-tuning the oscillation frequency of the first voltage-controlled oscillator included in the channel selection circuit.

14. A demodulation apparatus, comprising:

conversion means for performing frequency conversion of an input modulation signal into an IF signal;

demodulation means for demodulating the IF signal into an I baseband signal and a Q baseband signal having a quadrature relationship to each other;

local oscillation means, including a second voltage-controlled oscillator having an oscillation frequency which changes in accordance with frequency setting information, for supplying a local oscillation signal of the second voltage-controlled oscillator to the demodulation means;

recovery means, which includes a recovered carrier generator for generating a recovered carrier based on the I baseband signal and the Q baseband signal having the quadrature relationship to each other, for outputting a recovered I output signal and a recovered Q output signal;

first control means for detecting a frequency error of the baseband signals based on the I baseband signal and the Q baseband signal, and feeding back the detected frequency error to a first voltage-controlled oscillator included in the first control means and having an output provided to the conversion means so as to automatically remove the detected frequency error;

transmission means for detecting information on an offset frequency of the first voltage-controlled oscillator, which is a difference between a frequency of the first voltage-controlled oscillator and a prescribed frequency of the first voltage-controlled oscillator, and transmitting the detected information on the offset frequency to the local oscillation means; and second control means included in the local oscillation means for controlling the oscillation frequency of the local oscillation means based on the information on the offset frequency to control a frequency of the I baseband signal and the Q baseband signal so as to remove the offset frequency of the first voltage-controlled oscillator, wherein the first voltage-controlled oscillator in the first control means and the second voltage-controlled oscillator in the local oscillation means are constituted using different oscillating means from each other.

15. A demodulation apparatus according to claim 14, wherein the conversion means includes:

a frequency converter, connected to the first voltage-controlled oscillator, for performing frequency conversion of the input modulation into an IF signal, wherein the demodulation means includes:

a quadrature demodulator for demodulating the IF signal to the I baseband signal and the Q baseband signal having the quadrature relationship to each other, an A/D converter for converting the I baseband signal and the Q baseband signal into digital signals, and a low-pass wave-shaping filter for shaping a waveform of the output signals from the A/D converter, wherein the recovered carrier generator in the recovery means includes:

a digital voltage-controlled oscillator for generating a recovered carrier, wherein the recovery means further includes:

a complex multiplier, connected to the digital voltage-controlled oscillator, for performing complex multiplication of the digital signals obtained by the A/D converter and filtered by the low-pass wave-shaping filter with the output from the digital voltage-controlled oscillator, and PLL means for smoothing a phase error of the output signal from the complex multiplier and supplying the smoothed phase error to the digital voltage-controlled oscillator to generate the recovered carrier, wherein the transmission means include a frequency detector for detecting an offset frequency of the first voltage-controlled oscillator, wherein the first control means includes automatic frequency control means for feeding back a frequency error signal detected from the baseband signals to the first voltage-controlled oscillator, and wherein the second control means is fine-tune control means for receiving the offset frequency information obtained by the frequency detector included in the transmission means and fine-tuning the oscillation frequency of the second voltage-controlled oscillator included in the local oscillation means.

16. A demodulation apparatus according to claim 15, wherein the first control means includes at least one of:

frequency control means for detecting an error of a frequency of the I baseband signal and the Q baseband signal from a prescribed frequency and smoothing the frequency error to control the oscillation frequency of the first voltage-controlled oscillator, and a frequency tracking circuit for determining whether the oscillation frequency of the digital voltage-controlled oscillator goes beyond a range between a positive reference value and a negative reference value and, in the case when the oscillation frequency goes beyond one of the positive reference value and the negative reference value, tracking the oscillation frequency of the first voltage-controlled oscillator to limit the oscillation frequency of the digital voltage-controlled oscillator within the range.

17. A demodulation apparatus according to claim 14, wherein the demodulation means includes:

a quadrature demodulator for demodulating the IF signal to the I baseband signal and the Q baseband signal having a quadrature relationship to each other, an A/D converter for converting the I baseband signal and the Q baseband signal into digital signals, a first complex multiplier, connected to a first digital voltage-controlled oscillator, for performing complex multiplication of the digital signals obtained by the A/D converter and the output from the first digital voltage-controlled oscillator, and a low-pass wave-shaping filter for shaping a waveform of the output signal from the first complex multiplier, wherein the second voltage-controlled oscillator included in the local oscillation means is connected to the quadrature demodulator, wherein the recovery means includes:

a second complex multiplier, connected to a second digital voltage-controlled oscillator, for performing complex multiplication of the output from the low-pass wave-shaping filter and the recovered carrier, and PLL means for smoothing a phase error of the output signal from the second complex multiplier and supplying the smoothed phase error to the second digital voltage-controlled oscillator to generate the recovered carrier, wherein the first control means includes:

frequency control means for detecting an error of a frequency of the I baseband signal and the Q baseband signal from a prescribed frequency and smoothing the frequency error to control the oscillation frequency of the first voltage-controlled oscillator, and a frequency tracking circuit for determining whether the oscillation frequency of the second digital voltage-controlled oscillator goes beyond a range between positive reference value and a negative reference value and, in the case when the oscillation frequency goes beyond one of the positive reference value and the negative reference value, tracking the oscillation frequency of the first digital voltage-controlled oscillator to allow the oscillation frequency of the second digital voltage-controlled oscillator within the range, wherein the transmission means include a frequency detector for detecting a frequency amount obtained by summing a frequency deviation of the oscillation frequency of the first voltage-controlled oscillator from a prescribed frequency and the oscillation frequency of the first digital voltage-controlled oscillator, and wherein the local oscillation means includes fine-tune control means for receiving the frequency information obtained by the frequency detector and fine-tuning the oscillation frequency of the second voltage-controlled oscillator included in the local oscillation means.

18. A demodulation apparatus according to claim 1, wherein the conversion means includes:

frequency converter for performing frequency conversion of the signal selected from the input modulation signal to generate the IF signal, and a channel selection circuit, including the local oscillator having the oscillation frequency which changes in accordance with the channel selection information, for supplying the local oscillation signal of the local oscillator to the frequency converter, wherein the channel selection circuit includes fine-tune control means for receiving the offset frequency information of the demodulation means and fine-tuning the oscillation frequency of the local oscillator, wherein the fine-tune control means controls the oscillation frequency of the local oscillator in a step-like manner discontinuously, and performs initial setting of the oscillation frequency of a prescribed oscillator which is different from the local oscillator in the state of being offset when a prescribed channel is selected so as to compensate for a remaining frequency error which cannot be compensated for by the discontinuous fine-tuning.

19. A demodulation apparatus according to claim 14, wherein the channel selection circuit includes fine-tune control means for receiving the offset frequency information of the demodulation means and fine-tuning the oscillation frequency of the second voltage-controlled oscillator, and wherein the fine-tune control means controls the oscillation frequency of the second voltage-controlled oscillator in a step-like manner discontinuously, and performs initial setting of the oscillation frequency of a prescribed oscillator which is different from the second voltage-controlled oscillator in the state of being offset when a prescribed channel is selected so as to compensate for a remaining frequency error which cannot be compensated for by the discontinuous fine-tuning.

20. A demodulation apparatus according to claim 1, wherein the recovery means includes a complex multiplier, and detects a frequency error based on a change of a phase error of an output signal from the complex multiplier.

21. A demodulation apparatus according to claim 14, wherein the recovery means includes a complex multiplier, and detects a frequency error based on a change of a phase error of an output signal from the complex multiplier.

22. A demodulation apparatus according to claim 1, wherein the recovery means includes a complex multiplier, and detects a frequency error based on a change of a phase error of an input signal to the complex multiplier, using a differential detector and a frequency discriminator.

23. A demodulation apparatus according to claim 14, wherein the recovery means includes a complex multiplier, and detects a frequency error based on a change of a phase error of an input signal to the complex multiplier, using a differential detector and a frequency discriminator.

24. A demodulation apparatus according to claim 4, wherein the fine-tune control means controls the oscillation frequency of the first voltage-controlled oscillator in a step-like manner discontinuously, and performs initial setting of the oscillation frequency of the second voltage-controlled oscillator in the state of being offset by a certain amount when a prescribed channel is selected so as to compensate for a remaining frequency error which cannot be compensated for by the discontinuous fine-tuning, the amount of the offset being set to correspond to the remaining frequency error, the compensation being performed by controlling the oscillation frequency of the second voltage-controlled oscillator.

25. A demodulation apparatus according to claim 4, wherein the automatic frequency control means detects the frequency error based on an input signal to the complex multiplier using a differential detector and a frequency discriminator.

26. A demodulation apparatus according to claim 16, wherein the fine-tune control means controls the oscillation frequency of the second voltage-controlled oscillator in a step-like manner discontinuously, and performs initial setting of the oscillation frequency of the first voltage-controlled oscillator in the state of being offset by a certain amount when a prescribed channel is selected so as to compensate for a remaining frequency error which cannot be compensated for by the discontinuous fine-tuning, the amount of the offset being set to correspond to the remaining frequency error, the compensation being performed by controlling the oscillation frequency of the first voltage-controlled oscillator.

27. A demodulation apparatus according to claim 16, wherein the automatic frequency control means detects the frequency error based on an input signal to the complex multiplier using a differential detector and a frequency discriminator.

* * * * *